United States Patent
Reh et al.

(10) Patent No.: US 9,499,128 B2
(45) Date of Patent: Nov. 22, 2016

(54) MOBILE DEVICE-ENHANCED USER SELECTION OF SPECIFIC RENTAL VEHICLES FOR A RENTAL VEHICLE RESERVATION

(71) Applicant: The Crawford Group, Inc., St. Louis, MO (US)

(72) Inventors: E. Paul Reh, Warson Woods, MO (US); Michele Muscarella Harmon, Ballwin, MO (US); Robert Connors, Olivette, MO (US)

(73) Assignee: The Crawford Group, Inc., St. Louis, MO (US)

( * ) Notice: Subject to any disclaimer, the term of this patent is extended or adjusted under 35 U.S.C. 154(b) by 709 days.

(21) Appl. No.: 13/840,711

(22) Filed: Mar. 15, 2013

(65) Prior Publication Data

US 2014/0278599 A1 Sep. 18, 2014

Related U.S. Application Data

(60) Provisional application No. 61/784,227, filed on Mar. 14, 2013.

(51) Int. Cl.
*G06Q 10/00* (2012.01)
*B60R 25/24* (2013.01)
(Continued)

(52) U.S. Cl.
CPC ........... *B60R 25/24* (2013.01); *G06F 3/04842* (2013.01); *G06Q 10/02* (2013.01); *G06Q 30/016* (2013.01); *G06Q 30/0645* (2013.01); *G06Q 50/30* (2013.01)

(58) Field of Classification Search
CPC .................... G06Q 10/02; G06Q 50/30; G06Q 30/0645
See application file for complete search history.

(56) References Cited

U.S. PATENT DOCUMENTS

| | | |
|---|---|---|
| 3,624,608 A | 11/1971 | Altman et al. |
| 3,665,397 A | 5/1972 | Di Napoli et al. |

(Continued)

FOREIGN PATENT DOCUMENTS

| | | |
|---|---|---|
| AU | 2013903725 | 2/2016 |
| DE | 4301039 A1 | 7/1994 |

(Continued)

OTHER PUBLICATIONS

Budget Rent a car, Common questions, http://web.archive.org/web/20120208001128/http://www.budget.com/budgetWeb/html/en/customer/commonquestions, Feb. 8, 2012, retrieved Aug. 15, 2015.*

(Continued)

*Primary Examiner* — George Chen
(74) *Attorney, Agent, or Firm* — Thompson Coburn LLP

(57) ABSTRACT

A number of techniques are disclosed for making it more convenient and efficient for customers to conduct various rental vehicle transactions. As an example, a technique for performing an automated pickup of a rental vehicle using a mobile device is disclosed. As another example, a technique for performing an automated return administration of a rental vehicle using a mobile device is disclosed. As another example, a technique for permitting customer to select a particular rental vehicle for a rental vehicle transaction using a mobile device is disclosed. Also disclosed is a technique for permitting a customer to keylessly start a rental vehicle using a machine-sensible item such as his/her mobile device without requiring the customer to possess a smart key.

47 Claims, 63 Drawing Sheets

(51) Int. Cl.
*G06Q 10/02* (2012.01)
*G06Q 30/06* (2012.01)
*G06Q 50/30* (2012.01)
*G06F 3/0484* (2013.01)
*G06Q 30/00* (2012.01)

(56) References Cited

U.S. PATENT DOCUMENTS

| | | |
|---|---|---|
| 3,754,122 A | 8/1973 | Dinapoli et al. |
| 4,663,626 A | 5/1987 | Smith |
| 4,803,348 A | 2/1989 | Lohrey et al. |
| 4,817,166 A | 3/1989 | Gonzalez et al. |
| 4,835,533 A | 5/1989 | Akutsu |
| 4,845,636 A | 7/1989 | Walker |
| 4,895,009 A | 1/1990 | Kleefeldt et al. |
| 4,931,789 A | 6/1990 | Pinnow |
| 4,965,821 A | 10/1990 | Bishop et al. |
| 5,066,853 A | 11/1991 | Brisson |
| 5,159,334 A | 10/1992 | Baumert et al. |
| 5,206,643 A | 4/1993 | Eckelt |
| 5,218,367 A | 6/1993 | Sheffer et al. |
| 5,255,547 A | 10/1993 | Burr et al. |
| 5,289,369 A | 2/1994 | Hirshberg |
| 5,329,625 A | 7/1994 | Kannan et al. |
| 5,420,568 A | 5/1995 | Iida et al. |
| 5,432,904 A | 7/1995 | Wong |
| 5,467,080 A | 11/1995 | Stoll et al. |
| 5,477,214 A | 12/1995 | Bartel |
| RE35,184 E | 3/1996 | Walker |
| 5,504,674 A | 4/1996 | Chen et al. |
| 5,515,285 A | 5/1996 | Garrett, Sr. et al. |
| 5,541,571 A | 7/1996 | Ochs et al. |
| 5,568,120 A | 10/1996 | LeMense et al. |
| 5,583,486 A | 12/1996 | Kersten |
| 5,604,676 A | 2/1997 | Penzias |
| 5,630,209 A | 5/1997 | Wizgall et al. |
| 5,650,597 A | 7/1997 | Redmayne |
| 5,657,233 A | 8/1997 | Cherrington et al. |
| 5,660,246 A | 8/1997 | Kaman |
| 5,664,113 A | 9/1997 | Worger et al. |
| 5,679,984 A | 10/1997 | Talbot et al. |
| 5,686,910 A | 11/1997 | Timm et al. |
| 5,717,595 A | 2/1998 | Cherrington et al. |
| 5,724,520 A | 3/1998 | Goheen |
| 5,734,330 A | 3/1998 | Nakamura |
| 5,751,073 A | 5/1998 | Ross |
| 5,752,931 A | 5/1998 | Nazarian et al. |
| 5,774,060 A | 6/1998 | Ostermann et al. |
| 5,812,067 A | 9/1998 | Bergholz et al. |
| 5,835,061 A | 11/1998 | Stewart |
| 5,835,376 A | 11/1998 | Smith et al. |
| 5,864,623 A | 1/1999 | Messina et al. |
| 5,898,230 A | 4/1999 | Bartel et al. |
| 5,933,090 A | 8/1999 | Christenson |
| 5,939,975 A | 8/1999 | Tsuria et al. |
| 5,969,678 A | 10/1999 | Stewart |
| 6,006,148 A | 12/1999 | Strong |
| 6,013,956 A | 1/2000 | Anderson, Jr. |
| 6,028,537 A | 2/2000 | Suman et al. |
| 6,031,465 A | 2/2000 | Burgess |
| 6,040,638 A | 3/2000 | Howell |
| 6,070,155 A | 5/2000 | Cherrington et al. |
| 6,075,458 A | 6/2000 | Ladner et al. |
| 6,094,640 A | 7/2000 | Goheen |
| 6,144,293 A | 11/2000 | Plaschko et al. |
| 6,148,091 A | 11/2000 | DiMaria |
| 6,157,315 A | 12/2000 | Kokubo et al. |
| 6,169,943 B1 | 1/2001 | Simon et al. |
| 6,172,608 B1 | 1/2001 | Cole |
| 6,181,024 B1 | 1/2001 | Geil et al. |
| 6,181,991 B1 | 1/2001 | Kondo et al. |
| 6,185,487 B1 | 2/2001 | Kondo et al. |
| 6,192,236 B1 | 2/2001 | Irvin |
| 6,209,026 B1 | 3/2001 | Ran et al. |
| 6,225,890 B1 | 5/2001 | Murphy |
| 6,240,365 B1 | 5/2001 | Bunn |
| 6,253,980 B1 | 7/2001 | Murakami et al. |
| 6,297,811 B1 | 10/2001 | Kent et al. |
| 6,326,918 B1 | 12/2001 | Stewart |
| 6,339,745 B1 | 1/2002 | Novik |
| 6,356,836 B1 | 3/2002 | Adolph |
| 6,376,930 B1 | 4/2002 | Nagao et al. |
| 6,430,496 B1 | 8/2002 | Smith et al. |
| 6,434,459 B2 | 8/2002 | Wong et al. |
| 6,459,967 B1 | 10/2002 | Otto |
| 6,463,416 B1 | 10/2002 | Messina |
| 6,480,098 B2 | 11/2002 | Flick |
| 6,493,616 B1 | 12/2002 | Rossow et al. |
| 6,523,741 B1 | 2/2003 | DiMaria et al. |
| 6,529,805 B2 | 3/2003 | Aldrich, III et al. |
| 6,535,743 B1 | 3/2003 | Kennedy, III et al. |
| 6,584,401 B2 | 6/2003 | Kirshenbaum et al. |
| 6,594,579 B1 | 7/2003 | Lowrey et al. |
| 6,604,033 B1 | 8/2003 | Banet et al. |
| 6,615,046 B1 | 9/2003 | Ur |
| 6,617,975 B1 | 9/2003 | Burgess |
| 6,618,650 B1 | 9/2003 | Nakai et al. |
| 6,629,034 B1 | 9/2003 | Kozak et al. |
| 6,636,145 B1 | 10/2003 | Murakami et al. |
| 6,636,790 B1 | 10/2003 | Lightner et al. |
| 6,647,328 B2 | 11/2003 | Walker |
| 6,650,977 B2 | 11/2003 | Miller |
| 6,664,888 B1 | 12/2003 | Bishop |
| 6,671,594 B2 | 12/2003 | Miller |
| 6,675,150 B1 | 1/2004 | Camer |
| 6,687,587 B2 | 2/2004 | Kacel |
| 6,693,563 B2 | 2/2004 | Flick |
| 6,694,248 B2 | 2/2004 | Smith et al. |
| 6,696,981 B1 | 2/2004 | Hashimoto |
| 6,697,018 B2 | 2/2004 | Stewart |
| 6,697,024 B2 | 2/2004 | Fuerst et al. |
| 6,697,730 B2 | 2/2004 | Dickerson |
| 6,703,946 B2 | 3/2004 | Flick |
| 6,708,879 B2 | 3/2004 | Hunt |
| 6,732,031 B1 | 5/2004 | Lightner et al. |
| 6,736,322 B2 | 5/2004 | Gobburu et al. |
| 6,741,187 B2 | 5/2004 | Flick |
| 6,748,211 B1 | 6/2004 | Isaac et al. |
| 6,759,960 B2 | 7/2004 | Stewart |
| 6,765,500 B2 | 7/2004 | Flick |
| 6,766,233 B2 | 7/2004 | Odinak et al. |
| 6,771,188 B2 | 8/2004 | Flick |
| 6,771,981 B1 | 8/2004 | Zalewski et al. |
| 6,778,068 B2 | 8/2004 | Wolfe |
| 6,781,507 B1 | 8/2004 | Birchfield et al. |
| 6,784,809 B2 | 8/2004 | Flick |
| 6,789,003 B2 | 9/2004 | Magner et al. |
| 6,792,295 B1 | 9/2004 | Hanevich et al. |
| 6,798,355 B2 | 9/2004 | Flick |
| 6,803,861 B2 | 10/2004 | Flick |
| 6,809,636 B2 | 10/2004 | Metlitzky et al. |
| 6,816,089 B2 | 11/2004 | Flick |
| 6,819,269 B2 | 11/2004 | Flick |
| 6,828,902 B2 | 12/2004 | Casden |
| 6,838,998 B1 | 1/2005 | Brown et al. |
| 6,844,827 B2 | 1/2005 | Flick |
| 6,850,153 B1 | 2/2005 | Murakami et al. |
| 6,850,154 B2 | 2/2005 | Emmerling |
| 6,850,898 B1 | 2/2005 | Murakami et al. |
| 6,853,907 B2 | 2/2005 | Peterson et al. |
| 6,853,910 B1 | 2/2005 | Oesterling et al. |
| 6,859,009 B2 | 2/2005 | Jablin |
| 6,877,665 B2 | 4/2005 | Gobburu et al. |
| 6,882,905 B2 | 4/2005 | Hall et al. |
| 6,882,906 B2 | 4/2005 | Geisler et al. |
| 6,885,738 B2 | 4/2005 | White et al. |
| 6,892,116 B2 | 5/2005 | Geisler et al. |
| 6,898,493 B2 | 5/2005 | Ehrman et al. |
| 6,919,865 B2 | 7/2005 | Tamaru |
| 6,920,437 B2 | 7/2005 | Messina |
| 6,924,729 B1 | 8/2005 | Aschauer et al. |
| 6,925,381 B2 | 8/2005 | Adamczyk |
| 6,931,308 B2 | 8/2005 | Read |
| 6,941,197 B1 | 9/2005 | Murakami et al. |

(56) References Cited

U.S. PATENT DOCUMENTS

| | | |
|---|---|---|
| 6,944,533 B2 | 9/2005 | Kozak et al. |
| 6,947,881 B1 | 9/2005 | Murakami et al. |
| 6,952,156 B2 | 10/2005 | Arshad et al. |
| 6,960,990 B2 | 11/2005 | McKibbon |
| 6,961,707 B2 | 11/2005 | Jenkins |
| 6,963,794 B2 | 11/2005 | Geber et al. |
| 6,965,323 B2 | 11/2005 | Uehara et al. |
| 6,967,567 B1 | 11/2005 | Hashimoto |
| 6,968,179 B1 | 11/2005 | De Vries |
| 6,975,248 B2 | 12/2005 | Asari et al. |
| 6,975,997 B1 | 12/2005 | Murakami et al. |
| 7,027,808 B2 | 4/2006 | Wesby |
| 7,034,655 B2 | 4/2006 | Magner et al. |
| 7,035,631 B2 | 4/2006 | Schwinke et al. |
| 7,042,333 B2 | 5/2006 | Dix et al. |
| 7,058,594 B2 | 6/2006 | Stewart |
| 7,062,376 B2 | 6/2006 | Oesterling |
| 7,069,119 B2 | 6/2006 | Ueda et al. |
| 7,080,019 B1 | 7/2006 | Hurzeler |
| 7,082,364 B2 | 7/2006 | Adamczyk |
| 7,091,857 B2 | 8/2006 | Lanigan et al. |
| 7,106,171 B1 | 9/2006 | Burgess |
| 7,106,307 B2 | 9/2006 | Cok |
| 7,113,864 B2 | 9/2006 | Smith et al. |
| 7,116,989 B2 | 10/2006 | Mazzara et al. |
| 7,119,709 B2 | 10/2006 | Magner et al. |
| 7,129,852 B2 | 10/2006 | Aslund et al. |
| 7,133,659 B2 | 11/2006 | Zalewski et al. |
| 7,136,747 B2 | 11/2006 | Raney |
| 7,142,099 B2 | 11/2006 | Ross et al. |
| 7,146,270 B2 | 12/2006 | Nozaki et al. |
| 7,154,384 B2 | 12/2006 | Nitou |
| 7,167,084 B2 | 1/2007 | Proefke et al. |
| 7,173,517 B2 | 2/2007 | Kondo et al. |
| 7,177,738 B2 | 2/2007 | Diaz |
| 7,181,409 B1 | 2/2007 | Murakami et al. |
| 7,184,744 B1 | 2/2007 | Schnabel |
| 7,184,866 B2 | 2/2007 | Squires et al. |
| 7,188,070 B2 | 3/2007 | Dar et al. |
| 7,191,057 B2 | 3/2007 | Adamczyk |
| 7,194,106 B2 | 3/2007 | Brundage et al. |
| 7,218,925 B2 | 5/2007 | Crocker et al. |
| 7,219,235 B2 | 5/2007 | Rumble |
| 7,224,261 B2 | 5/2007 | Shimomura |
| 7,224,266 B2 | 5/2007 | Taipale |
| 7,228,122 B2 | 6/2007 | Oyagi et al. |
| 7,230,545 B2 | 6/2007 | Nath et al. |
| 7,233,227 B2 | 6/2007 | Lemoult |
| 7,245,997 B2 | 7/2007 | Kitao et al. |
| 7,248,151 B2 | 7/2007 | McCall |
| 7,252,227 B2 | 8/2007 | Chase |
| 7,266,435 B2 | 9/2007 | Wang et al. |
| 7,271,701 B2 | 9/2007 | Kokubu et al. |
| 7,289,024 B2 | 10/2007 | Sumcad et al. |
| 7,308,581 B1 | 12/2007 | Geosimonian |
| 7,312,691 B2 | 12/2007 | Zambo et al. |
| 7,313,467 B2 | 12/2007 | Breed et al. |
| 7,321,814 B2 | 1/2008 | Kanda et al. |
| 7,323,970 B1 | 1/2008 | Murray et al. |
| 7,327,230 B2 | 2/2008 | Metlitzky et al. |
| 7,332,998 B2 | 2/2008 | Beehler et al. |
| 7,340,400 B2 | 3/2008 | McGinn et al. |
| 7,346,439 B2 | 3/2008 | Bodin |
| 7,364,069 B2 | 4/2008 | Chase |
| 7,369,685 B2 | 5/2008 | DeLean |
| 7,444,216 B2 | 10/2008 | Rogers et al. |
| 7,477,242 B2 | 1/2009 | Cross et al. |
| 7,478,067 B2 | 1/2009 | Messina |
| 7,478,492 B2 | 1/2009 | Madonia |
| 7,599,847 B2 | 10/2009 | Block et al. |
| 7,627,422 B2 | 12/2009 | Adamczyk et al. |
| 7,637,631 B2 | 12/2009 | McDermott et al. |
| 7,668,537 B2 | 2/2010 | De Vries |
| 7,710,245 B2 | 5/2010 | Pickering |
| 7,733,332 B2 | 6/2010 | Steenwyk et al. |
| 7,738,658 B2 | 6/2010 | Brundage et al. |
| 7,756,633 B2 | 7/2010 | Huang et al. |
| 7,761,062 B2 | 7/2010 | Mervine |
| 7,765,408 B1 | 7/2010 | Geosimonian |
| 7,812,712 B2 | 10/2010 | White et al. |
| 7,821,541 B2 | 10/2010 | Delean |
| 7,840,427 B2 | 11/2010 | O'Sullivan |
| 7,848,765 B2 | 12/2010 | Phillips et al. |
| 7,852,199 B2 | 12/2010 | Desai et al. |
| 7,859,413 B2 | 12/2010 | Nguyen |
| 7,869,945 B2 | 1/2011 | Huang et al. |
| 7,876,201 B2 | 1/2011 | Bauchot et al. |
| 7,889,931 B2 | 2/2011 | Webb et al. |
| 7,899,751 B2 | 3/2011 | Messina |
| 7,930,098 B2 | 4/2011 | Huang et al. |
| 7,933,808 B2 | 4/2011 | Garcia |
| 7,941,267 B2 | 5/2011 | Adamczyk et al. |
| 7,945,076 B2 | 5/2011 | DeLean |
| 7,949,541 B2 | 5/2011 | McGinn et al. |
| 7,953,618 B2 | 5/2011 | Pearce et al. |
| 7,956,730 B2 | 6/2011 | White et al. |
| 7,970,533 B2 | 6/2011 | Huang et al. |
| 7,974,771 B2 | 7/2011 | Cobbold |
| 7,974,779 B2 | 7/2011 | Huang et al. |
| 8,024,578 B2 | 9/2011 | Geosimonian |
| 8,036,824 B2 | 10/2011 | Huang et al. |
| 8,049,602 B2 | 11/2011 | Bauer et al. |
| 8,050,451 B2 | 11/2011 | Brundage et al. |
| 8,055,534 B2 | 11/2011 | Ashby et al. |
| 8,068,011 B1 | 11/2011 | Sajadi et al. |
| 8,074,871 B2 | 12/2011 | Bates |
| 8,086,400 B2 | 12/2011 | Huang et al. |
| 8,095,305 B2 | 1/2012 | Huang et al. |
| 8,095,422 B2 | 1/2012 | Hallowell et al. |
| 8,140,256 B1 | 3/2012 | dos-Santos et al. |
| 8,150,608 B2 | 4/2012 | Cobbold |
| 8,156,326 B2 | 4/2012 | Di Giusto et al. |
| 8,165,799 B2 | 4/2012 | Snavely et al. |
| 8,198,979 B2 | 6/2012 | Haag et al. |
| 8,224,571 B2 | 7/2012 | Huang et al. |
| 8,230,362 B2 | 7/2012 | Couch |
| 8,275,361 B2 | 9/2012 | De Vries |
| 8,280,791 B2 | 10/2012 | Davis, III et al. |
| 8,285,570 B2 | 10/2012 | Meyer et al. |
| 8,285,571 B2 | 10/2012 | Demirdjian et al. |
| 8,326,315 B2 | 12/2012 | Phillips et al. |
| 8,340,890 B1 | 12/2012 | Cobbold |
| 8,370,268 B2 | 2/2013 | Ehrman et al. |
| 8,463,487 B2 | 6/2013 | Nielsen et al. |
| 8,473,148 B2 | 6/2013 | Nielsen et al. |
| 8,768,565 B2 | 7/2014 | Jefferies et al. |
| 2001/0000957 A1 | 5/2001 | Birchfield et al. |
| 2001/0028295 A1 | 10/2001 | Brinkmeyer et al. |
| 2001/0056361 A1 | 12/2001 | Sendouda |
| 2001/0056363 A1 | 12/2001 | Gantz et al. |
| 2002/0008645 A1 | 1/2002 | Flick et al. |
| 2002/0010604 A1 | 1/2002 | Block |
| 2002/0022979 A1 | 2/2002 | Whipp et al. |
| 2002/0027498 A1 | 3/2002 | Stephane |
| 2002/0030105 A1 | 3/2002 | Miller et al. |
| 2002/0049663 A1 | 4/2002 | Kahana |
| 2002/0121962 A1 | 9/2002 | Wolfe |
| 2002/0130765 A1 | 9/2002 | Flick |
| 2002/0145593 A1 | 10/2002 | Boyd et al. |
| 2002/0149572 A1 | 10/2002 | Schulz et al. |
| 2002/0186144 A1 | 12/2002 | Meunier |
| 2002/0197988 A1 | 12/2002 | Hellaker |
| 2003/0005300 A1 | 1/2003 | Noble et al. |
| 2003/0023463 A1* | 1/2003 | Dombroski ............ G06Q 10/02 705/5 |
| 2003/0034873 A1 | 2/2003 | Chase et al. |
| 2003/0074275 A1 | 4/2003 | Salle |
| 2003/0087636 A1 | 5/2003 | Mazzara et al. |
| 2003/0107469 A1 | 6/2003 | Emmerling |
| 2003/0120509 A1 | 6/2003 | Bruch et al. |
| 2003/0120522 A1 | 6/2003 | Uyeki |
| 2003/0125961 A1 | 7/2003 | Janda |
| 2003/0182033 A1 | 9/2003 | Underdahl et al. |
| 2003/0182054 A1 | 9/2003 | Peterson et al. |

(56) References Cited

U.S. PATENT DOCUMENTS

| | | |
|---|---|---|
| 2003/0182183 A1 | 9/2003 | Pribe |
| 2003/0191568 A1 | 10/2003 | Breed |
| 2003/0222758 A1 | 12/2003 | Willats et al. |
| 2004/0006498 A1 | 1/2004 | Ohtake et al. |
| 2004/0006517 A1 | 1/2004 | Takatori |
| 2004/0009772 A1 | 1/2004 | Mazzara |
| 2004/0012501 A1 | 1/2004 | Mazzara et al. |
| 2004/0024621 A1 | 2/2004 | Read |
| 2004/0039612 A1* | 2/2004 | Fitzgerald .......... G06Q 30/0645 705/5 |
| 2004/0044454 A1 | 3/2004 | Ross et al. |
| 2004/0044592 A1 | 3/2004 | Ubik et al. |
| 2004/0049324 A1 | 3/2004 | Walker |
| 2004/0049401 A1 | 3/2004 | Carr et al. |
| 2004/0049424 A1 | 3/2004 | Murray et al. |
| 2004/0073340 A1 | 4/2004 | Ueda et al. |
| 2004/0073440 A1 | 4/2004 | Garbers et al. |
| 2004/0088392 A1 | 5/2004 | Barrett et al. |
| 2004/0094621 A1 | 5/2004 | LaMont |
| 2004/0122688 A1 | 6/2004 | Janda |
| 2004/0125764 A1 | 7/2004 | Piwowarski et al. |
| 2004/0158483 A1 | 8/2004 | Lecouturier |
| 2004/0158816 A1 | 8/2004 | Pandipati et al. |
| 2004/0176969 A1 | 9/2004 | Fujinuma |
| 2004/0186902 A1 | 9/2004 | Stewart |
| 2004/0193440 A1* | 9/2004 | Mawatari .......... G06Q 30/0645 705/307 |
| 2004/0203696 A1 | 10/2004 | Jijina et al. |
| 2004/0203969 A1 | 10/2004 | Videtich |
| 2004/0225544 A1 | 11/2004 | Camer |
| 2004/0230498 A1 | 11/2004 | Zimmerman et al. |
| 2004/0242198 A1 | 12/2004 | Oyagi et al. |
| 2004/0249818 A1 | 12/2004 | Isaac |
| 2005/0033484 A1 | 2/2005 | Geber et al. |
| 2005/0038598 A1 | 2/2005 | Oesterling et al. |
| 2005/0050017 A1 | 3/2005 | Ross et al. |
| 2005/0052426 A1 | 3/2005 | Hagermoser et al. |
| 2005/0060070 A1 | 3/2005 | Kapolka et al. |
| 2005/0060210 A1 | 3/2005 | Levi et al. |
| 2005/0064895 A1 | 3/2005 | Oesterling et al. |
| 2005/0065678 A1 | 3/2005 | Smith et al. |
| 2005/0085221 A1 | 4/2005 | Sumcad |
| 2005/0096939 A1 | 5/2005 | Ramseyer |
| 2005/0099262 A1 | 5/2005 | Childress et al. |
| 2005/0108089 A1 | 5/2005 | Ehrman et al. |
| 2005/0116816 A1 | 6/2005 | Nitou |
| 2005/0125483 A1 | 6/2005 | Bergander et al. |
| 2005/0146465 A1 | 7/2005 | Prassmayer et al. |
| 2005/0159988 A1 | 7/2005 | Ramseyer |
| 2005/0182671 A1 | 8/2005 | Miyauchi |
| 2005/0190044 A1 | 9/2005 | Rutledge |
| 2005/0200479 A1 | 9/2005 | James |
| 2005/0209746 A1 | 9/2005 | Kish et al. |
| 2005/0216296 A1 | 9/2005 | Kokubu |
| 2005/0225429 A1 | 10/2005 | Burzio |
| 2005/0250440 A1 | 11/2005 | Zhou et al. |
| 2005/0256762 A1 | 11/2005 | Dar et al. |
| 2005/0261035 A1 | 11/2005 | Groskreutz et al. |
| 2006/0031011 A1 | 2/2006 | Oesterling et al. |
| 2006/0038674 A1 | 2/2006 | Sumcad et al. |
| 2006/0047373 A1 | 3/2006 | Sumcad et al. |
| 2006/0066439 A1 | 3/2006 | Keeling et al. |
| 2006/0072756 A1 | 4/2006 | Leimgruber et al. |
| 2006/0082471 A1 | 4/2006 | Rockett et al. |
| 2006/0114101 A1 | 6/2006 | Schambeck et al. |
| 2006/0118622 A1 | 6/2006 | Zatloukal et al. |
| 2006/0125620 A1 | 6/2006 | Smith et al. |
| 2006/0132291 A1 | 6/2006 | Dourney et al. |
| 2006/0154643 A1 | 7/2006 | Scholz et al. |
| 2006/0157563 A1 | 7/2006 | Marshall |
| 2006/0158319 A1 | 7/2006 | Kim |
| 2006/0173587 A1 | 8/2006 | Oesterling et al. |
| 2006/0178949 A1 | 8/2006 | McGrath |
| 2006/0186988 A1 | 8/2006 | Proefke et al. |
| 2006/0190419 A1 | 8/2006 | Bunn et al. |
| 2006/0194566 A1 | 8/2006 | Oesterling |
| 2006/0202799 A1 | 9/2006 | Zambo et al. |
| 2006/0214767 A1 | 9/2006 | Carrieri |
| 2006/0229780 A1 | 10/2006 | Underdahl et al. |
| 2006/0244588 A1 | 11/2006 | Hannah et al. |
| 2006/0258379 A1 | 11/2006 | Oesterling et al. |
| 2006/0259353 A1 | 11/2006 | Gutmann |
| 2006/0265117 A1 | 11/2006 | Cahoon |
| 2006/0293802 A1 | 12/2006 | Kitao et al. |
| 2007/0001876 A1 | 1/2007 | Patenaude et al. |
| 2007/0018790 A1 | 1/2007 | LaFrance |
| 2007/0021054 A1 | 1/2007 | Videtich |
| 2007/0026876 A1 | 2/2007 | Freilich |
| 2007/0027708 A1 | 2/2007 | Brown et al. |
| 2007/0055415 A1 | 3/2007 | Taki et al. |
| 2007/0061069 A1 | 3/2007 | Christensen |
| 2007/0093943 A1 | 4/2007 | Nelson et al. |
| 2007/0094055 A1 | 4/2007 | Nakayama et al. |
| 2007/0106563 A1 | 5/2007 | Okada et al. |
| 2007/0129974 A1 | 6/2007 | Chen et al. |
| 2007/0131005 A1 | 6/2007 | Clare |
| 2007/0139182 A1 | 6/2007 | O'Connor et al. |
| 2007/0139397 A1 | 6/2007 | Cross |
| 2007/0142028 A1 | 6/2007 | Ayoub et al. |
| 2007/0152877 A1 | 7/2007 | Madhaven et al. |
| 2007/0173992 A1 | 7/2007 | McCutchen et al. |
| 2007/0179706 A1 | 8/2007 | McCutchen et al. |
| 2007/0179798 A1 | 8/2007 | Inbarajan |
| 2007/0179799 A1 | 8/2007 | Laghrari |
| 2007/0179800 A1 | 8/2007 | Oesterling |
| 2007/0191995 A1 | 8/2007 | Laghrari |
| 2007/0194216 A1 | 8/2007 | Schwenke |
| 2007/0197194 A1 | 8/2007 | Oyagi et al. |
| 2007/0198276 A1 | 8/2007 | Hinrichs et al. |
| 2007/0200671 A1 | 8/2007 | Kelley et al. |
| 2007/0203618 A1 | 8/2007 | McBride et al. |
| 2007/0210896 A1 | 9/2007 | Schambeck et al. |
| 2007/0216572 A1 | 9/2007 | Schnabel |
| 2007/0222292 A1 | 9/2007 | Shimomura |
| 2007/0222293 A1 | 9/2007 | Shimomura |
| 2007/0241862 A1 | 10/2007 | Dimig et al. |
| 2007/0244829 A1 | 10/2007 | Boswell et al. |
| 2007/0250232 A1 | 10/2007 | Dourney et al. |
| 2007/0275690 A1 | 11/2007 | Hunter et al. |
| 2007/0288127 A1 | 12/2007 | Haq et al. |
| 2007/0290789 A1 | 12/2007 | Segev et al. |
| 2007/0293997 A1 | 12/2007 | Couch |
| 2008/0012762 A1 | 1/2008 | James |
| 2008/0014908 A1 | 1/2008 | Vasant |
| 2008/0015908 A1 | 1/2008 | Ramseyer |
| 2008/0021605 A1 | 1/2008 | Huber et al. |
| 2008/0021723 A1 | 1/2008 | Devarakonda |
| 2008/0027604 A1 | 1/2008 | Oesterling |
| 2008/0027606 A1 | 1/2008 | Helm |
| 2008/0039995 A1 | 2/2008 | Reeser |
| 2008/0048844 A1 | 2/2008 | Watanabe et al. |
| 2008/0074234 A1 | 3/2008 | Nelson |
| 2008/0091342 A1 | 4/2008 | Assael |
| 2008/0129545 A1 | 6/2008 | Johnson et al. |
| 2008/0133432 A1 | 6/2008 | Ramseyer |
| 2008/0140570 A1 | 6/2008 | Vaughn |
| 2008/0154671 A1 | 6/2008 | Delk |
| 2008/0161981 A1 | 7/2008 | Tessier et al. |
| 2008/0183535 A1 | 7/2008 | Kahana |
| 2008/0228365 A1 | 9/2008 | White et al. |
| 2008/0228533 A1 | 9/2008 | McGuire et al. |
| 2008/0238690 A1 | 10/2008 | Plant |
| 2008/0257706 A1 | 10/2008 | Haag |
| 2008/0270019 A1 | 10/2008 | Anderson et al. |
| 2008/0270204 A1 | 10/2008 | Poykko et al. |
| 2008/0300927 A1 | 12/2008 | Kennedy |
| 2009/0005963 A1 | 1/2009 | Jarvinen |
| 2009/0015373 A1 | 1/2009 | Kelly et al. |
| 2009/0018859 A1 | 1/2009 | Purifoy et al. |
| 2009/0049044 A1 | 2/2009 | Mitchell |
| 2009/0055936 A1 | 2/2009 | Eberstaller |
| 2009/0061901 A1 | 3/2009 | Arrasvuori et al. |
| 2009/0096576 A1 | 4/2009 | Oman et al. |
| 2009/0125230 A1 | 5/2009 | Sullivan |

(56) References Cited

U.S. PATENT DOCUMENTS

| | | |
|---|---|---|
| 2009/0140846 A1 | 6/2009 | Rutledge |
| 2009/0172009 A1 | 7/2009 | Schmith et al. |
| 2009/0187435 A1 | 7/2009 | Carr et al. |
| 2009/0210276 A1 | 8/2009 | Krumm et al. |
| 2009/0212978 A1 | 8/2009 | Ramseyer |
| 2009/0216600 A1 | 8/2009 | Hill |
| 2009/0234573 A1 | 9/2009 | Notarantonio |
| 2009/0234658 A1 | 9/2009 | Greenwell et al. |
| 2009/0248587 A1 | 10/2009 | Van Buskirk |
| 2009/0278656 A1 | 11/2009 | Lopez et al. |
| 2009/0287499 A1 | 11/2009 | Link, II |
| 2010/0001830 A1 | 1/2010 | Woo |
| 2010/0010873 A1 | 1/2010 | Moreau |
| 2010/0078475 A1 | 4/2010 | Lin et al. |
| 2010/0079153 A1 | 4/2010 | Maloof et al. |
| 2010/0094482 A1 | 4/2010 | Schofield et al. |
| 2010/0106534 A1 | 4/2010 | Robinson et al. |
| 2010/0128931 A1 | 5/2010 | Bongard |
| 2010/0138242 A1 | 6/2010 | Ferrick et al. |
| 2010/0153279 A1 | 6/2010 | Zahn |
| 2010/0179725 A1 | 7/2010 | Boote et al. |
| 2010/0201505 A1 | 8/2010 | Honary et al. |
| 2010/0211401 A1 | 8/2010 | Williams et al. |
| 2010/0227594 A1 | 9/2010 | De Vries |
| 2010/0280884 A1 | 11/2010 | Levine et al. |
| 2010/0305729 A1 | 12/2010 | Glitsch et al. |
| 2010/0305779 A1 | 12/2010 | Hassan et al. |
| 2010/0332242 A1 | 12/2010 | Kamar et al. |
| 2011/0016146 A1 | 1/2011 | Teufel |
| 2011/0022422 A1 | 1/2011 | Taylor |
| 2011/0022425 A1 | 1/2011 | Block et al. |
| 2011/0029352 A1 | 2/2011 | Lau et al. |
| 2011/0032203 A1 | 2/2011 | Pryor |
| 2011/0059693 A1 | 3/2011 | O'Sullivan |
| 2011/0060480 A1 | 3/2011 | Mottla et al. |
| 2011/0090097 A1 | 4/2011 | Beshke |
| 2011/0112717 A1 | 5/2011 | Resner |
| 2011/0112969 A1 | 5/2011 | Zaid et al. |
| 2011/0125794 A1 | 5/2011 | Hutschemaekers |
| 2011/0137520 A1 | 6/2011 | Rector et al. |
| 2011/0145089 A1 | 6/2011 | Khunger et al. |
| 2011/0161227 A1 | 6/2011 | Santo, Jr. |
| 2011/0191126 A1 | 8/2011 | Hampshire et al. |
| 2011/0202393 A1 | 8/2011 | DeWakar et al. |
| 2011/0209177 A1 | 8/2011 | Sela et al. |
| 2011/0213629 A1 | 9/2011 | Clark et al. |
| 2011/0214728 A1 | 9/2011 | Veerasamy |
| 2011/0217451 A1 | 9/2011 | Veerasamy |
| 2011/0217455 A1 | 9/2011 | Veerasamy |
| 2011/0225269 A1 | 9/2011 | Yap et al. |
| 2011/0231354 A1 | 9/2011 | O'Sullivan et al. |
| 2011/0276404 A1 | 11/2011 | Taysom et al. |
| 2011/0281562 A1 | 11/2011 | Videtich |
| 2011/0282717 A1 | 11/2011 | Aschenbrenner et al. |
| 2011/0288891 A1 | 11/2011 | Zaid et al. |
| 2011/0291796 A1 | 12/2011 | Gradussen |
| 2011/0301985 A1 | 12/2011 | Camp et al. |
| 2011/0301997 A1 | 12/2011 | Gale et al. |
| 2011/0307282 A1 | 12/2011 | Camp et al. |
| 2011/0313804 A1 | 12/2011 | Camp et al. |
| 2011/0313893 A1 | 12/2011 | Weik, III |
| 2011/0313937 A1 | 12/2011 | Moore, Jr. et al. |
| 2012/0002847 A1 | 1/2012 | Geosimonian |
| 2012/0019360 A1 | 1/2012 | McGinn et al. |
| 2012/0024948 A1 | 2/2012 | Messina |
| 2012/0041675 A1 | 2/2012 | Juliver et al. |
| 2012/0045113 A1 | 2/2012 | Bates |
| 2012/0050018 A1 | 3/2012 | Sajadi et al. |
| 2012/0078668 A1* | 3/2012 | Hirose .......... G06Q 10/02 705/5 |
| 2012/0105197 A1 | 5/2012 | Kobres |
| 2012/0126974 A1 | 5/2012 | Phillips et al. |
| 2012/0129553 A1 | 5/2012 | Phillips et al. |
| 2012/0233246 A1 | 9/2012 | Guemez |
| 2012/0290652 A1 | 11/2012 | Boskovic |
| 2012/0323642 A1 | 12/2012 | Camp et al. |
| 2013/0006959 A9 | 1/2013 | Mitchell |
| 2013/0024390 A1 | 1/2013 | Zlobinsky |
| 2013/0035846 A1 | 2/2013 | Shih-Chia et al. |
| 2013/0054139 A1 | 2/2013 | Bodin et al. |
| 2013/0054281 A1 | 2/2013 | Thakkar et al. |
| 2013/0054311 A1 | 2/2013 | Kataria et al. |
| 2013/0060586 A1 | 3/2013 | Chen et al. |
| 2013/0080196 A1 | 3/2013 | Schroeder et al. |
| 2013/0080345 A1 | 3/2013 | Rassi |
| 2013/0082820 A1 | 4/2013 | Tieman |
| 2013/0095895 A1 | 4/2013 | Asuri et al. |
| 2013/0096827 A1 | 4/2013 | McCall et al. |
| 2013/0110396 A1 | 5/2013 | Choudhury |
| 2013/0124279 A1 | 5/2013 | Bodin et al. |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0144667 A1 | 6/2013 | Ehrman et al. |
| 2013/0317693 A1 | 11/2013 | Jefferies et al. |
| 2014/0156138 A1 | 6/2014 | Klaff et al. |
| 2014/0266594 A1 | 9/2014 | Reiser |
| 2014/0278555 A1 | 9/2014 | Johnson et al. |
| 2014/0278607 A1 | 9/2014 | Johnson et al. |
| 2014/0278608 A1 | 9/2014 | Johnson et al. |
| 2014/0309842 A1 | 10/2014 | Jefferies et al. |

FOREIGN PATENT DOCUMENTS

| | | |
|---|---|---|
| DE | 4324762 A1 | 2/1995 |
| EP | 0451482 B1 | 10/1991 |
| EP | 1128335 A2 | 8/2001 |
| EP | 1128355 A2 | 8/2001 |
| EP | 2573738 A1 | 3/2013 |
| JP | 2009176261 A | 8/2009 |
| WO | 9305987 A1 | 4/1993 |
| WO | 9851548 A1 | 11/1998 |
| WO | 02057873 A2 | 7/2002 |
| WO | 02067079 A2 | 8/2002 |
| WO | 02080646 A2 | 10/2002 |
| WO | 2004056621 A1 | 7/2004 |
| WO | 2008150475 A1 | 12/2008 |
| WO | 2010000317 A1 | 1/2010 |
| WO | 2011/147893 A1 | 12/2011 |
| WO | 2011159331 A1 | 12/2011 |
| WO | 2013/177331 A1 | 11/2013 |
| WO | 2014152916 A2 | 9/2014 |

OTHER PUBLICATIONS

Flyertalk, Carfirmation Enhancement: Mobile Gold upgrades, http://www.flyertalk.com/forum/hertz-gold-plus-rewards/1412281-carfirmation-enhancement-mobile-gold-upgrades.html, Dec. 3, 2012, retrieved Aug. 15, 2015.*

Doerfler, et al., "Advanced Securirty Systems", VDI-Berichte, 1994, pp. 693-705, vol./Issue 1(1152).

International Search Report and Written Opinion for PCT/US2014/028221 dated Oct. 3, 2014.

U.S. Appl. No. 60/932,574, filed May 31, 2007 (Kennedy).

http://www.cellocator.com/applications-solutions/lease-rental-cars/, dated Sep. 1, 2012.

http://www.convadis.ch/pages/en/home.php, dated Sep. 1, 2012.

http://www.invers.com/en-eu/, dated Sep. 1, 2012.

International Preliminary Report on Patentability (Chapter I) for PCT/US2014/028221 issued Sep. 24, 2015.

* cited by examiner

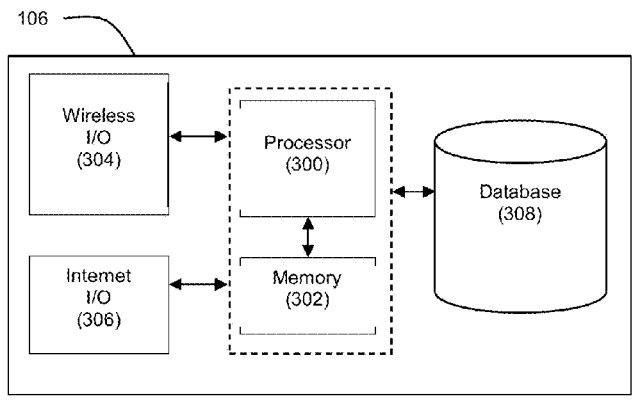
Figure 3
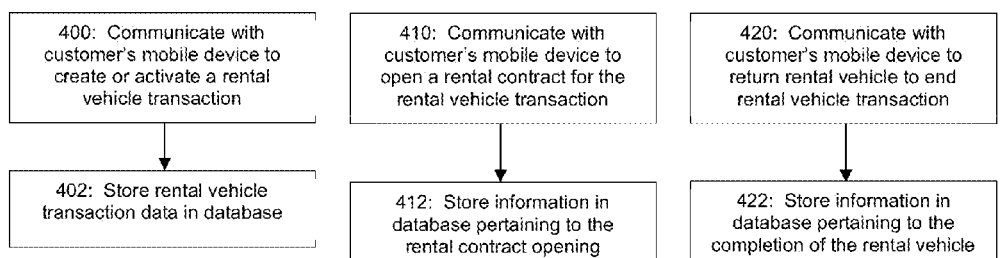
Figure 4(a) Figure 4(b) Figure 4(c)

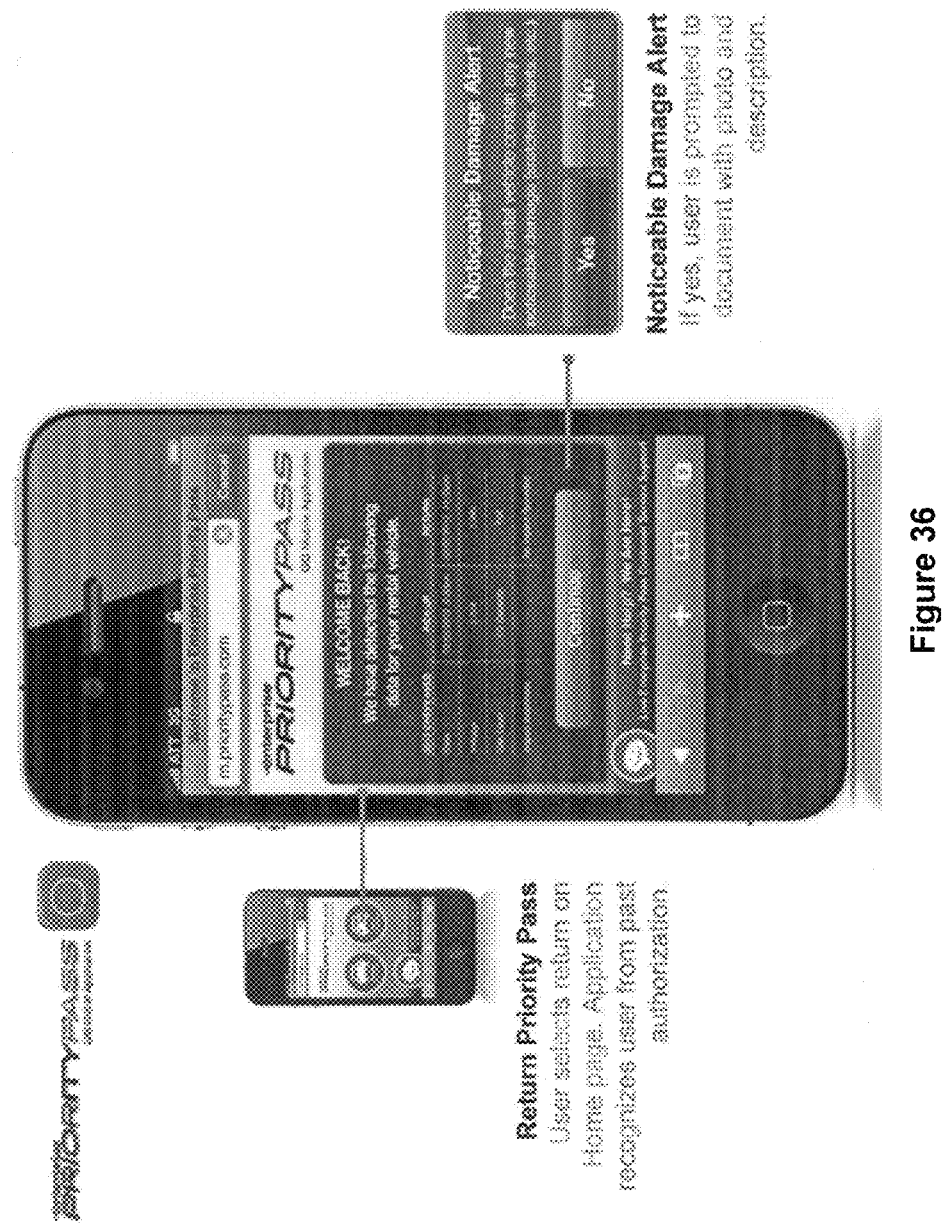

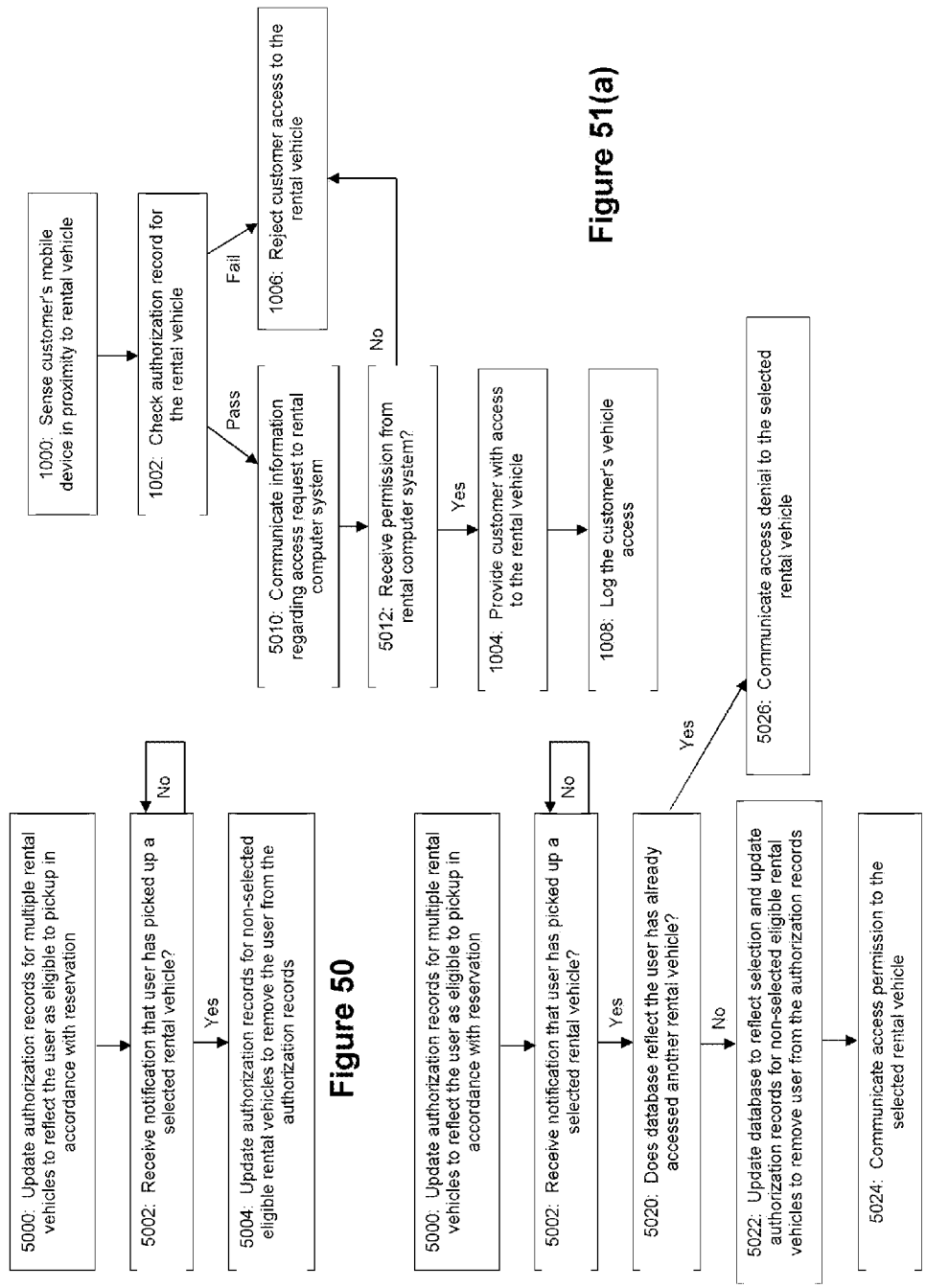

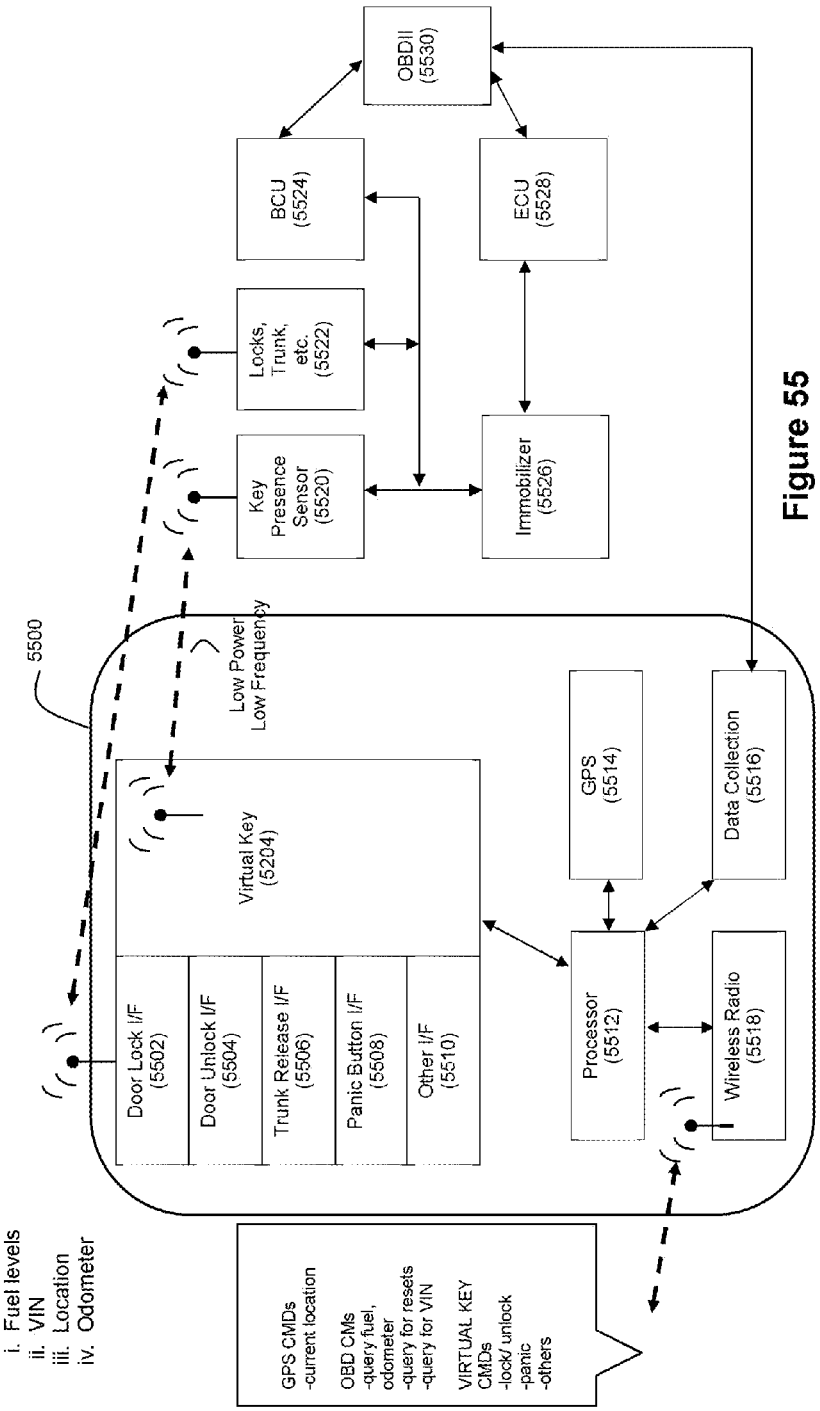

MOBILE DEVICE-ENHANCED USER SELECTION OF SPECIFIC RENTAL VEHICLES FOR A RENTAL VEHICLE RESERVATION

CROSS-REFERENCE AND PRIORITY CLAIM TO RELATED PATENT APPLICATION

This patent application claims priority to U.S. provisional patent application Ser. No. 61/784,227, filed Mar. 14, 2013, and entitled "Mobile-Device Enhanced Rental Vehicle Transactions", the entire disclosure of which is incorporated herein by reference.

INTRODUCTION

The inventors believe that room for improvement exists with respect to how portable computing devices (hereinafter "mobile devices") are leveraged to support rental vehicle transactions. Toward this end, the inventors disclose various embodiments whereby a wide variety of rental vehicle transactions can be supported by mobile devices in a manner more convenient and efficient to customers.

For example, the inventors disclose a method comprising permitting a customer with a rental vehicle reservation to select a specific rental vehicle for pickup in response to input from the customer via a mobile computing device associated with the customer. The method may further comprise enforcing a time limit on a customer's selection that requires the customer to pick up the selected rental vehicle within a specified time window. Moreover, the method may also comprise (1) presenting a list of specific rental vehicles that are available for pickup to the customer, (2) receiving a selection of a specific rental vehicle from the list in response to customer input through the mobile computing device, (3) determining whether the specific rental vehicle corresponding to the received selection is still available for pickup by the customer, (4) in response to a determination that the specific rental vehicle corresponding to the received selection is still available for pickup by the customer, placing a hold on the specific rental vehicle corresponding to the received selection.

In accordance with another exemplary aspect, the inventors disclose an apparatus comprising a processor configured to (1) access rental vehicle reservation data for a customer in response to input from a remote computer, (2) determine a rental vehicle class and a rental vehicle pickup location based on the accessed rental vehicle reservation data, (3) generate a list of specific rental vehicles within the determined rental vehicle class that are available for pickup at the rental vehicle pickup location, (4) communicate data representative of the list to the remote computer for display thereon, (5) receive further input from the remote computer indicative of a selection of a specific rental vehicle from the list, and (6) place a hold on the specific rental vehicle corresponding to the received selection to permit a pickup by the customer of the specific rental vehicle corresponding to the received selection.

Further still, the inventors disclose an apparatus comprising a mobile computing device, the mobile computing device configured to (1) receive data from a remote rental vehicle reservation computer system, the received data being indicative of a plurality of specific rental vehicles available for pickup by a customer in accordance with a rental vehicle reservation of the customer, (2) generate a graphical user interface (GUI) screen for display to the customer, the GUI being configured to present a list of the available specific rental vehicles, (3) receive a selection of a specific rental vehicle from the list from the customer through the GUI screen, and (4) communicate the selection to the remote rental vehicle reservation computer system.

In accordance with yet another exemplary aspect, the inventors disclose a computer program product comprising a mobile application, the mobile application comprising a plurality of processor-executable instructions that are resident on a non-transitory computer-readable storage medium, the instructions configured to (1) receive data from a remote rental vehicle reservation computer system, the received data being indicative of a plurality of specific rental vehicles available for pickup by a customer in accordance with a rental vehicle reservation of the customer, (2) generate a graphical user interface (GUI) screen for display to the customer, the GUI being configured to present a list of the available specific rental vehicles, (3) receive a selection of a specific rental vehicle from the list from the customer through the GUI screen, and (4) communicate the selection to the remote rental vehicle reservation computer system.

Also disclosed herein are embodiments whereby rental vehicles can be configured to support automated self-rental without a need to distribute any keys to renters. With such embodiments, machine-sensible items such as mobile devices can be used to effectively replace the role of keys for rental vehicles, including not only door lock/unlock function but also vehicle ignition function.

These and other features and advantages of the present invention will be apparent to those having ordinary skill in the art upon review of the teachings in the following description and drawings.

BRIEF DESCRIPTION OF THE DRAWINGS

FIG. 3 depicts an exemplary embodiment for a rental computer system.

FIG. 4(a) depicts an exemplary process flow for creating or activating a rental vehicle transaction via a mobile device.

FIG. 4(b) depicts an exemplary process flow for opening a rental contract for a rental vehicle transaction via a mobile device.

FIG. 4(c) depicts an exemplary process flow for ending a rental vehicle transaction via a mobile device.

FIGS. 36 and 37 depict exemplary GUI screens for display on a mobile device to support a return by a customer of a rental vehicle for a replacement rental vehicle reservation.

FIGS. 39(*e*) and (*f*) depict exemplary process flows for execution by a mobile device and a rental computer system respectively to support enrollment in a self-rent rental program via a mobile device.

FIG. 50 depicts an exemplary process flow for another embodiment that supports selection by a customer of a specific rental vehicle for pickup from among a plurality of rental vehicle options in accordance with a rental vehicle reservation.

FIGS. 51(*a*) and (*b*) depict additional exemplary process flows for yet another embodiment that supports selection by a customer of a specific rental vehicle for pickup from among a plurality of rental vehicle options in accordance with a rental vehicle reservation.

FIGS. 52-55 depict exemplary embodiments for a system that permits a customer to use a machine-sensible item such as a mobile device as a smart key for starting a rental vehicle.

DETAILED DESCRIPTION

Figure 1:
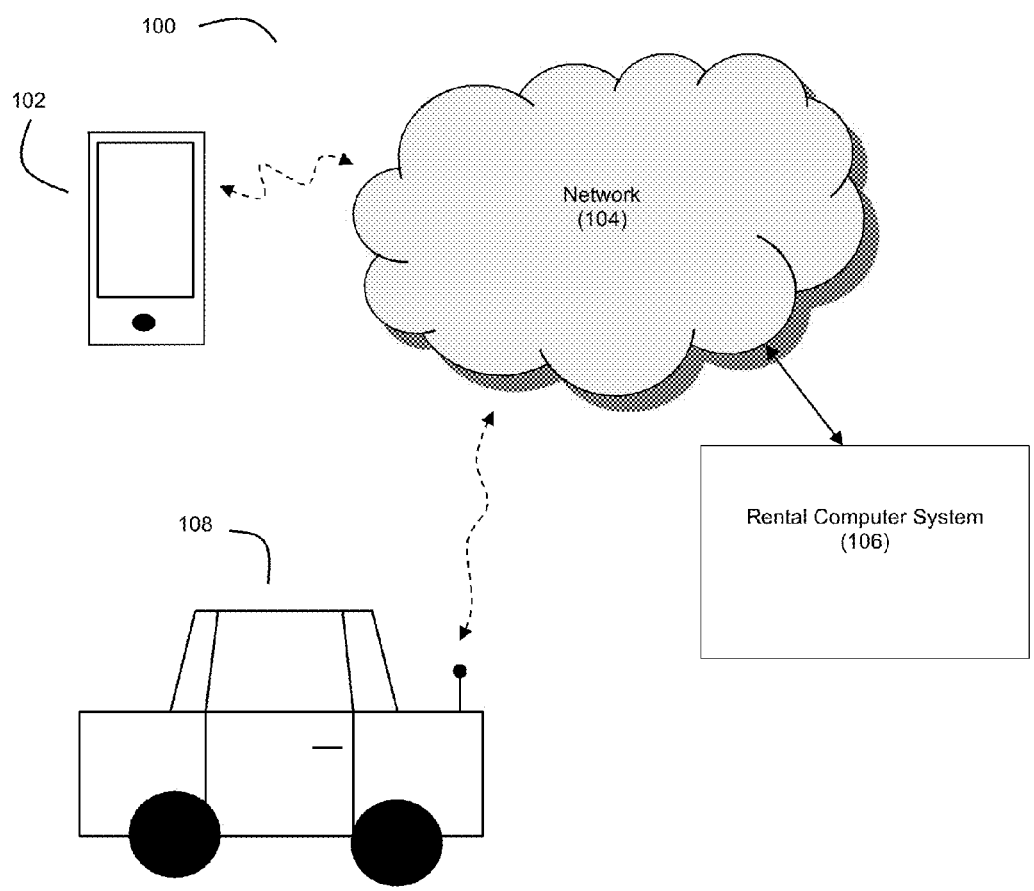
FIG. 1 depicts an exemplary system for an embodiment that employs mobile devices to streamline how rental vehicle transactions are conducted.

FIG. 1 depicts an exemplary system 100 for an embodiment that employs mobile devices to streamline how rental vehicle transactions are conducted. The system 100 may comprise at least one and preferably a plurality of mobile devices 102 in communication with a rental computer system 106 via a data communications network 104. The system 100 may further comprise at least one and preferably a plurality of rental vehicles 108, where these rental vehicles 108 are also configured to communicate with the network 104. Thus, the rental computer system 106 can be configured to communicate with the rental vehicles 108 via the network 104. Also, if desired by a practitioner, the mobile devices 102 can also be configured to communicate with the rental vehicles 108 via the network 104.

The mobile device 102 can be a smart phone (e.g., an iPhone, a Google Android device, a Blackberry device, etc.), tablet computer (e.g., an iPad), or the like. Furthermore, the mobile device 102 can be a position tracking-enabled mobile device. That is, the mobile device 102 can be configured to track its geographic position and communicate data regarding same to other computing devices (e.g., to rental computer system 106). The mobile device preferably employs a touchscreen or the like for interacting with a user. However, it should be understood that any of a variety of data display techniques and data input techniques could be employed by the mobile device. For example, to receive inputs from a user, the mobile device need not necessarily employ a touchscreen—it could also or alternatively employ a keyboard or other mechanisms.

Figure 2A:
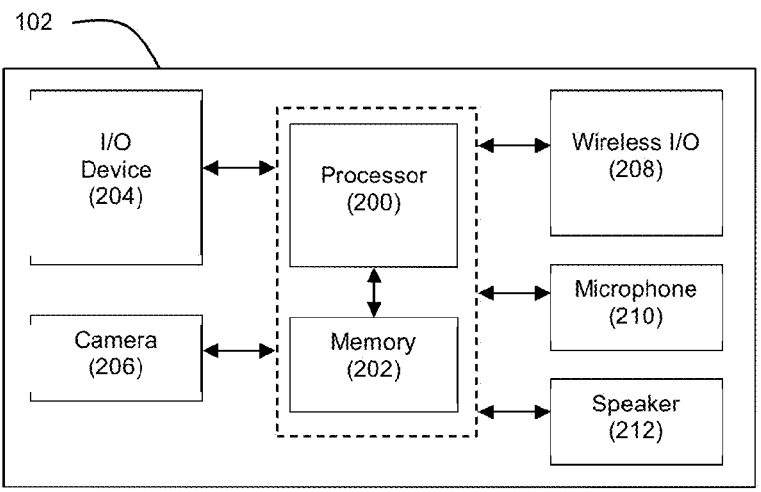
FIG. 2(a) depicts an exemplary embodiment for a mobile device.

FIG. 2(*a*) depicts an exemplary embodiment for a mobile device 102. The mobile device 102 may comprise a processor 200 and associated memory 202, where the processor 200 and memory 202 are configured to cooperate to execute software and/or firmware that supports operation of the mobile device 102. Furthermore, the mobile device 102 may include an I/O device 204 (e.g., a touchscreen user interface for graphically displaying output data and receiving input data from a user), a camera 206, wireless I/O 208 for sending and receiving data, a microphone 210 for sensing sound and converting the sensed sound into an electrical signal for processing by the mobile device 102, and a speaker 212 for converting sound data into audible sound. The wireless I/O 208 may include capabilities for making and taking telephone calls, communicating with nearby objects via near field communication (NFC), communicating with nearby objects via RF, and/or communicating with nearby objects via BlueTooth. These components are now resident in many standard models of smart phones and other mobile devices.

Figure 2B:
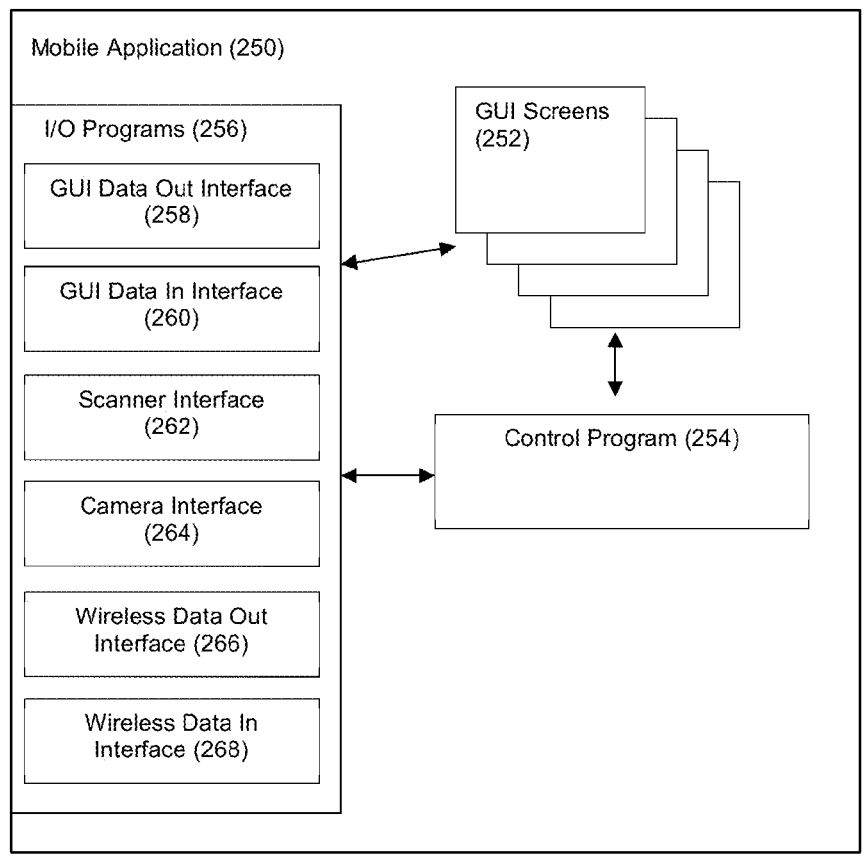
FIG. 2(b) depicts an exemplary architecture for a mobile application executed by a mobile device.

FIG. 2(b) depicts an exemplary mobile application 250 for an exemplary embodiment. Mobile application 250 can be installed on the mobile device 102 for execution by processor 200. The mobile application 250 preferably comprises a plurality of computer-executable instructions resident on a non-transitory computer-readable storage medium such as a computer memory. The instructions may include instructions defining a plurality of GUI screens for presentation to the user through the I/O device 204. The instructions may also include instructions defining various I/O programs 256 such as:
- a GUI data out interface 258 for interfacing with the I/O device 204 to present one or more GUI screens 252 to the user;
- a GUI data in interface 260 for interfacing with the I/O device 204 to receive user input data therefrom;
- a scanner interface 262 for interfacing with a scanner that is either built-in or attached to the mobile device to communicate instructions to the scanner for capturing scanned data and to receive scanned data corresponding to a scanned item from the scanner (examples of scanners that may be employed include a credit card scanner, a driver's license scanner, a bar code scanner, and/or a QR code scanner);
- a camera interface 264 for interfacing with the camera 206 to communicate instructions to the camera 206 for capturing an image in response to user input and to receive image data corresponding to a captured image from the camera 206;
- a wireless data out interface 266 for interfacing with the wireless I/O 208 to provide the wireless I/O with data for communication over the network 104; and
- a wireless data in interface 268 for interfacing with the wireless I/O 208 to receive data communicated over the network 104 to the portable computing device for processing by the mobile application 250.

The instructions may further include instructions defining a control program 254. The control program can be configured to provide the primary intelligence for the mobile application 250, including orchestrating the data outgoing to and incoming from the I/O programs 256 (e.g., determining which GUI screens 252 are to be presented to the user).

The network 104 can be any data communications network capable of supporting communications between the rental computer system 106 and mobile devices 102 as well as communications between the rental computer system 106 and rental vehicles 108, wherein at least a portion of the data communication is wireless data communication as shown in FIG. 1. It should be understood that network 104 may comprise multiple data communication networks that interconnect to form a larger network. The network 104 may be public, private, or a mix of public and private networks.

The rental computer system 106 can be a server or collection of servers that are configured to support rental vehicle transaction processing as described herein. The rental computer system 106 can be operated by a rental vehicle service provider such as a rental car company. However, it should be understood that other entities may operate the system. FIG. 3 depicts an exemplary embodiment of the rental computer system 106. The system 106 may comprise a processor 300 and associated memory 302, where the processor 300 and memory 302 are configured to cooperate to execute software that performs transaction processing as described herein. A memory in the form of database 308 may be configured to store various data structures representative of rental vehicle reservations and the customers for same. The system 106 may further comprise one or more I/O interfaces (e.g., I/O interfaces 304 and 306 for communicating via wireless RF and Internet links, respectively). It should be understood that FIG. 3 is exemplary only, and a practitioner may distribute the processing tasks described herein among numerous processors as well as distribute the data storage tasks described herein among numerous databases. Examples of rental car computer systems that can be employed for this purpose are described in U.S. Pat. Nos. 7,275,038, 7,899,690, 8,108,231, 8,160,906, 8,160,907, 8,234,134, 8,340,989, and 8,374,894, U.S. Pat. App. Pubs. 2003/0125992, 2004/0039612, 2005/0091087, 2007/0174081, 2007/0198311, 2007/0239494, 2007/0260496, 2007/0271124, 2007/0271125, 2007/0294116, 2008/0097798, 2008/0162199, 2008/0243562, 2008/0243563, 2008/0249814, 2009/0030747, 2010/0023352, 2010/0106608, and 2010/0106623, and published PCT patent application WO 02/057873, the entire disclosures of each of which are incorporated herein by reference.

FIGS. 4(a)-(c) describe exemplary process flows that can be executed by the processor 300 of the rental computer system to support various rental vehicle transactions.

FIG. 4(a) depicts an exemplary process flow for execution by the rental computer system to create or activate a rental vehicle transaction via communications over network 104 with a mobile device 102. Step 400 may involve communicating data to the mobile device 102 via network 104 to populate various GUI screens on the mobile device 102 with information such as rental vehicle reservation options. The step 400 may also involve the rental computer system 106 receiving customer information for a reservation transaction from the mobile device 102. At step 402, the rental computer system 106 can store data representative of the rental vehicle transaction in database 308.

FIG. 4(b) depicts an exemplary process flow for execution by the rental computer system to open a rental contract for a rental vehicle transaction. As is well understood, rental vehicle service providers typically require that customers become a party to a rental contract with the rental vehicle service provider in order for the customer to pick up a rental vehicle in accordance with a reservation. Simply having a rental vehicle reservation does not entitle the customer to pick up a rental vehicle. At step 410, the rental computer system communicates data to the mobile device 102 via network 104 to populate various GUI screens on the mobile device 102, where these screens are configured to solicit input from the customer for creating a rental contract from a reservation. Examples of GUI screens and process flows that can be used by step 410 for such rental contract creation are described in U.S. Pat. App. Pubs. 2007/0198311, 2010/0106608, and 2010/0106623 and published PCT patent application WO 02/057873, the entire disclosures of each of which are incorporated herein by reference. Once a rental contract is in place, the rental computer system 106 can also interact with the mobile device 102 to open the rental contract. As used herein, a rental contract is said to be open during the time from when the customer has actually picked up the rental vehicle to the time when the customer has returned control of the rental vehicle to the rental vehicle to the rental vehicle service provider. At step 412, the rental computer system 106 can store data representative of the opened rental contract in database 308.

FIG. 4(c) depicts an exemplary process flow for execution by the rental computer system to administer the return of a rental vehicle and end the corresponding rental vehicle transaction. When it comes time for a customer to end his or her rental of a rental vehicle, the rental computer system 106 can communicate at step 420 with the mobile device 102 via network 104 to populate various GUI screens on the mobile device 102, where these screens are configured to solicit input from the customer for scheduling a return of the rental vehicle. In response to inputs from the mobile device 102, the rental computer system 106 can store data representative of the return information and transaction completion in database 308.

Additional aspects of the process flows of FIGS. 4(a)-(c) are described below with reference to exemplary embodiments.

It should be understood that the rental vehicle transactions supported by FIGS. 4(a)-(c) and other embodiments described herein can include not only conventional retail rental vehicle reservations (including incremental rental vehicle reservations) but also replacement rental vehicle reservations. Drivers whose regular vehicles are disabled as a result of accidents or otherwise will often need to engage a rental vehicle while their regular vehicles are being repaired. As the term is used herein, a vehicle may become disabled by either the driver having had an accident, thereby causing damage for a repair facility (e.g., body shop, mechanic, etc.) to fix, or simply through mechanical failure, maintenance, or other similar desires or needs for changes requiring the custody of the vehicle to be relinquished to a repair facility. In many instances, an insurance company, automobile dealer, or fleet company will provide a rental vehicle to such drivers as part of the services provided through automobile insurance policies, dealer service policies, or fleet service policies. Such rental vehicles are referred to herein as "replacement rental vehicles" or "replacement vehicles". Replacement rental vehicles represent an important source of business for rental vehicle service providers given the large volumes of drivers whose regular vehicles become disabled as a result of accidents, mechanical breakdowns, and other causes.

In this business chain, there are four primary parties—the first is the driver (or customer) whose vehicle becomes disabled (thereby creating a need for a replacement rental vehicle), the second is the purchaser of rental vehicle services who books a rental vehicle reservation on behalf of the driver (typically an insurance company, automobile dealer, etc.), the third is the rental vehicle service provider with which the purchaser books the rental vehicle reservation, and the fourth is the repair facility where the driver's disabled vehicle is repaired.

In a typical replacement rental scenario, a driver whose regular vehicle has become disabled (e.g., the driver has had an accident) notifies the purchaser (e.g., the driver's insurance company) of his/her need for a replacement rental vehicle. The purchaser then books a reservation for a replacement rental vehicle with a rental vehicle service provider. Oftentimes, this reservation is consummated when the driver drops his/her disabled vehicle off at the repair facility. An employee of the rental vehicle service provider who has been notified of the booked reservation will meet the driver at the repair facility to provide the driver with the replacement rental vehicle. At this time, the rental vehicle service provider employee will fill out rental contract paperwork with the driver for the replacement rental vehicle, and if the terms are agreeable to the driver, the driver signs the rental contract paperwork to form a rental contract with the rental vehicle service provider.

Another common scenario is that an employee of the rental vehicle service provider will pick the driver up from the repair facility to take the driver to a nearby rental vehicle branch location. From the rental vehicle branch location, the driver and rental vehicle service provider employee can then fill out the rental contract paperwork to form the rental contract. In either event, once the rental contract paperwork has been filled out and signed, the driver is enabled to pick up his/her replacement rental vehicle.

Figure 5:
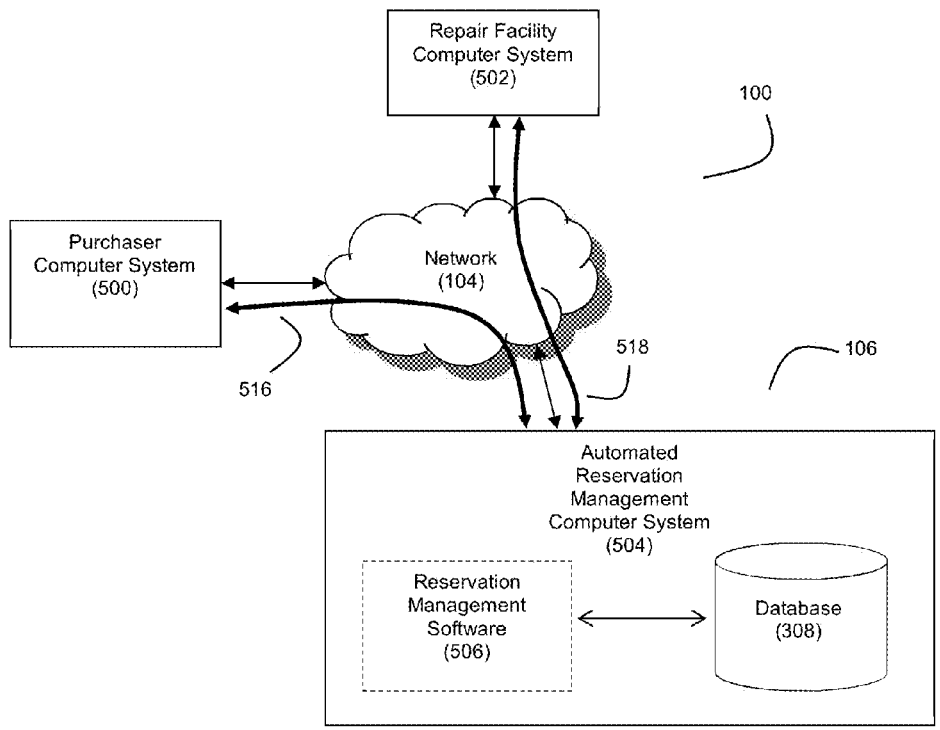
FIG. 5 depicts an exemplary system for creating and managing replacement rental vehicle reservations.

The inventors have sought to improve the efficiency of this process through intelligent leveraging of mobile devices as described herein (see, for example, the embodiments described in connection with FIGS. 13-37). FIG. 5 depicts an exemplary system through which replacement rentals can be managed. That rental computer system 106 can include an automated reservation management computer system 504, where the automated reservation management computer system 504 comprises reservation management software 506 and a database, which forms at least a portion of database 308, in which replacement rental vehicle reservation transactions are stored. A purchaser computer system 500 can access the reservation management software 506 via a network 104 (which may include the Internet (see bidirectional communication path 516)). Through the reservation management software 506, a user of the purchaser computer system 500 can create and manage a plurality of replacement rental vehicle reservations on behalf of drivers/customers whose ordinary vehicles are undergoing repair at a repair facility. The management functionality provided by the system 500 can be employed to take management actions on rental vehicle reservations throughout all operational activity phases of rental vehicle reservations, including a reservation phase (starting from the time of reservation creation until a rental contract is opened), an open rental contract phase (starting from rental contract opening until rental vehicle return to close the rental contract), and a closed rental contract phase (for after the rental vehicle has been returned by the driver). A repair facility computer system 502 can also be in communication with the automated reservation management computer system 504 via the network 104 (see the bidirectional communication path 518). The repair facility computer system 502 can be configured to communicate vehicle repair data to the automated reservation management computer system 504 for use in the management of replacement rental vehicle reservation transactions. Furthermore, as described herein, the repair facility computer system 504 can be configured to access the reservation management software 506 to manage the pick up process for replacement rental vehicles corresponding to replacement rental vehicle reservation transactions. An example of a suitable automated reservation management computer system 504 is the pioneering replacement rental vehicle reservation management system known as the ARMS® system operated by Enterprise, which is described in various patents and published patent applications such as: U.S. Pat. Nos. 7,275,038, 7,899,690, 8,160,906, 8,160,907, 8,340,989, and 8,374,894, and U.S. Pat. App. Pubs. 2007/0260496, 2007/0271125, 2007/0271124, 2008/0243562, 2008/0243563, 2008/0249814, 2003/0125992, 2005/0021378, 2005/0091087, 2008/0162199, 2008/0097798, 2007/0174081, 2008/0140460, 2010/0023352, and 2009/0030747, the entire disclosures of each of which being incorporated herein by reference.

Figure 6:
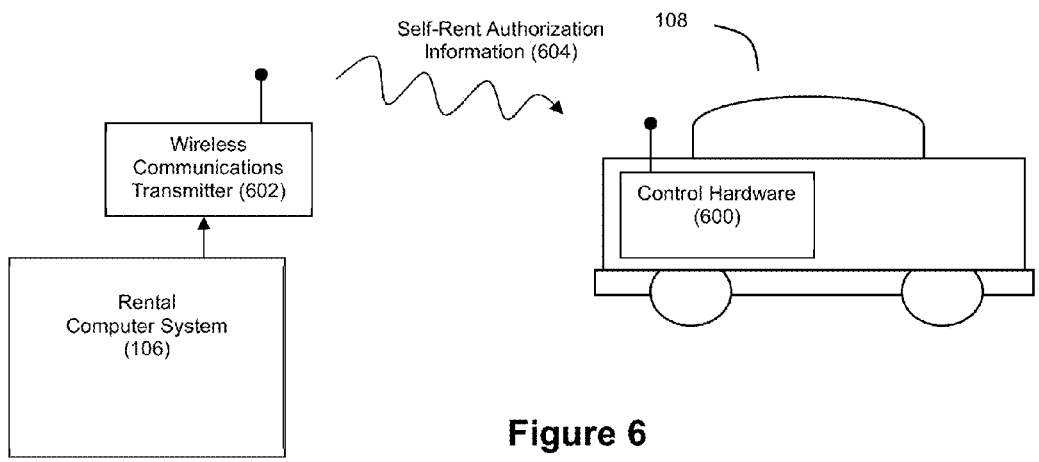
FIG. 6 depicts an exemplary system for a rental computer system to communicate with a self-rent rental vehicle.

It should further be understood that the rental vehicles underlying the rental vehicle transactions supported by FIGS. 4(a)-(c) and other embodiments described herein can include not only conventional rental vehicles (e.g., the standard vehicles for which personnel of a rental vehicle service provider provide keys to customers at the time of pickup), but also self-rent rental vehicles. This applies to both retail rental vehicle reservations and replacement rental vehicle reservations. In fact, the inventors believe that a significant synergy results from the combination of mobile device-enhanced rental vehicle transaction processing as described herein with self-rent rental vehicles because this combination is expected to provide dramatic improvements in efficiency and convenience for customers. A "self-rent" rental vehicle is rental vehicle configured with hardware and software that enables authorized customers to access and start the rental vehicle without directly interacting with other people (such as personnel of a rental vehicle service provider), including during the rental vehicle pickup process. With a self-rent rental vehicle, the customer will have an access device that is configured to be recognized by hardware and software installed in the self-rent rental vehicle to unlock and de-immobilize the self-rent rental vehicle. As described in embodiments herein, an example of such an access device can be the customer's mobile device 102. However, in other embodiments, this access device can take the form of equipment such as a fob having an embedded radio frequency identification (RFID) chip. A sensor installed in the self-rent rental vehicle can detect the customer's mobile device (or a code stored by the RFID chip on a fob) and determine whether the customer is authorized to access the self-rent rental vehicle based on the sensed information. Examples of self-rent rental vehicles are those vehicles available through the WECAR® rental service, wherein WECAR® is a registered trademark of Enterprise Holdings, Inc. of St. Louis, Mo. FIG. 6 depicts an exemplary system for a rental computer system 106 to communicate with a self-rent rental vehicle 108. The self-rent rental vehicle 108 includes control hardware 600 that permits the customer to access the rental vehicle using an access device such as his/her mobile device 102. Furthermore, the control hardware is configured to wirelessly receive data (e.g., via a wireless RF antenna or the like) communicated to it from a transmitter 602 (e.g., a wireless communications transmitter such as an RF antenna or the like). The rental computer system 106 can cause the transmitter 602 to broadcast authorization information 604 to the control hardware 600 on the self-rent rental vehicle 108. The control hardware 600 would then store this authorization information for use when determining whether a customer is entitled to access the vehicle.

1. Assessing Whether a Customer is a Licensed Driver

Figure 7A:
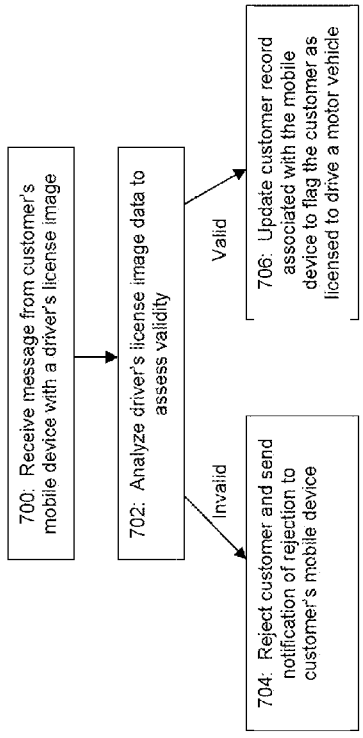
FIG. 7(a) depicts an exemplary process flow for assessing the validity of a driver's license via communications with a mobile device.

Rental vehicle service providers desire an ability to determine whether the customer who is to drive a rental vehicle is a licensed driver. That is, does the customer have a valid state driver's license? With conventional rental vehicle transactions, this assessment is made at a rental branch by personnel of a rental vehicle service provider. The customer is asked for his/her driver's license, and the employee of the rental vehicle service provider then makes an assessment as to whether he or she believes the license to be facially valid. However, it is desired for rental vehicle transactions involving self-rent rental vehicles to avoid any customer interaction with employees of a rental vehicle service provider. This raises the question of how to satisfy the desire for reviewing a customer's driver's license while permitting the customer to automate the rental vehicle pickup process. FIG. 7(a) depicts an exemplary process flow that provides a solution to this problem.

At step 700, the rental computer system receives a message from the customer's mobile device 102 that includes image data representative of the customer's driver's license. A user can employ the camera feature of a mobile device 102 to generate such image data. The user can also load an image of the driver's license onto the mobile device if desired.

At step 702, the rental computer system analyzes the driver's license image data to assess the validity of the driver's license. This operation may involve extracting text from the driver's license image data to obtain information such as the driver's name, address, and date of birth, the state of issuance for the driver's license, a driver's license number, date of expiration, etc. This operation may also involve extracting the patterns that appear in the image data to determine whether the extracted pattern conforms to the appearance of driver's licenses for a state (or for the state extracted from the license text if applicable). Suitable software from third party vendors that use image processing techniques to analyze the validity of driver's licenses can be used to perform step 702.

Figure 7B:
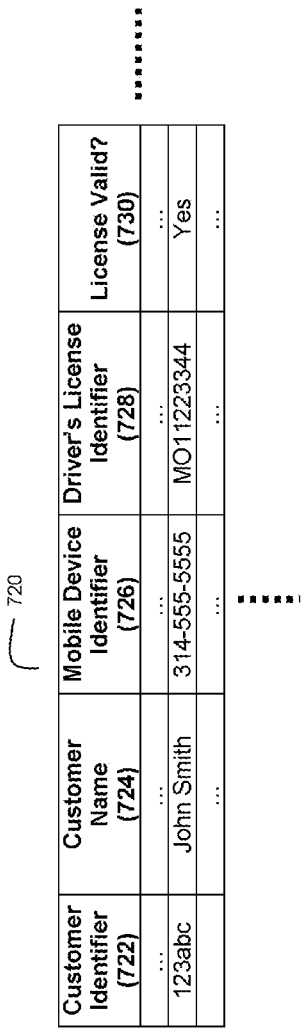
FIG. 7(b) depicts an exemplary data structure for a customer record to support mobility-based rental vehicle transactions.

If the extracted data from the driver's license fails to pass the conditions governing validity, then at step 704, the rental computer system rejects the customer and sends a notification of the rejection to the customer's mobile device 102. If the extracted data from the driver's license is deemed to pass the conditions governing validity, then at step 706, the rental computer system updates a customer record for the customer to reflect that the customer is licensed to drive a motor vehicle. FIG. 7(b) illustrates an exemplary customer record data structure 720 for this purpose. The data structure 720 preferably includes data fields in association with each other such as a customer identifier field 722 (which can be a unique string for identifying the customer in the rental computer system), a customer name field 724, a mobile device identifier field 726 (which can be for example a telephone number for the mobile device 102 or a unique identifier for the mobile device other than a telephone number), a driver's license identifier field 728 (which can be the extracted driver's license number), and a license validity flag field 730. Based on the outcome of step 702, field 730 can be set to indicate the customer as possessing a valid driver's license or not possessing a valid driver's license. The state of field 730 can then govern whether the customer is permitted to pick up a self-rent rental vehicle. It should be well understood that customer record 720 may include additional or different fields.

While the steps of FIG. 7(a) are described as being performed by the rental computer system, it should be understood that these steps or portions thereof could also be performed by some other third party computer system or by the mobile device 102 itself. In an example where a third party computer system performs the method steps (or at least step 702), such third party computer system can then communicate the output of either steps 704 or 706 to the rental computer system so the rental computer system can update its database. In an example where the mobile device 102 performs the method steps (or at least step 702), a mobile application resident on the mobile device can be configured to perform the steps with the output being communicated to the rental computer system.

Also, it should be understood that the customer record 720 can also include a field that identifies the extracted expiration date for the customer's driver's license. Logic can then be applied to either automatically change the validity flag field 730 when the current date falls after the expiration date or perform an expiration date check to assess validity when the customer later attempts to book a reservation or pick up a rental vehicle.

Figures 8A, 8B:
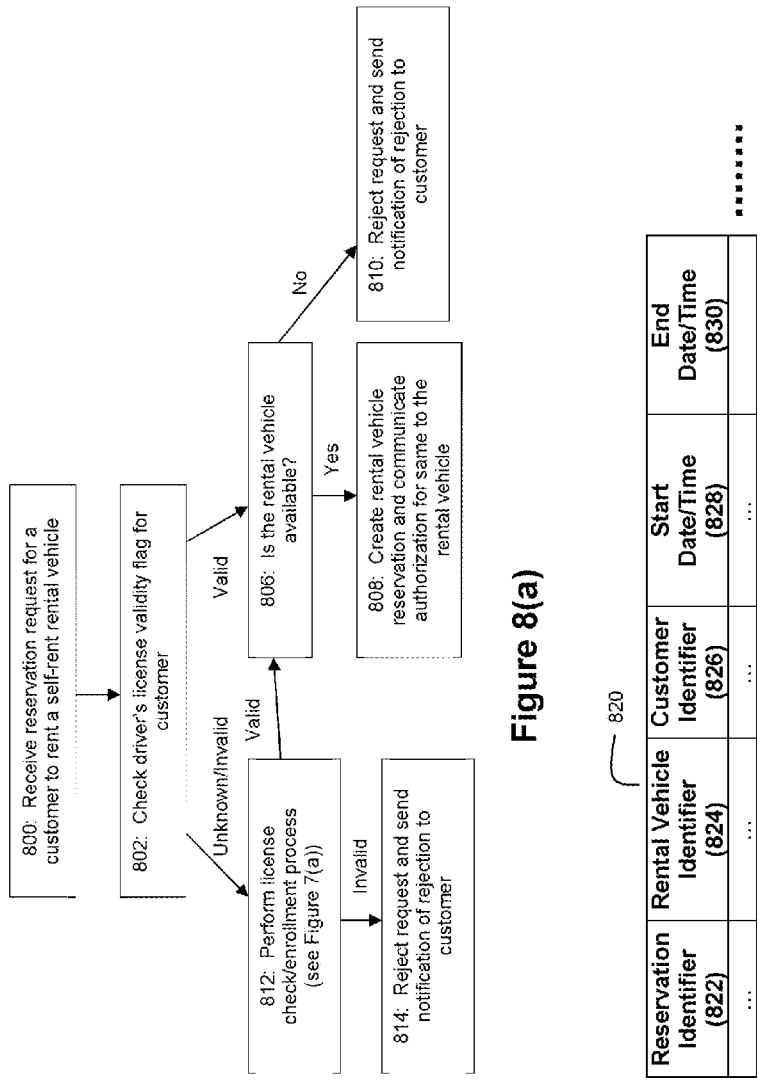
FIG. 8(a) depicts an exemplary process flow for creating a rental vehicle reservation for a self-rent rental vehicle via a mobile device.
FIG. 8(b) depicts an exemplary data structure for a reservation record to support mobility-based rental vehicle transactions.

2. Creating Rental Vehicle Reservations and Supporting Rental Vehicle Pickups FIG. 8(a) depicts an exemplary process flow for creating a rental vehicle reservation for a self-rent rental vehicle in a manner that leverages automated driver's license assessments. At step 800, the rental computer system receives a reservation request for the customer to rent a self-rent rental vehicle. This request can be received from the customer's mobile device, although that need not be the case (for example, the customer may make the request through a desktop computer via a website). The reservation request may include information such as the customer's name and address. If made via a mobile device, the request may include information such as the customer's name and a telephone number for the mobile device.

At step 802, the rental computer system retrieves the customer record 720 for the customer identified in the reservation request and checks the license validity flag field 730 in the customer record 720. If the license validity flag field 730 of the customer record indicates that the customer has already proven he or she is a validly licensed driver, then the process flow continues to step 806. If the license validity flag field 730 of the customer record indicates that the customer has not proven he or she is a validly licensed driver, then the process flow continues to step 812. At step 812, the rental computer system prompts the customer to provide an image of his/her driver's license to check validity (for execution of the process flow in FIG. 7(a)). If this execution of the FIG. 7(a) process flow results in a determination the customer has a valid driver's license, then the process flow proceeds to step 806. Otherwise, the rental computer system rejects the customer's reservation request and sends a notification of same to the customer (step 814).

In the example of FIG. 8(a), step 806 is reached after the rental computer system concludes that the customer has a valid driver's license. At step 806, the rental computer system proceeds to check whether a rental vehicle in accordance with the reservation request is available. It should be understood that step 806 may involve several rounds of communication between the customer and the rental computer system to obtain all necessary information for a reservation.

If step 806 results in a determination by the rental computer system that a rental vehicle is not available as per the reservation request, then at step 810, the rental computer system rejects the reservation request and notifies the customer re same.

If step 806 results in a determination by the rental computer system that a rental vehicle is available as per the reservation request, then at step 808, the rental computer system creates a rental vehicle reservation for the customer and communicates authorization instructions for the reservation to the reserved rental vehicle to enable automated pickup by the customer. FIG. 8(b) depicts an exemplary data structure for a reservation record that can be created as a result of step 808. The data structure 820 preferably includes data fields in association with each other such as a reservation identifier field 822 (which can be a unique string for identifying the particular rental vehicle reservation transaction), a rental vehicle identifier field 824 (which can be a unique string for identifying the particular rental vehicle), a customer identifier field 826 (which can be the unique string that identifies the customer for the reservation in the rental computer system), a start date/time field 828 (which can identify the date and time at which the rental vehicle becomes eligible for pickup by the customer), and an end date/time field 830 (which can identify the date/time that the reservation is scheduled to end). It should be understood that reservation records 820 can be joined with corresponding customer records via the customer identifier fields 826/722. It should also be well understood that reservation record 820 may include additional or different fields. The rental computer system can communicate the reservation record data structure 820 as well as the corresponding customer record data structure 720 to the self-rent rental vehicle for local storage in control hardware 600.

Figure 9:
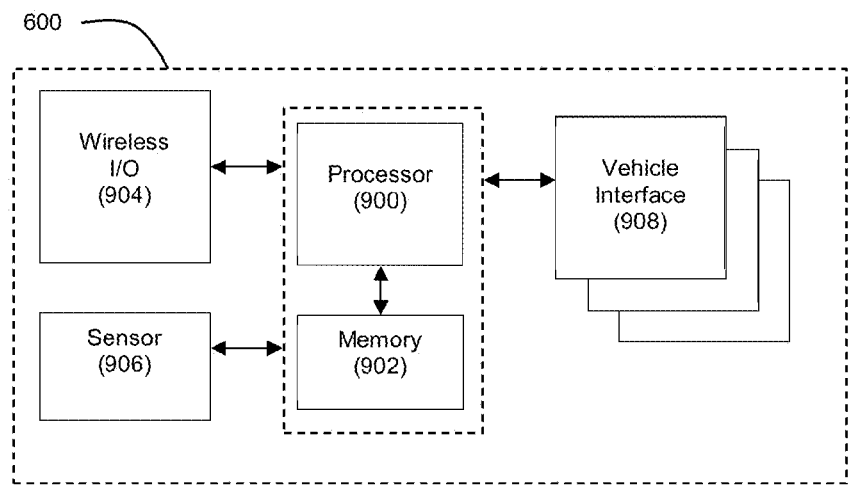
FIG. 9 depicts an exemplary system deployed in a rental vehicle to support self-rental capabilities.

FIG. 9 depicts an exemplary system for control hardware 600 that can be deployed in a rental vehicle 108 to support self-rental capabilities. The hardware system 600 may comprise a processor 900 and associated memory 902 that cooperate with each other to execute the operations described herein.

The wireless I/O component 904 can be configured to communicate wirelessly and bidirectionally with the rental computer system 106. For example, the processor 900 can receive the authorization information from the rental computer system 106 via wireless I/O 904 and store that authorization information in memory 902.

The sensor 906 can be configured to sense the customer's mobile device 102 via techniques such as NFC, RFID, BlueTooth, or the like. The sensor 906 is preferably positioned in a location on the rental vehicle which permits the customer to conveniently position the mobile device 102 nearby.

Vehicle interfaces 908 permit the hardware system 600 to communicate with vehicle subsystems such as the vehicle's system for locking/unlocking doors, the vehicle immobilizer to de-immobilize the vehicle, and/or the vehicle's ignition system to start the vehicle.

Figure 10:
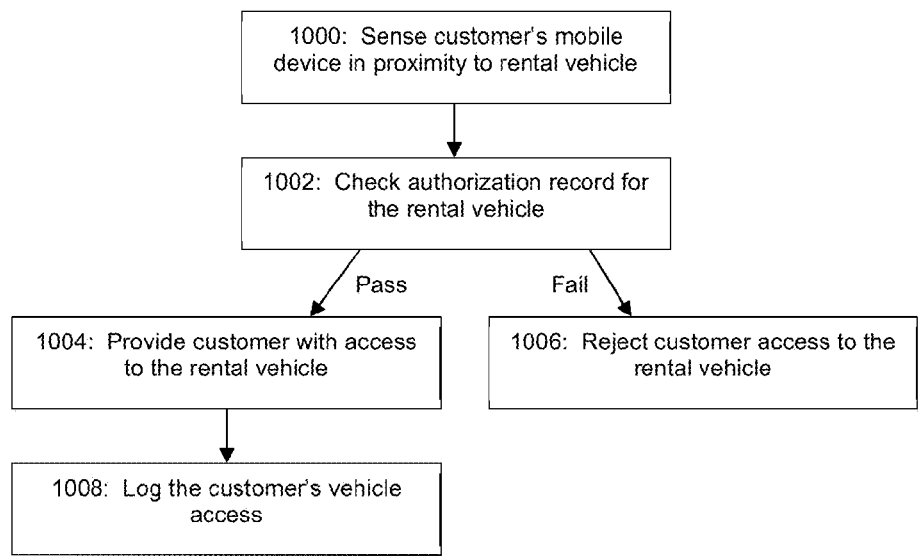
FIG. 10 depicts an exemplary process flow for execution by the rental vehicle system of FIG. 9 to support self-rental capabilities.

FIG. 10 depicts an exemplary process flow for execution by system 600 to support self-rental capabilities. At step 1000, the sensor 906 senses the customer's mobile device 102. The customer's mobile device 102 is configured to generate a signal sensible by sensor 906 where this signal contains information for uniquely identifying the mobile device 102, the customer associated with the mobile device 102, or a reservation for the customer associated with the mobile device 102 (for example, the same information that is present in fields 722 or 726 of the customer record 720 or field 822 of the reservation record 820). As noted above, this sensible signal and sensor may employ communication techniques such as NFC, RFID, BlueTooth, or the like.

At step 1002, the processor checks the authorization record for the rental vehicle in memory 902 to assess whether the customer associated with the mobile device 102 is authorized to pick up the rental vehicle. As indicated, the authorization record can comprise the combination of reservation record 820 and the customer record 720 for the customer associated with the reservation. Thus, the processor 900 can compare the sensed information with the mobile device identifier or customer identifier in the authorization record. If there is match, the processor 900 can conclude that the person bearing the mobile device 102 near the rental vehicle is the same as the customer for the reservation. The processor may also perform further authorization checks such as comparing a current date/time with the start date/time field 828 of the authorization record to assess whether the rental vehicle pickup by the customer is timely.

If the processor 900 determines that all of the authorization conditions are met, then at step 1004, the system can provide the customer with access to the rental vehicle. At minimum, this may involve the processor 900 instructing the vehicle to unlock the doors (via vehicle interface 908). In some embodiments, an ignition device (e.g., key or the like) may be left inside the vehicle for use by the customer once the customer gains access to the vehicle's interior (e.g., locating the ignition device in the glove box or locked compartment accessible via a code provided to the customer). In other embodiments, the system 600 may further instruct the vehicle to de-immobile the immobilizer and/or start the vehicle as described hereinafter. Next, at step 1008, the processor 900 logs the customer's vehicle access in memory 902.

If the processor 900 determines that not all of the authorization conditions are met at step 1002, the system can then reject customer access to the vehicle at step 1006. This may involve leaving the vehicle doors locked and leaving the immobilizer in an immobilizing state.

Figure 12:
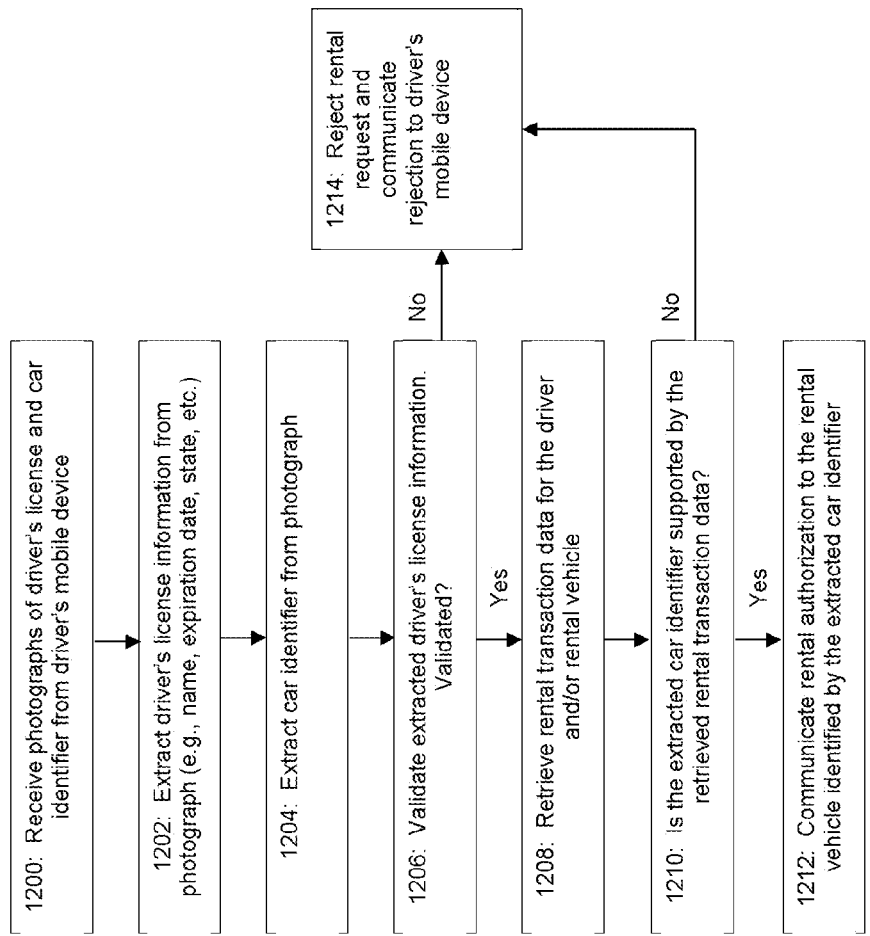
FIGS. 11 and 12 depict exemplary process flows for execution by a mobile device and a rental computer system respectively to support mobility-based pickups of self-rental rental vehicles without requiring the customer to have his or her driver's license pre-approved.
Figure 11:
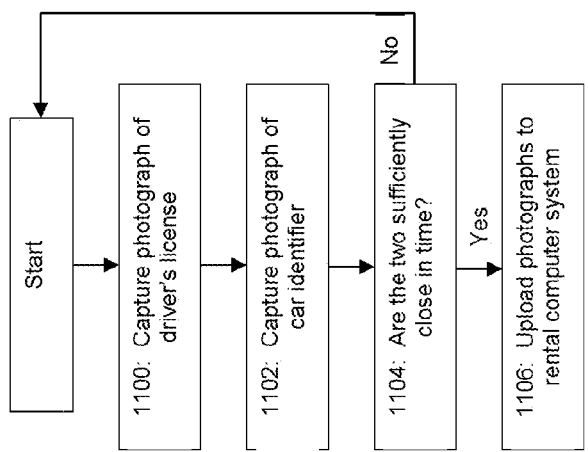

FIGS. 11 and 12 depicts exemplary process flows for execution by a mobile device and a rental computer system respectively to support mobility-based pickups of self-rental rental vehicles without requiring the customer to have his or her driver's license pre-approved. Thus, the process flows of FIGS. 11 and 12 can support "walk-up" rentals of self-rent rental vehicles or rental vehicle pickups where the driver's license verification is performed at the time of pickup rather than at the time of reservation booking.

FIG. 11 depicts an exemplary process flow for execution by a mobile device 102 via mobile application 250. At step 1100, the customer holds his/her driver's license in front of the mobile device's camera 206 and operates the mobile device to cause the camera to capture a photograph of the driver's license. The user can open the mobile application 250 where the mobile application 250 instructs the camera 206 to take the photograph in response to user input, or the user can capture the photograph outside the mobile application 250, but then use the mobile application to subsequently export the photograph to the rental computer system 106.

At step 1102, a similar procedure can be followed to capture a photograph of an identifier for the rental vehicle. For example, a bar code or QR code can be provided on the rental vehicle in a location easily photographed by the customer. The car identifier encoded by the bar code or QR code preferably matches the identifier used for the rental vehicle in field 824 of the reservation records 820.

At step 1104, the processor then determines whether the two photographs are sufficiently close in time to be deemed a contemporaneous pair. For example, the customer can be required to take the two photographs within 60 seconds (or some other time limit) of each other. If not sufficiently close in time, the process flow can return to start. Otherwise, the process flow proceeds to step 1106 where the mobile application instructs the mobile device to communicate the photographs to the rental computer system 106.

FIG. 12 depicts the complementary process flow for execution by the rental computer system 106. At step 1200, the rental computer system receives the photographs of the driver's license and car identifier from the mobile device 102.

At step 1202, the rental computer system extracts relevant information from the driver's license image data to enable validity checking as previously described in connection with step 702 of FIG. 7(*a*).

At step 1204, the rental computer system extracts the car identifier from the image data for the car identifier. This may involve processing a bar code or QR code image to convert such code to a character string.

At step 1206, the rental computer system analyzes the extracted driver's license data to assess validity (using techniques previously described in connection with step 702 of FIG. 7(*a*)). If the rental computer system concludes that the driver's license is invalid, then at step 1214, the rental computer system rejects the rental request by the customer and communicates this rejection to the customer's mobile device to notify re same. If the rental computer system concludes that the driver's license is valid, then the rental computer system proceeds to step 1208.

At step 1208, the rental computer system retrieves rental transaction data for the customer and/or rental vehicle. The rental computer system can retrieve all reservation records 820 that are keyed to the rental vehicle identified by the extracted car identifier (via field 824 of the reservation records).

In a true walk-up rental situation, there will not be a corresponding reservation record for the customer with respect to the rental vehicle. Thus, in the walk-up scenario, the rental computer system will check at step 1210 for any retrieved rental vehicle reservation records 820 with respect to the rental vehicle that are deemed to overlap with the desired rental by the walk-up customer. If there is no deemed overlap, then at step 1212, the rental computer system will communicate rental authorization information to the rental vehicle identified by the extracted car identifier to permit access and pickup by the customer if the customer has otherwise agreed to all necessary terms and conditions for renting the rental vehicle. Thus, the customer would then be able to access the rental vehicle by placing his/her mobile device 102 near sensor 908 to initiate the process flow of FIG. 10.

In a scenario where the customer had a pre-existing reservation, the rental computer system will check at step 1210 for congruence between the retrieved rental vehicle reservation and the information from the customer's mobile device. For example, the rental computer system can check for matches between:

The extracted name from the driver's license and the customer name field 724 of the customer record 720 associated with the retrieved reservation record 820, or a mobile device identifier that accompanied the transmission received at step 1200 with the mobile device identifier field 726 of the customer record 720 associated with the retrieved reservation record 820; and The extracted car identifier and the rental vehicle identifier field 824 of the retrieved reservation record 820.

The rental computer system at step 1210 can also check for a match between the current time and the reservation start date/time field 828 of the retrieved reservation record 820. The system can be configured to determine that a time match has occurred if the current time is within a specified tolerance of the time in the reservation start date/time field 828. If the reservation is deemed supported by the extracted information, then the rental computer system can proceed to step 1212 as noted above. Otherwise, the rental computer system can proceed to step 1214 as noted above.

It should be understood that a wide number of variations on the process flows of FIGS. 11 and 12 can be practiced. For example, rather than requiring that two photographs be taken, the user can be prompted to take a single photograph that includes both the driver's license and the car identifier. Toward this end, the car identifier can be provided on a location of the rental vehicle that is tailored to support proximal placement of the driver's license to permit easy photographing of the two. For example, a border shaped to accommodate expected sizes for a driver's license can be positioned next to the car identifier to facilitate this action. This would eliminate any need for step 1104. As another example, rather than step 1102 involving capturing a photograph of the car identifier, step 1102 can employ some other sensing technique to capture the car identifier. For example, RFID technology may be employed by which an RFID tag is present on the rental vehicle to uniquely identify the rental vehicle, and an RFID reader on the mobile device capture's the car identifier via RFID. In such an instance, the sensed RFID car identifier can then be communicated to the rental computer system for processing. As yet another example, the time proximity check of step 1102 can be performed by the rental computer system rather than the mobile device. Still further, the time proximity check can be performed between a time for the car identifier capture and the current time rather than between the driver's license capture and the car identifier capture. As yet another example, as previously noted, the intelligence for analyzing driver's license validity can be deployed in the mobile application rather than the rental computer system 106 if desired by a practitioner.

Furthermore, while the preceding process flows and descriptions are tailored for embodiments with respect to the rental of self-rent rental vehicles, it should be understood that similar techniques can be used to streamline and improve the rent process for other types of rental vehicles with a reduced role for personnel of a rental car company. For example, in some embodiments, a rental car company may choose to provide an automated key box or other kiosk arrangement at a location where rental vehicles can be picked up, and similar techniques can be employed to determine whether to provide a customer with access to a key for a rental vehicle from the automated key box or kiosk.

Figure 13:
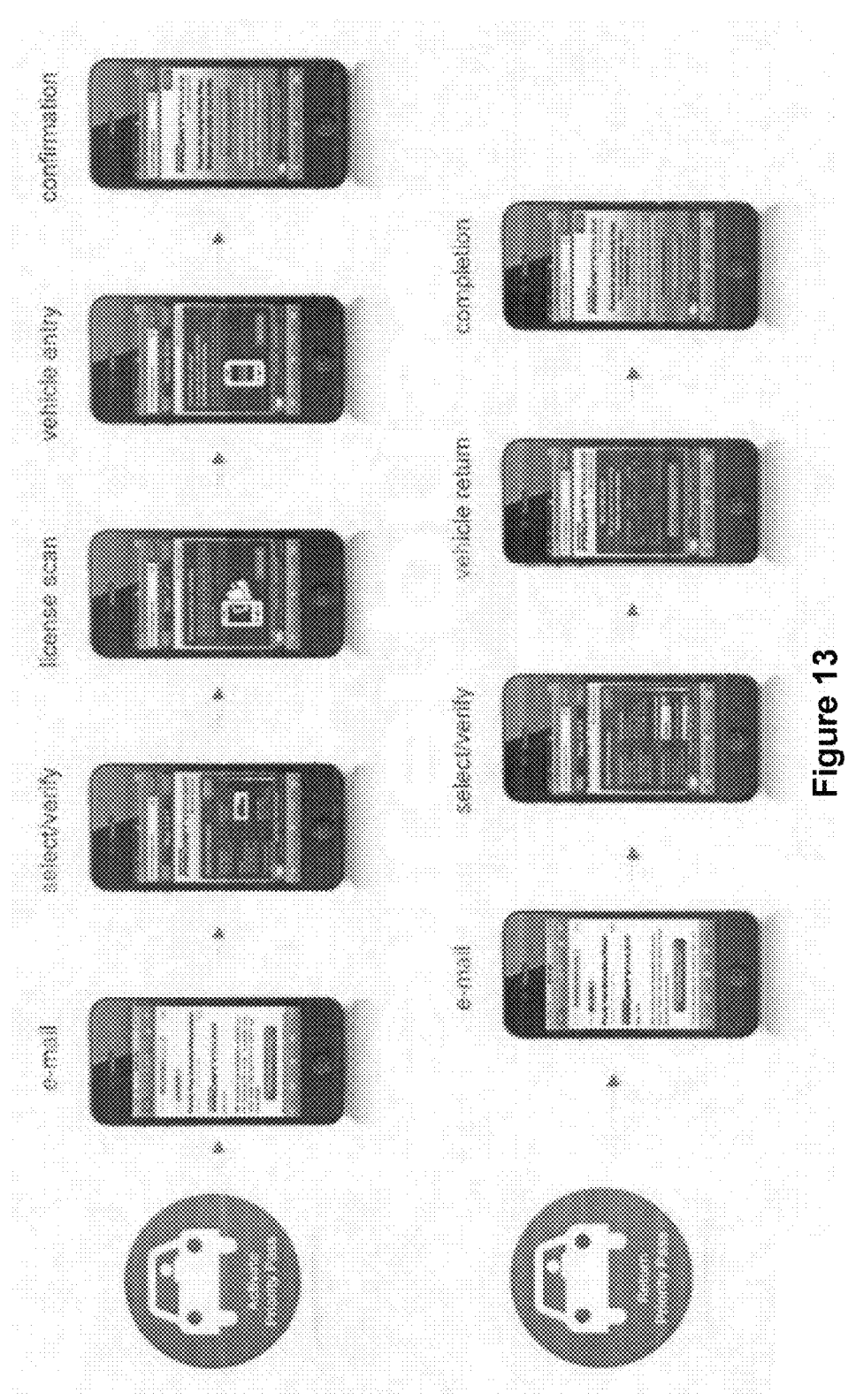
FIG. 13 depicts an exemplary process flow for a mobile device to support replacement rental vehicle reservations.

3. Exemplary Embodiment for Mobility-Enhanced Replacement Rental Vehicle Reservations FIG. 13 depicts a process flow for an exemplary embodiment whereby a mobile device is used to support replacement rental vehicle reservations. FIG. 13 categorizes the operations into two general groups—activating replacement rental vehicle reservations and returning rental vehicles for replacement rental vehicle reservations. Within the activation group, FIG. 13 shows tasks for (1) notifications to drivers about the replacement rental vehicle reservations, (2) selection and verification of information by the drivers for the replacement rental vehicle reservations, (3) driver's license scanning for the replacement rental vehicle reservations, (4) rental vehicle entry by the driver for the replacement rental vehicle reservations, and (5) confirmation regarding same. Within the return group, FIG. 13 shows tasks for (1) notifications to drivers about the repair work being completed to the driver's ordinary vehicle, (2) selection and verification of return information by the drivers for the replacement rental vehicle reservations, (3) rental vehicle return by the driver for the replacement rental vehicle reservations, and (4) confirmation regarding completion of the replacement rental vehicle reservations.

3a. Activating the Replacement Rental Vehicle Reservation

Figure 14:
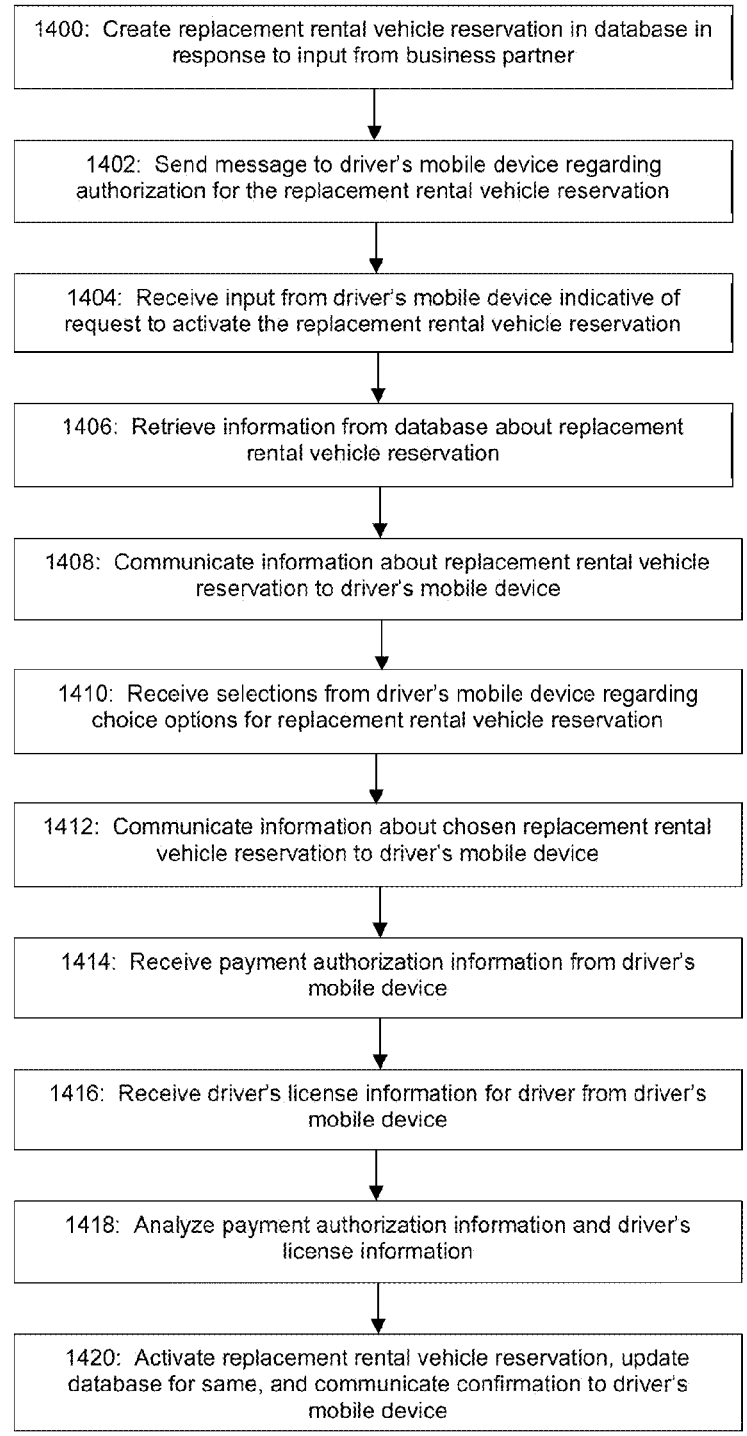
FIG. 14 depicts an exemplary process flow for a rental computer system to support replacement rental vehicle reservations.

FIG. 14 depicts an exemplary process flow for a rental computer system to support activation aspects of replacement rental vehicle reservations. With such an embodiment, the driver will have a mobile application 250 resident on his/her mobile device 102 that is configured to support the operations described herein. If no such mobile application 250 is resident on the mobile device 102, the driver can be prompted to download the appropriate mobile application 250 via the message discussed below with respect to step 1402. At step 1400, a replacement rental vehicle reservation for a driver is created and stored in the database 308. This replacement rental vehicle reservation can be created in response to input from a business partner of a rental vehicle service provider (such as an insurance company). The business partner can use a system such as the automated reservation management computer system 504 to create such replacement rental vehicle reservation.

Figure 15A:
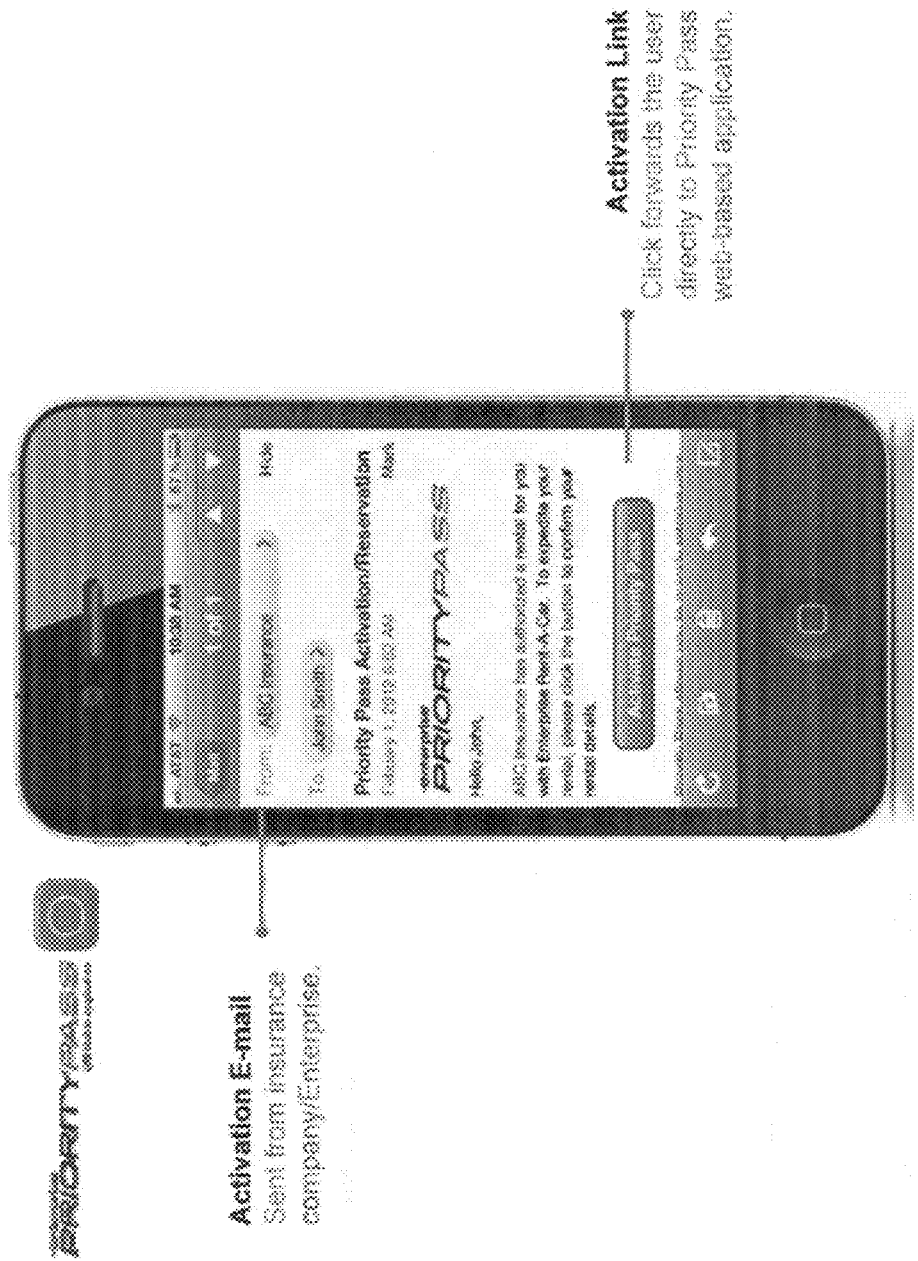
FIGS. 15(*a*)-23 depict exemplary graphical user interface (GUI) screens for display on a mobile device to support activation of a replacement rental vehicle reservation.
Figure 15B:

At step 1402, a message is sent to the driver's mobile device 102 to notify the driver that he/she has been authorized to pick up a replacement rental vehicle in accordance with the created replacement rental vehicle reservation. This notification can take the form of an email (see FIG. 15(*a*)) to an email address for the driver. However, it should be understood that the message can also take other forms such as a text message to the driver's mobile device. As shown in FIG. 15(*a*), the message can include instructions prompting the driver to initiate an activation process for the created replacement rental vehicle reservation. The message can further include a user-selectable item (e.g., "Activate Priority Pass" button as shown in FIG. 15(*a*)) to start the activation process. Further still, the message can include an activation code for use by the driver as explained below. Thus, it should be understood that the reservation record data structure 820 that exists for the replacement rental vehicle reservation can also include a field that identifies the activation code associated with that replacement rental vehicle reservation. Moreover, it should be understood that the message could also include a selectable deep-link URL that includes the authorization code. It should further be understood that step 1402 can be performed by the rental computer system or by a computer system associated with the business partner of the rental vehicle service provider who booked the replacement rental vehicle reservation (e.g., an insurance company).

Figure 16:
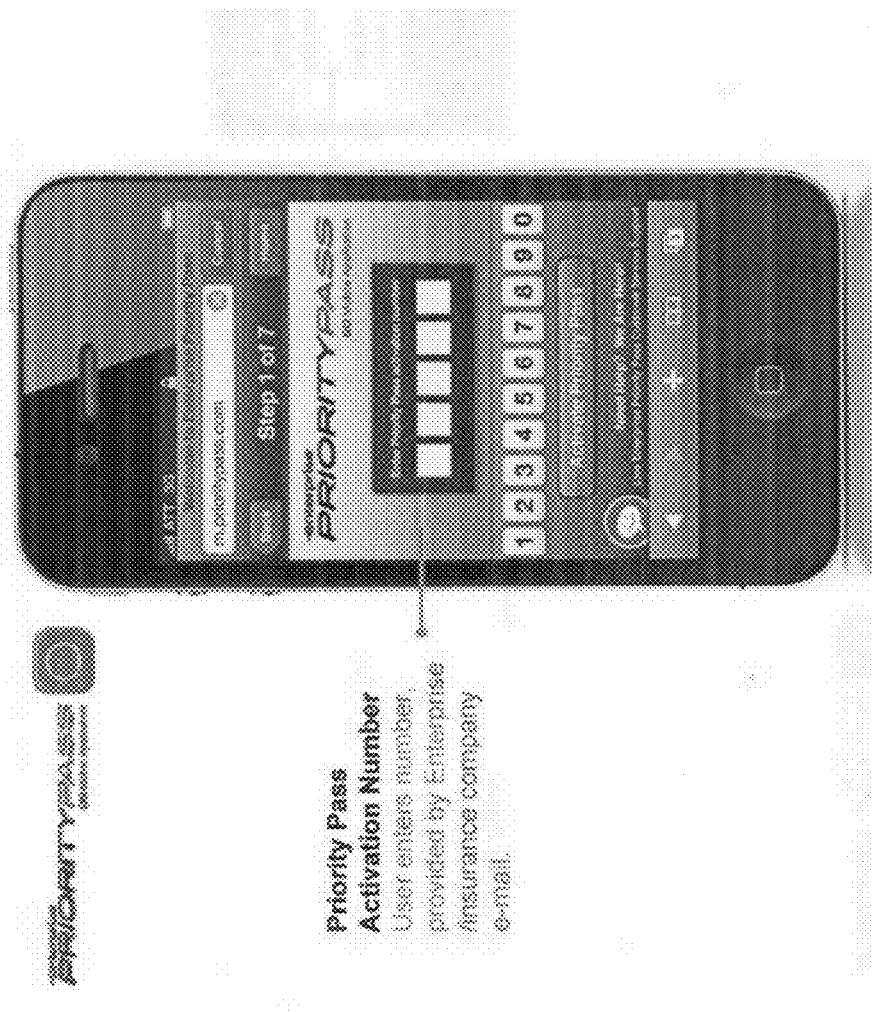
Figure 17:
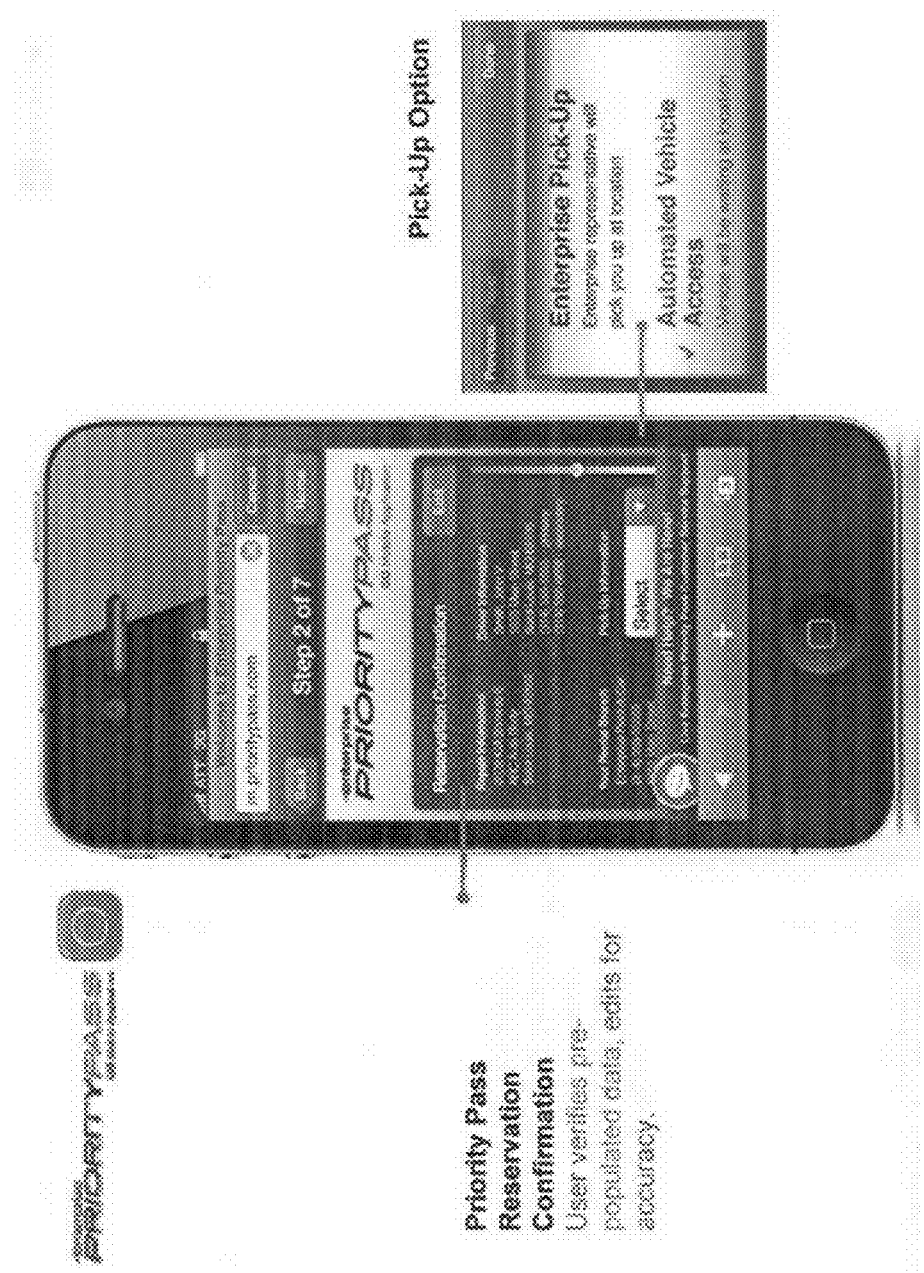

Upon selection by the driver of the "Activate Priority Pass" button as shown in FIG. 15(*a*), the mobile device 102 can navigate the driver to the mobile application's GUI screen of either FIG. 15(*b*) or 16. FIG. 15(*b*) is a home screen of the mobile application 250, and includes a user-selectable "Activate Priority Pass" button. FIG. 16 is a GUI screen of the mobile application 250 that is configured to solicit the activation code from the driver. If the landing page from the message of FIG. 15(*a*) is the home screen of FIG. 15(*b*), the landing page from user-selection of the "Activate Priority Pass" button of FIG. 15(*b*) can be the GUI screen of FIG. 16. Alternatively, the driver can also be provided with an ability to access the GUI screen of FIG. 16 starting from the home page (FIG. 15(*b*)) of the mobile application 250 rather than starting from the message shown in FIG. 15(*a*). From the GUI screen of FIG. 16, the driver can input the activation code for the replacement rental vehicle reservation, whereupon the mobile application 250 is configured to communicate this activation code to the rental computer system 106 to be checked for correctness (or the mobile application can be configured to check the correctness of the authorization code locally if the correct authorization code is provided to the mobile application for this purpose).

At step 1404, the rental computer system receives input from the driver's mobile device 102 that is indicative of a request to activate the replacement rental vehicle reservation. This input may take the form of the activation code entered via the GUI screen of FIG. 16. Then, at step 1406, the rental computer system retrieves the record for the driver's replacement rental vehicle reservation from database 308 based on the received activation code. Next, at step

Figure 18:

1408, the rental computer system communicates data about the retrieved replacement rental vehicle reservation to the driver's mobile device for populating various GUI screens of the mobile application 250. For example, as shown in the GUI screen of FIG. 17, this data may include details for the replacement rental vehicle reservation (e.g., repair information about the driver's ordinary vehicle undergoing repairs such as the name and address of the repair facility for such repairs, driver information (e.g., name, address, and telephone number), information about the replacement rental vehicle reservation, etc.). The GUI screen of FIG. 17 can also be configured to solicit a selection by the driver of a pickup mode for the reservation—for example, conventional pickup that involves human interaction or an automated rental vehicle pickup of a self-rent rental vehicle. In this example, we will presume the driver selects the automated pickup mode. Another exemplary GUI screen for this portion of the process is shown in FIG. 18. FIG. 18 shows how the mobile application can be configured to solicit a selection by the driver of a rental vehicle for pickup from among a plurality of rental vehicles for pickup in accordance with the replacement rental vehicle reservation. The GUI screen can display rental vehicles by class and price. Furthermore, the rental computer system can be configured to restrict the choices presented to the driver to only those available rental vehicles whose class and/or price falls within a range authorized by the business partner for the replacement rental vehicle reservation. Alternatively, the rental computer system can be configured to list all available rental vehicles for selection but highlight those rental vehicles that fall within the authorization set by the business partner. In such an instance, should the driver select a rental vehicle outside the authorization, the driver can be notified and given an option to pay for the difference himself or herself.

Figure 19:

At step 1410, the rental computer system receives selections from the driver's mobile device that were made with respect to the choice options that had been presented to the driver. These selections may comprise a particular rental vehicle (or particular group of rental vehicles such as a rental vehicle class) and a pickup mode (which as noted above will be an automated pickup mode for the purposes of this example). Next, at step 1412, the rental computer system communicates information about the driver's chosen selections to the mobile device for populating a verification GUI screen on the mobile device. FIG. 19 depicts an exemplary verification GUI screen in this regard.

Figure 20:

If the driver verifies the information on the GUI screen of FIG. 19, the mobile application can navigate the driver to the GUI screen of FIG. 20. The GUI screen of FIG. 20 is configured to solicit payment information from the driver (e.g., for payment by credit card, debit card, PayPal, or the like). This payment information may be needed for the purposes of (1) paying for the replacement rental vehicle reservation or a portion thereof if the business partner has not picked up the full cost and/or (2) placing a hold on the driver's credit card should he or she keep the rental vehicle beyond the authorized time period. The GUI screen of FIG. 20 can be configured to solicit information such as a credit card type and credit card number (or a confirmation regarding same if the customer already has such information on file with the rental vehicle service provider). Further still, if the driver's mobile device is equipped with a scanner for a credit card (either integrated into the mobile device or as an attachment), the driver can swipe his/her credit card through the scanner rather than manually enter the credit card information. After receipt of the driver's payment information, the mobile device can communicate this payment information to the rental computer system. Then, at step 1414, the rental computer system can receive this payment information.

Figure 21:
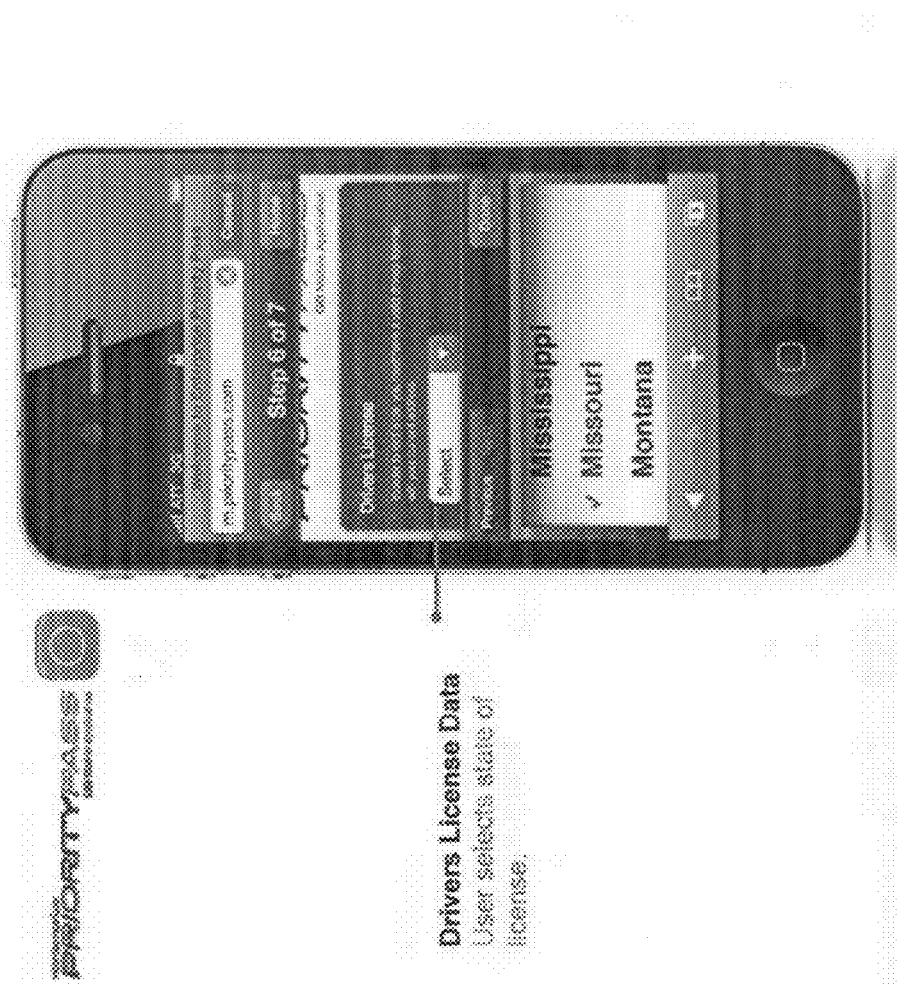
Figure 22:
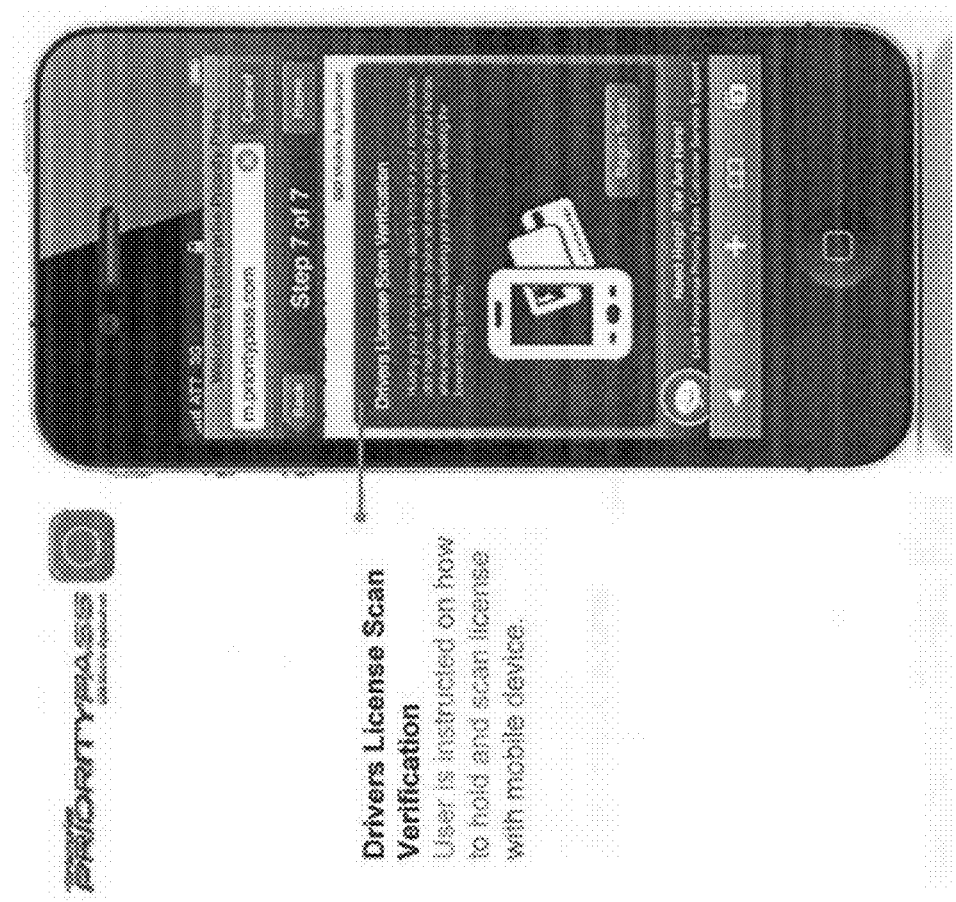
Figure 23:
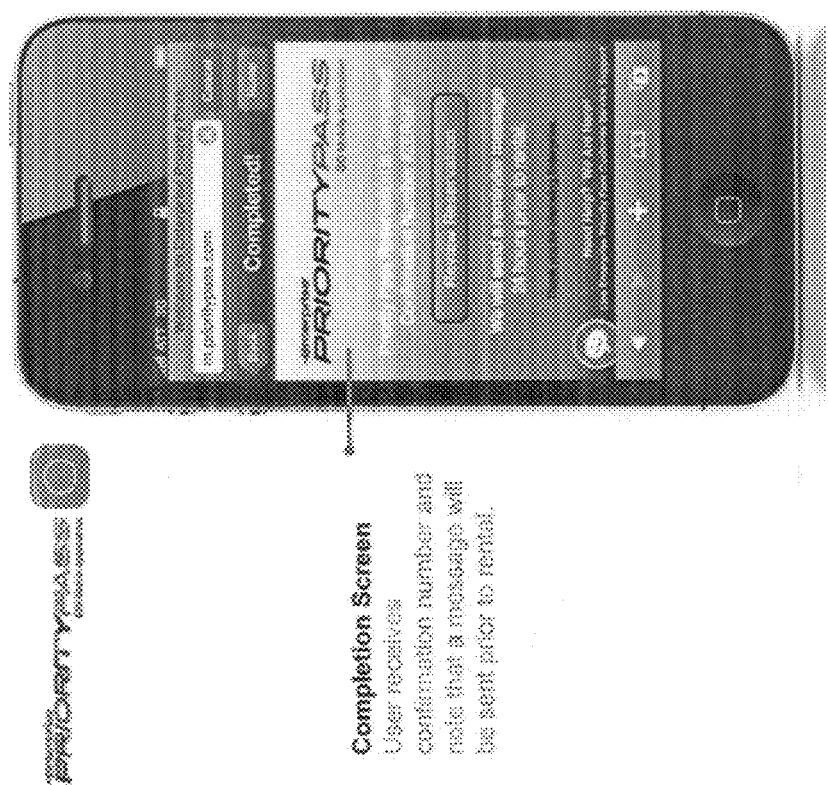

Another task is for the driver to provide proof that he/she has a valid driver's license. FIG. 21 depicts an exemplary GUI screen for display on the mobile device that is configured to begin the process of obtaining driver's license information from the driver. The GUI screen of FIG. 21 is configured to solicit an identification of the state for the driver's license. The mobile application then navigates the driver to the GUI screen of FIG. 22. The GUI screen of FIG. 22 is configured to instruct the driver about how to scan his/her driver's license. A "Begin Scan" button or the like can be provided for user selection to enable the camera feature of the mobile device to capture a photograph of the driver's license. After capturing the photograph, the mobile application causes the mobile device to communicate the image data for the driver's license photograph of the driver's license and the state identification to the rental computer system. Next, at step 1416, the rental computer system receives this information for processing at step 1418.

Step 1418 can involve the rental computer system processing the driver's license information as previously described in connection with FIG. 7(*b*). Furthermore, step 1418 can involve the rental computer system processing the payment information using conventional techniques. It should be understood that third party computer systems may also be employed to perform this processing and analysis with the results being reported to the rental computer system.

It should be understood that if the rental computer system already recognizes the driver as a validly licensed driver as described in connection with step 802 of FIG. 8(*a*) and the validity flag field 730 of customer record 720 of FIG. 7(*b*), then the mobile application and rental computer system can interact in a manner that permits the driver to bypass the GUI screens of FIGS. 21-22.

In the event that the rental computer system determines that the driver's license and payment information are valid, then at step 1420, the rental computer system can activate the replacement rental vehicle reservation and update the reservation record 820 for the replacement rental vehicle reservation to reflect the activation. For example, an activation flag field in the reservation record 820 for the replacement rental vehicle reservation can be set to mark the reservation as activated. The rental computer system can also communicate this activation to the driver's mobile device for populating a GUI screen of the mobile application (see FIG. 23). The driver will then be associated with an activated replacement rental vehicle reservation to make the driver eligible to pick up a self-rent rental vehicle using automated pickup techniques. Furthermore, this step can involve communicating data reflective of the activated replacement rental vehicle reservation to the driver's mobile device for local storage thereon.

3b. Automated Rental Vehicle Pickup for the Activated Reservation

Figure 24:
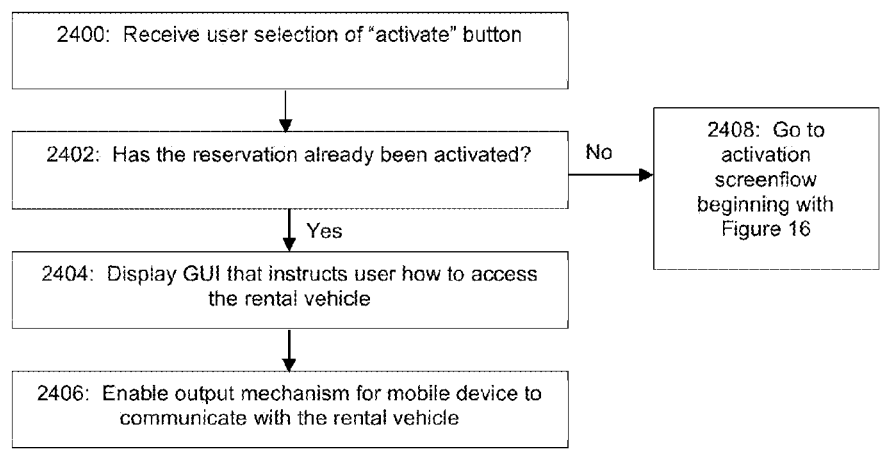
FIG. 24 depicts an exemplary process flow for a mobile device to support accessing a rental vehicle in accordance with an activated replacement rental vehicle reservation.
Figure 25:
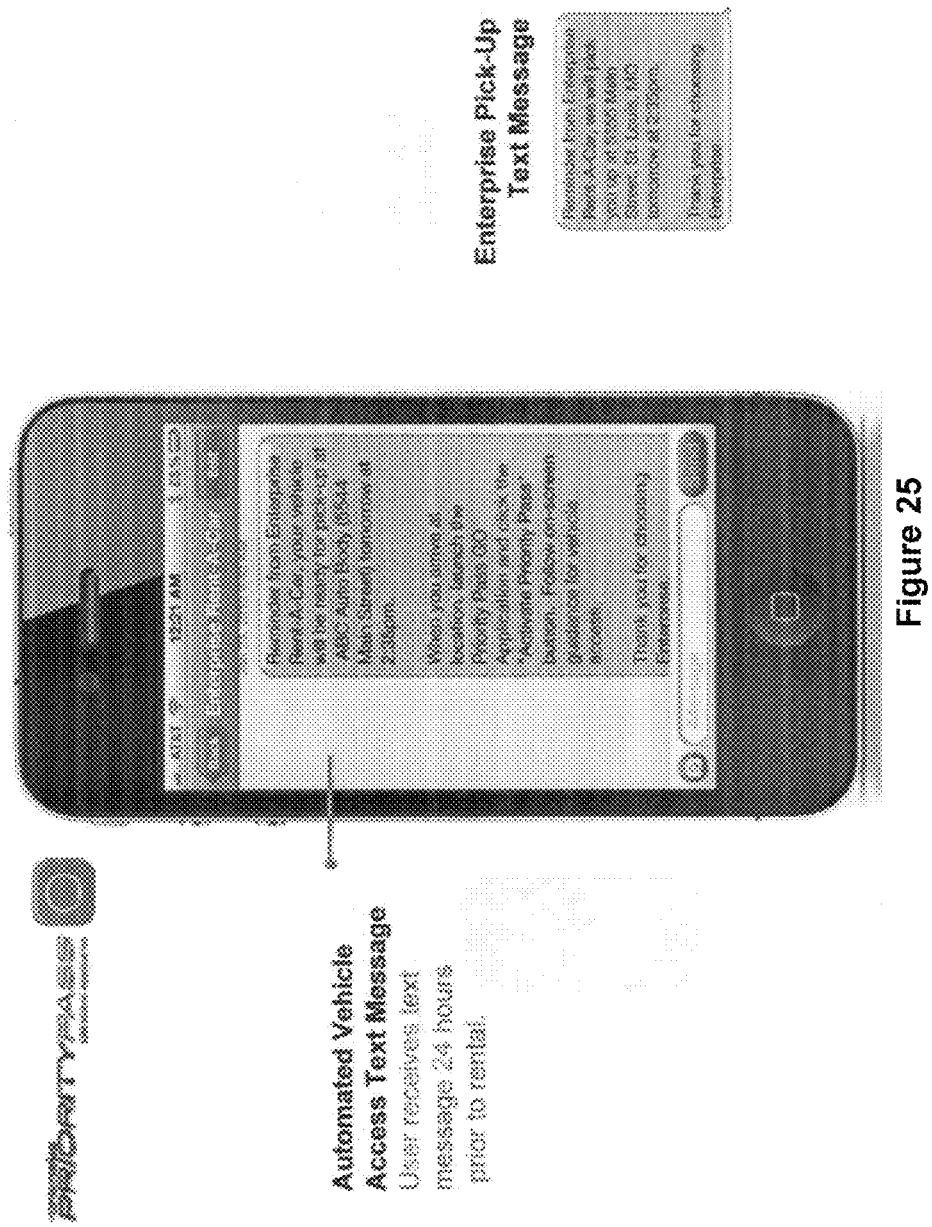
FIGS. 25-27 depict exemplary GUI screens for display on a mobile device to support accessing a rental vehicle in accordance with an activated replacement rental vehicle reservation.

FIG. 24 depicts an exemplary process flow for a mobile device to support accessing a self-rent rental vehicle in accordance with an activated replacement rental vehicle reservation. When the driver approaches the rental vehicle 108, he/she can open the mobile application 250 and select the activate button (see FIG. 15(*b*)). To remind the driver to do this, the rental computer system or business partner computer system can communicate a reminder message to the driver's mobile device (see for example, the text message of FIG. 25).

Figure 26:
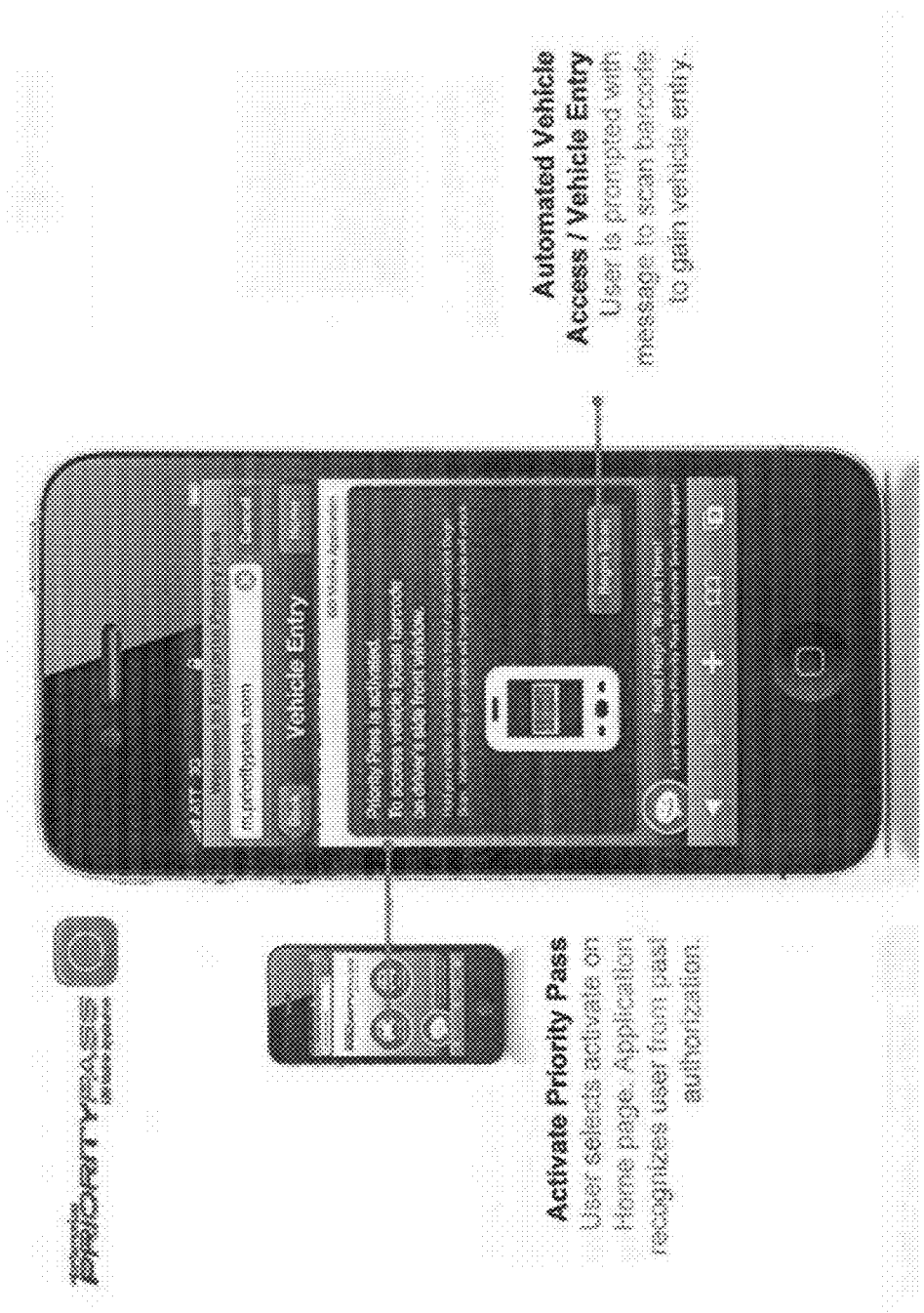
Figure 27:

At step 2402, the mobile application 250 checks whether the replacement rental vehicle reservation has already been activated. This step may involve a communication with the rental computer system to gather this information, although this need not be the case if the mobile device locally stores data indicative of the replacement rental vehicle's activation. If the subject replacement rental vehicle reservation has not been activated, then at step 2408, the mobile application can enter the process flow beginning with FIG. 16 to begin an activation procedure. If the subject replacement rental vehicle reservation has been activated, then at step 2404, the mobile application causes the mobile device to display a GUI screen that instructs the user how to access the subject self-rent rental vehicle. An exemplary GUI screen for this purpose is shown at FIG. 26. At step 2406, the mobile application instructs the mobile device to activate an output mechanism for communicating a unique identifier such as the customer identifier or mobile device identifier from the driver's customer record so that this information can be sensed by the sensor 906 located on the rental vehicle. As noted above, the output mechanism can employ data communication techniques such as NFC and BlueTooth. Also, if the data communication technique involves a persistent communication capability of the mobile device (e.g., an RFID tag or the like), then step 2406 may not be needed as the RFID tag can be characterized as "always on".

This interaction can be accomplished in any of a number of ways. For example, the mobile application can prompt the user at step 2404 to scan a car identifier such as a bar code or a QR code located on the rental vehicle to confirm that the subject rental vehicle is the rental vehicle corresponding to the activated replacement rental vehicle reservation. If the mobile device locally stores the reservation record 820 for the replacement rental vehicle reservation, this may involve comparing a scanned car identifier with the rental vehicle identifier field 804 of the reservation record 820. If the two match, then the mobile application can perform step 2406 (and unlocking is then contingent on the process flow shown in FIG. 10). In another embodiment, the mobile application can be configured to perform step 2406 while the driver scans the car identifier on the rental vehicle, whereupon unlocking of the rental vehicle can be conditioned on both the unique identifier from the mobile device matching the authorization record for the rental vehicle (as per the FIG. 10 process flow) and a signal from the mobile device that the car identifier matches the rental vehicle identifier for the reservation record 820. In still another embodiment, the mobile application can be configured such that the driver need not scan the car identifier, and where unlocking of the rental vehicle merely follows the process flow described in connection with FIG. 10. If the process flow of FIG. 10 operates to successfully confirm the driver as eligible to pick up the rental vehicle, then the control hardware 600 can signal the mobile device about this confirmation, whereupon the mobile device can signal the driver about same (e.g., the mobile application can cause the mobile device to beep or vibrate or change a display color). Thereupon, the mobile application can cause the mobile device to display the GUI screen of FIG. 27 which can be configured to provide further instructions regarding the rental vehicle. The driver would then be free to drive the rental vehicle away.

Also, optionally, telematics technology deployed on the rental vehicle can be configured to automatically detect information such as the rental vehicle's mileage and fuel level at the time of rental vehicle pickup. This information can be communicated from the rental vehicle to the rental computer system and/or mobile device for storage therein in association with the reservation record.

3c. Returning the Rental Vehicle to Complete the Reservation

Figure 28:
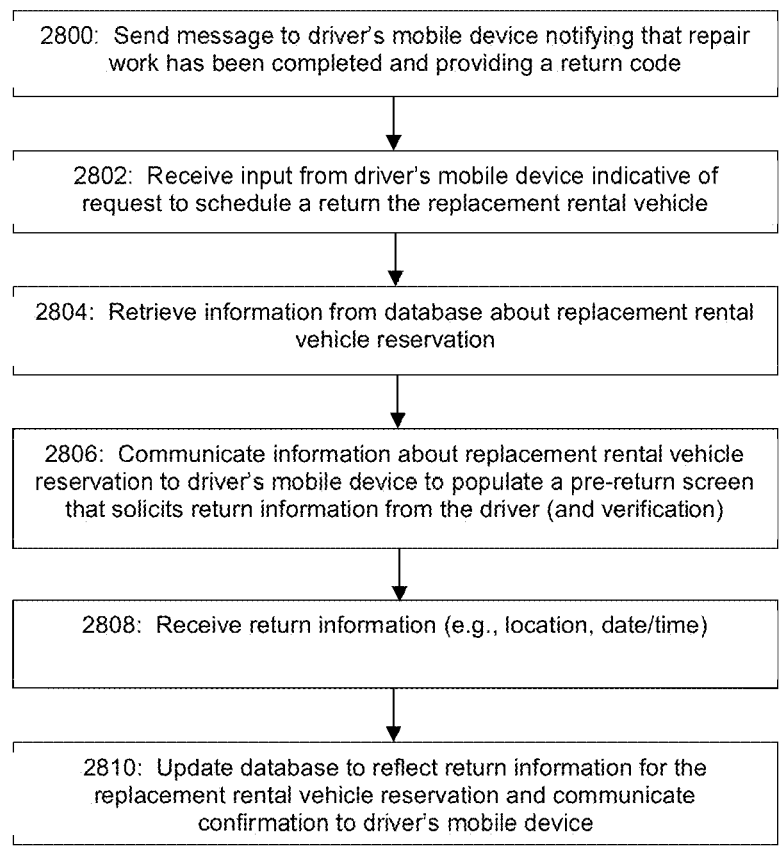
FIG. 28 depicts an exemplary process flow for a rental computer system to support a return scheduling by a customer for a replacement rental vehicle reservation via a mobile device.

FIG. 28 depicts an exemplary process flow for a mobile device to support administering a return of the rental vehicle for the replacement rental vehicle reservation after pickup by the driver.

Figure 29:
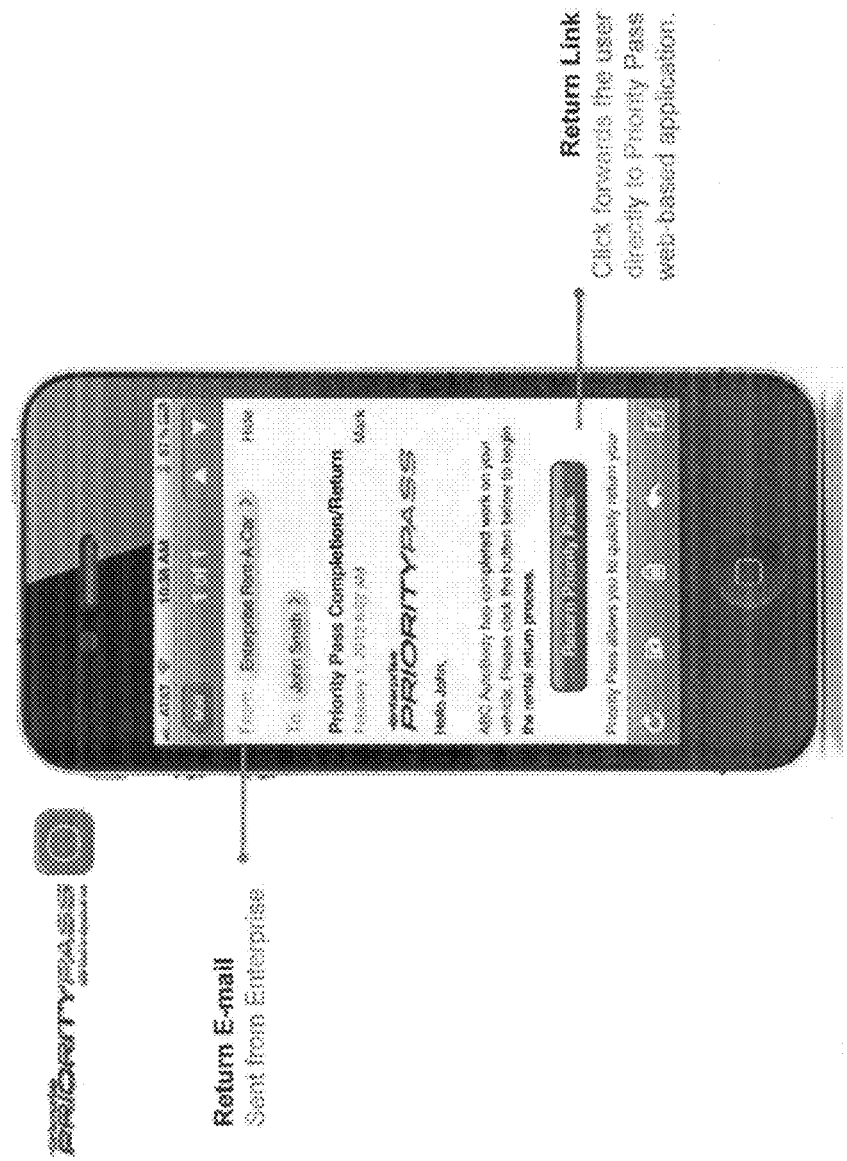
FIGS. 29-34 depict exemplary GUI screens for display on a mobile device to support return scheduling by a customer for a replacement rental vehicle reservation.
Figure 30:
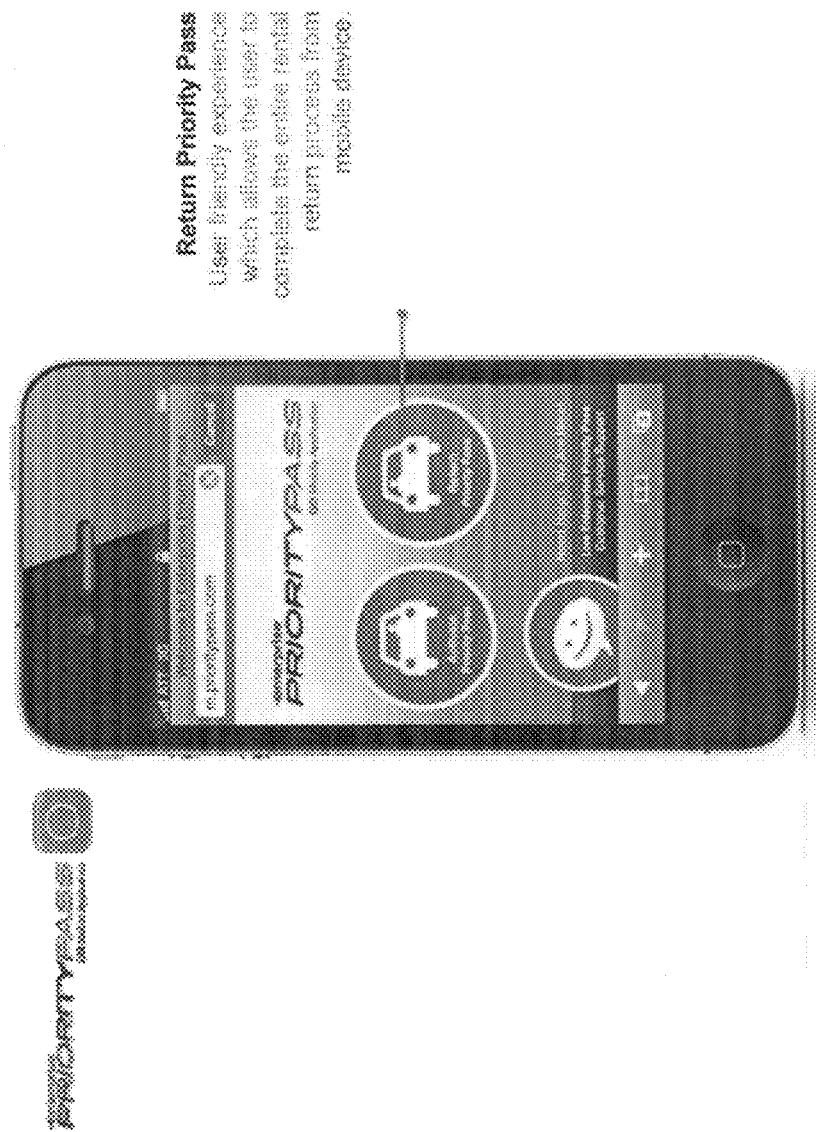
Figure 31:
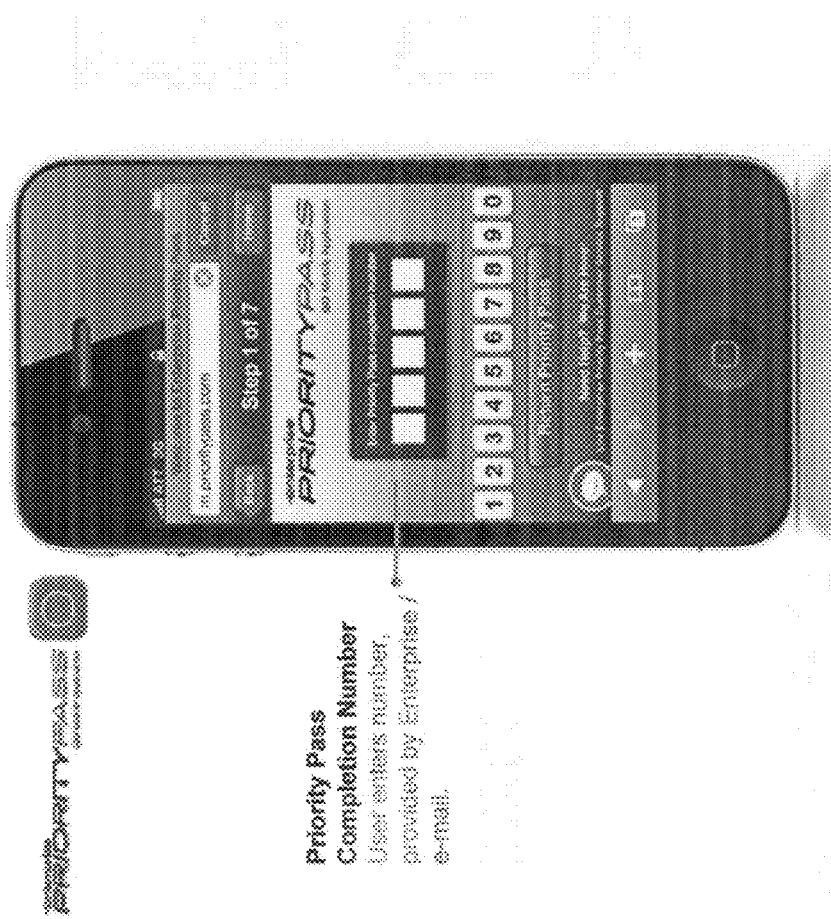

As discussed in the above-referenced and incorporated patents and patent applications, the automated reservation management computer system 504 can be configured to detect when repairs have been completed to the driver's ordinary vehicle. When such an event happens, the rental computer system or business partner computer system can send a message to the driver's mobile device notifying him or her of same (step 2800). FIG. 29 displays an exemplary email message for this purpose. As shown in FIG. 29, this message can include a selectable option for the driver to begin the return process for the rental vehicle. The home screen of the mobile application 250 can also provide a selectable "return" option as shown in FIG. 30. The message provided at step 2800 can include a completion code for use by the driver to indicate he/she is initiating the return process. The rental computer system can be configured to maintain a field in the reservation record for the replacement rental vehicle reservation that stores a unique completion code for the reservation. Upon driver selection of the return button in the message or the home screen (see FIGS. 29 and 30), the mobile application can navigate the driver to the GUI screen of FIG. 31, which is configured to solicit from the driver the completion code. Upon entry of the completion code, the mobile device can communicate the completion code to the rental computer system to indicate the driver's intent to return the rental vehicle.

At step 2802, the rental computer system receives this completion code from the mobile device, and then retrieves the reservation record for the replacement rental vehicle reservation based on the received completion code (step 2804). At step 2806, the rental computer system communicates pre-return information about the replacement rental vehicle reservation to the mobile device for display thereon.

Figure 32:
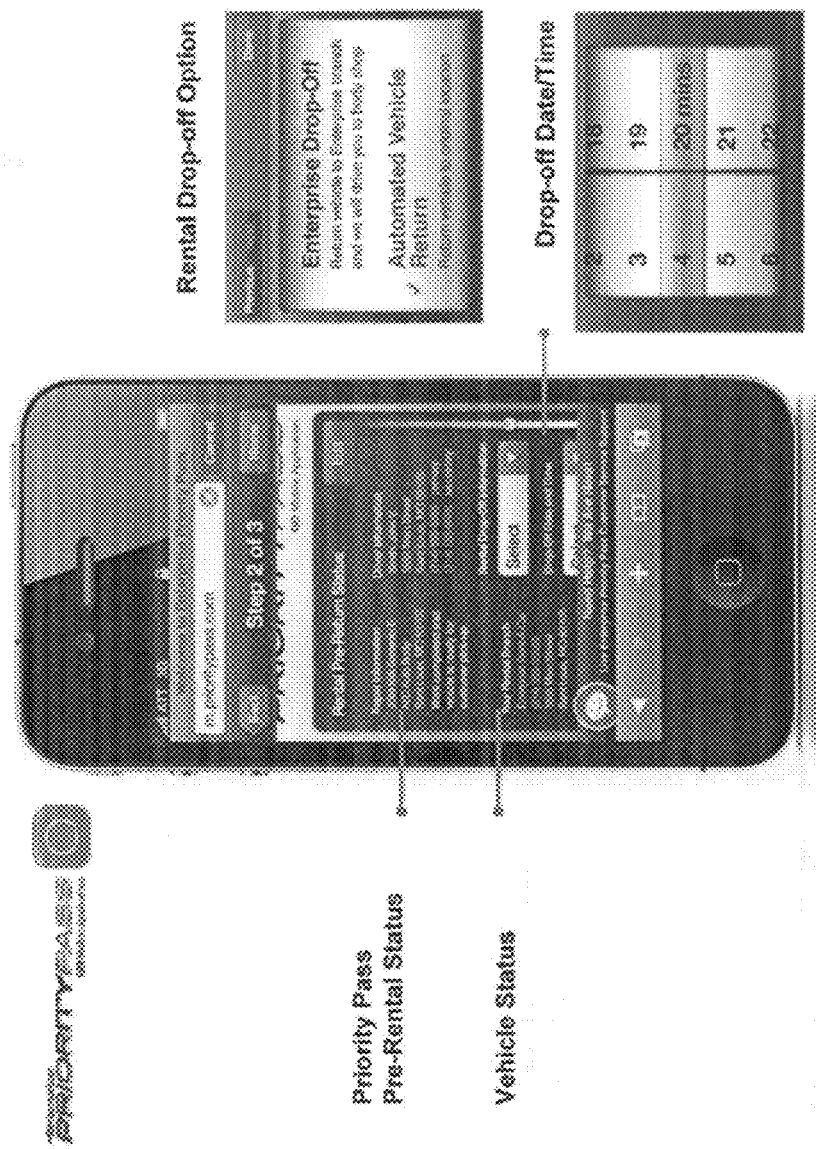
Figure 33:
Figure 34:
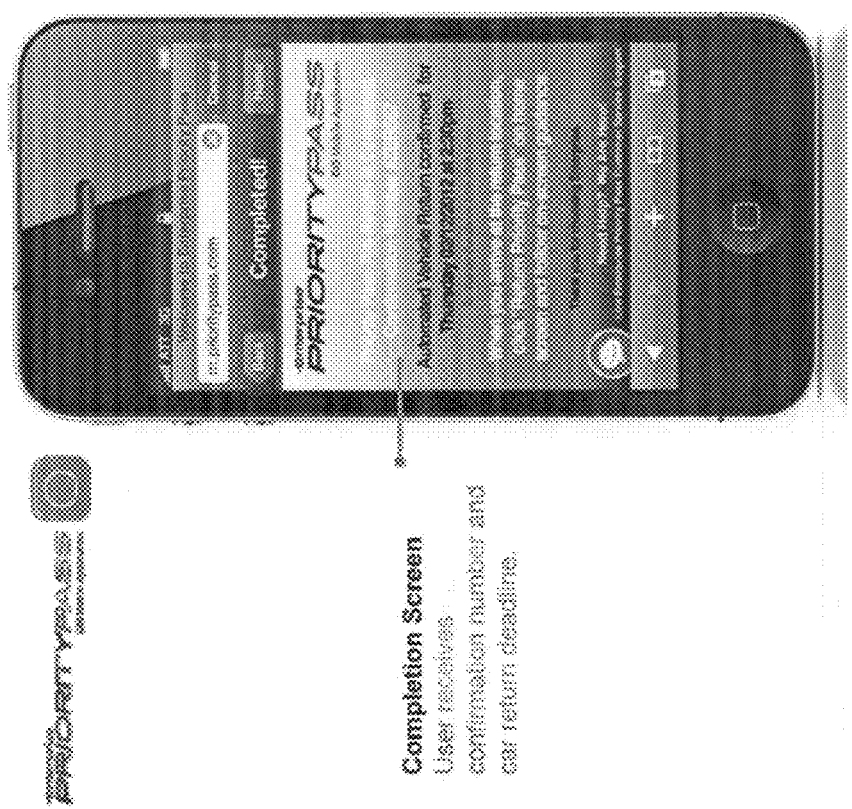

The GUI screen of FIG. 32 depicts an example of how the mobile application can display such pre-return information. The GUI screen of FIG. 32 is also configured to solicit from the driver: (1) a vehicle return mode (e.g., an automated vehicle return or a conventional rental vehicle return at a rental vehicle branch location), and (2) a date and time for the vehicle return. Upon receipt of this information from the driver, the mobile application can ask the driver to verify the provided pre-return information (see FIG. 33). Upon user verification, the mobile application can cause the mobile device to communicate the selected vehicle return mode and selected vehicle return date/time to the rental computer system.

At step 2808, the rental computer system receives this pre-return information from the mobile device, and the rental computer system then stores this information in database 308, preferably appending the pre-return information to the reservation record 820 for the replacement rental vehicle reservation. The rental computer system can also communicate a confirmation of its receipt of the pre-return information to the mobile device for display thereon (see FIG. 34). This confirmation GUI screen can be configured to instruct the driver further regarding the rental vehicle return process.

Figure 35:
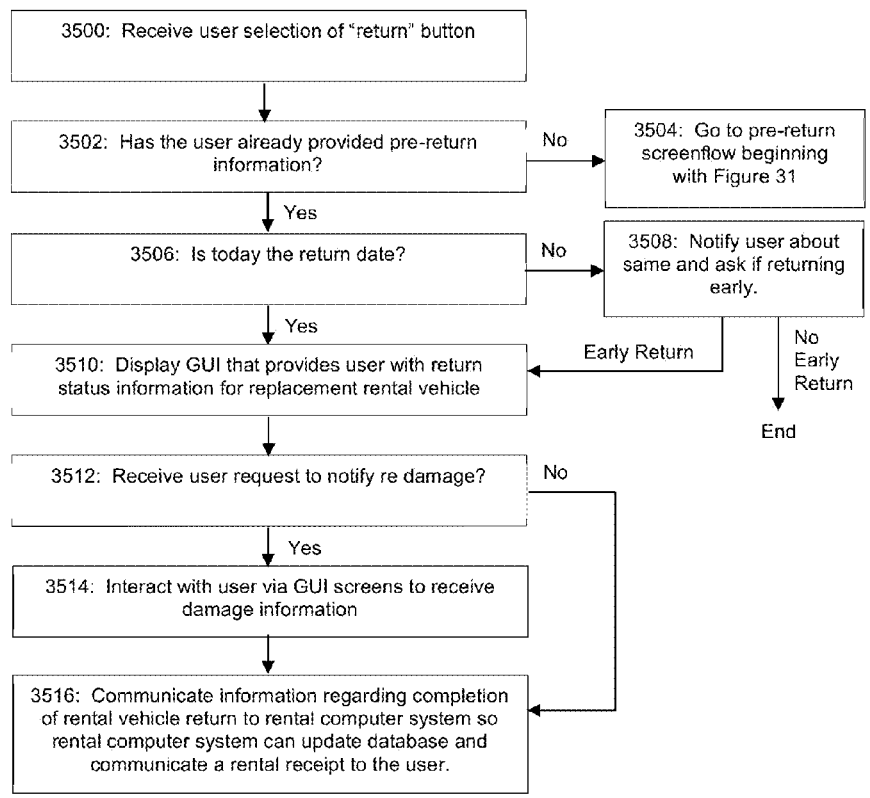
FIG. 35 depicts an exemplary process flow for a mobile device to support returning a rental vehicle for a replacement rental vehicle reservation.

FIG. 35 depicts an exemplary process flow for a mobile device to support the final portion of the return process for the rental vehicle. The driver can open the mobile application on the return date and select the return button to initiate this process flow. At step 3500, the mobile application detects that the driver has selected the return button. At step 3502, the mobile application checks whether the driver has already provided pre-return information for the replacement rental vehicle reservation. If he/she has not, the mobile application can enter the screen flow beginning with the example of FIG. 31. Otherwise, the mobile application can check whether the current date matches the scheduled return date from the pre-return information (step 3506). If not, the mobile application can notify the driver about this discrepancy and ask the driver if he/she is returning the rental vehicle early (step 3508). If the driver responds that he/she does not want to return the rental vehicle early, the process flow can terminate. However, if the driver responds that he/she wishes to continue with the vehicle return, then the process flow can proceed to step 3510. Also, if step 3506 detects that the driver is returning the vehicle late, the mobile application can proceed to step 3510.

At step 3510, the mobile application causes the mobile device to display a GUI screen, where this GUI screen is configured to present the driver with return status information (see FIG. 36 for an example of such a GUI screen). Optionally, telematics technology deployed on the rental vehicle can be configured to automatically detect information such as the rental vehicle's mileage and fuel level at the time of return. This information can be communicated to the rental computer system and/or mobile device for association with the reservation record. The GUI screen of FIG. 36 can thus be able to present to the driver a display of how many miles were driven and how the current fuel level of the rental vehicle compares with the fuel level at the time of pickup.

The GUI screen also be configured to solicit input from the driver to indicate whether the rental vehicle has experienced any noticeable damage during the rental. If the mobile application receives input from the driver indicative of no such damage at step 3512, then the process flow can proceed to step 3516. If the mobile application receives input from the driver indicative of the existence of such damage at step 3512, then the process flow can proceed to step 3514. At step 3514, the mobile application can cause the mobile device to display one or more GUI screens that are configured to solicit details regarding such damage.

At step 3516, the mobile application then causes the mobile device to communicate information to the rental computer system regarding completion of the replacement rental vehicle reservation. In turn, the rental computer system can update its database so that the reservation record for the replacement rental vehicle reservation has its status changed to "closed" or the like. Furthermore, any damage items noted at step 3514 and communicated at step 3516 can be stored in association with the reservation record. A practitioner may also choose to design the mobile application so that a user can capture images of any vehicle damage to be uploaded to the rental system for storage in association with a record for the rental. Upon completion of the replacement rental vehicle reservation, the rental computer system can also communicate an update to the control hardware 600 of the subject rental vehicle to update its authorization record to remove authorization for the driver with respect to the now closed replacement rental vehicle reservation. In this fashion, the driver can be prevented from re-entering the vehicle after return. Another task for the rental computer system upon completion can be sending an electronic receipt for the rental transaction to the mobile device and/or an email address associated with the driver. FIG. 37 depicts an exemplary GUI screen that can be displayed on the mobile device to inform the driver of this completion.

Thus, it can be seen that FIGS. 13-37 describe various aspects of an exemplary embodiment whereby mobile devices and self-rental rental vehicle can be employed to streamline the replacement rental vehicle reservation process.

4. Exemplary Embodiment for Mobility-Enhanced Rental Program Reservations

Figure 38A:
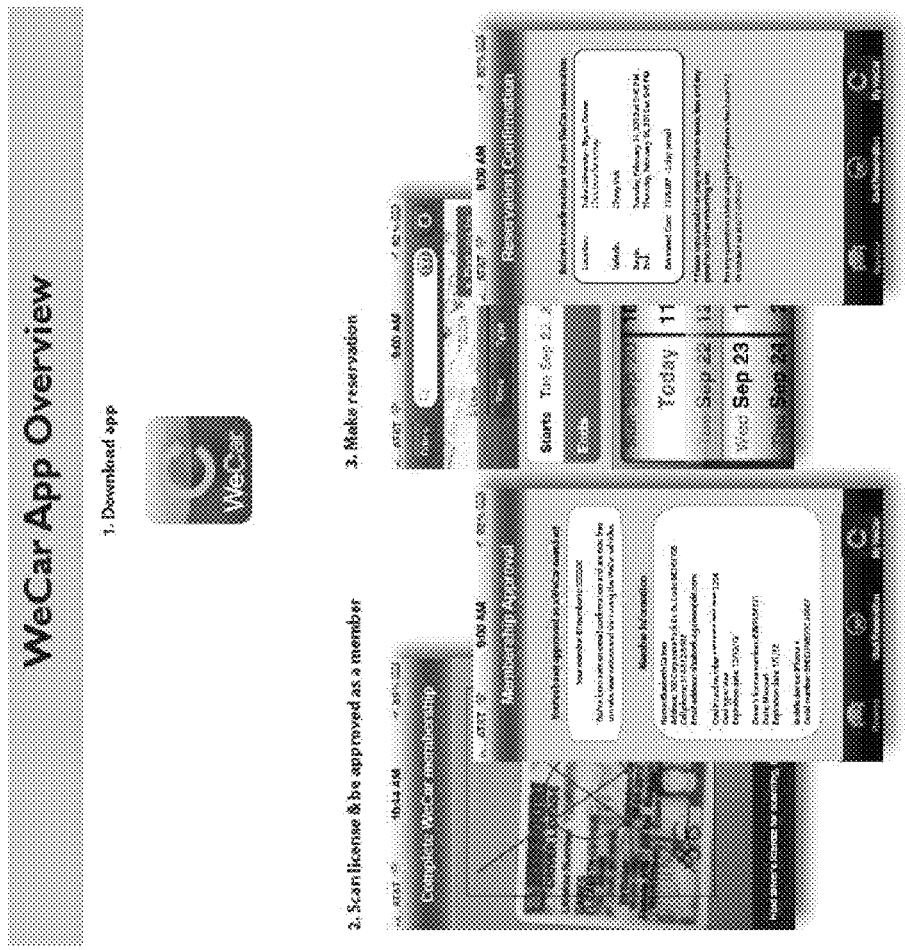
FIGS. 38(*a*) and (*b*) depict exemplary process flows and GUI screens for display on a mobile device to support rental vehicle transactions for self-rent rental vehicles through an exemplary self-rent rental program.
Figure 38B:
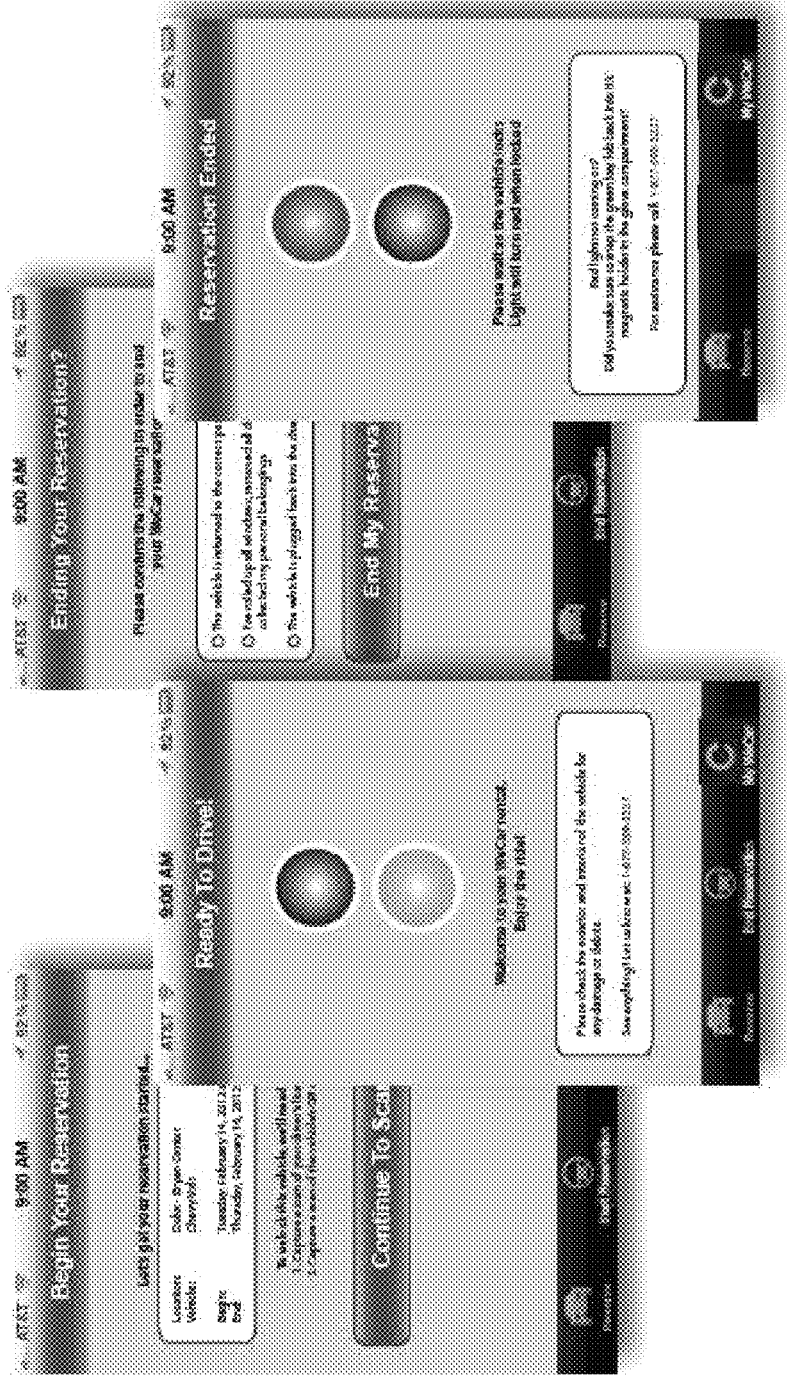
Figure 39A:
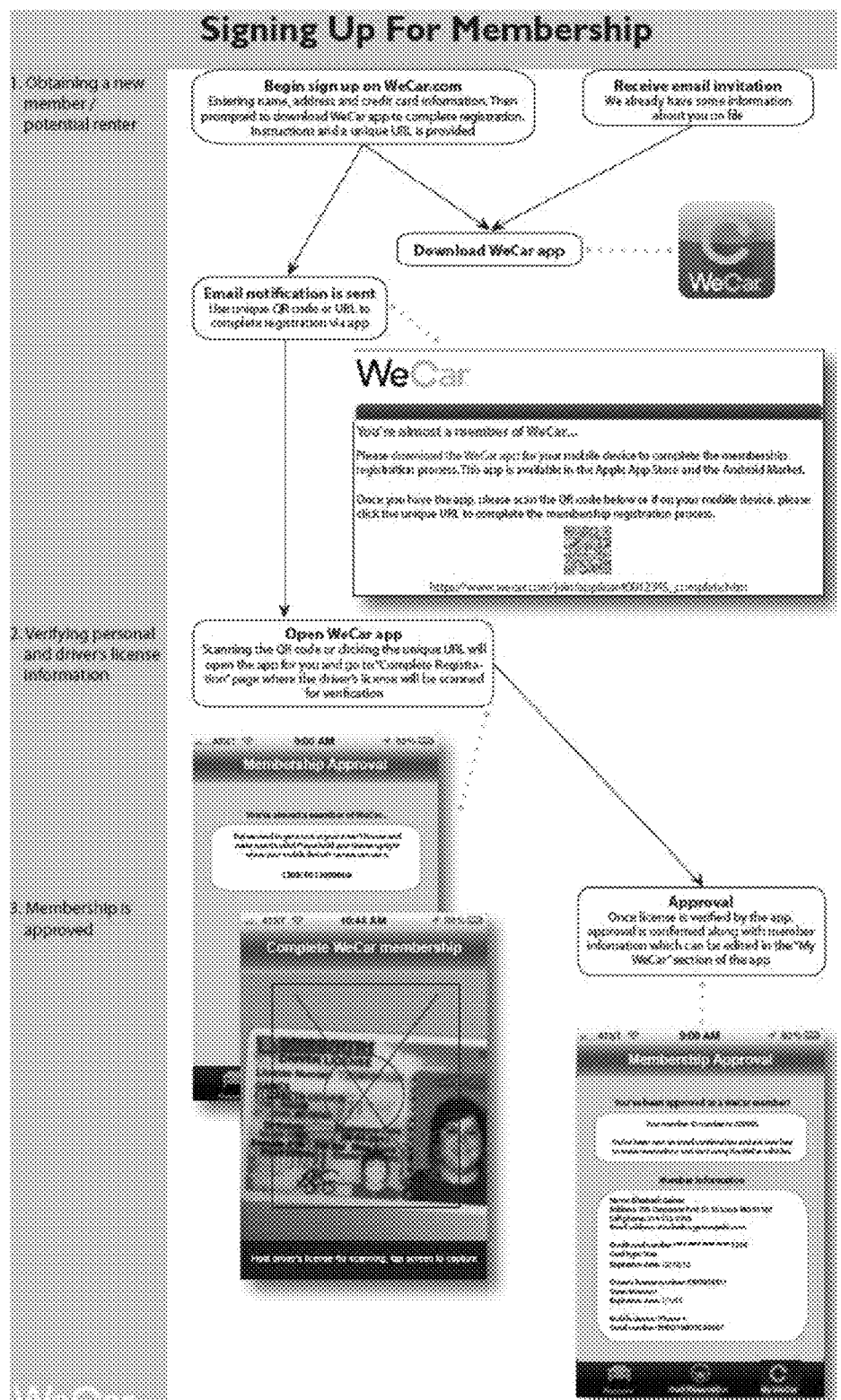
FIGS. 39(*a*)-(*d*) depict exemplary process flows and GUI screens for display on a mobile device to support mobile application download and enrollment in a self-rent rental program via mobile device.
Figure 39B:
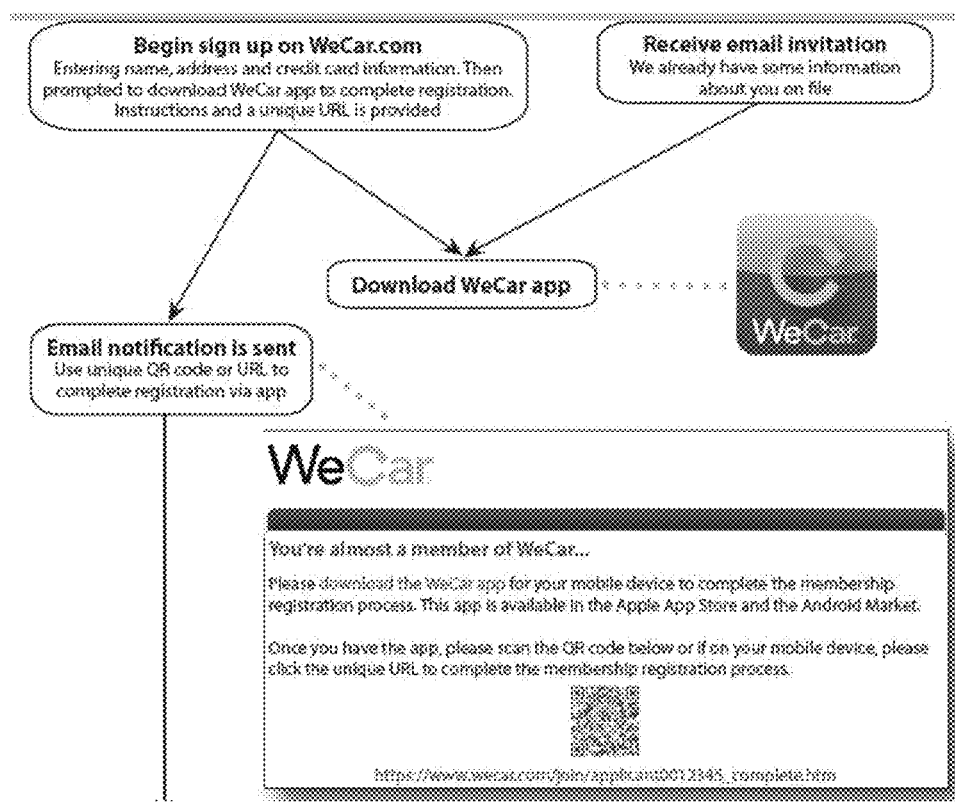
Figure 39C:
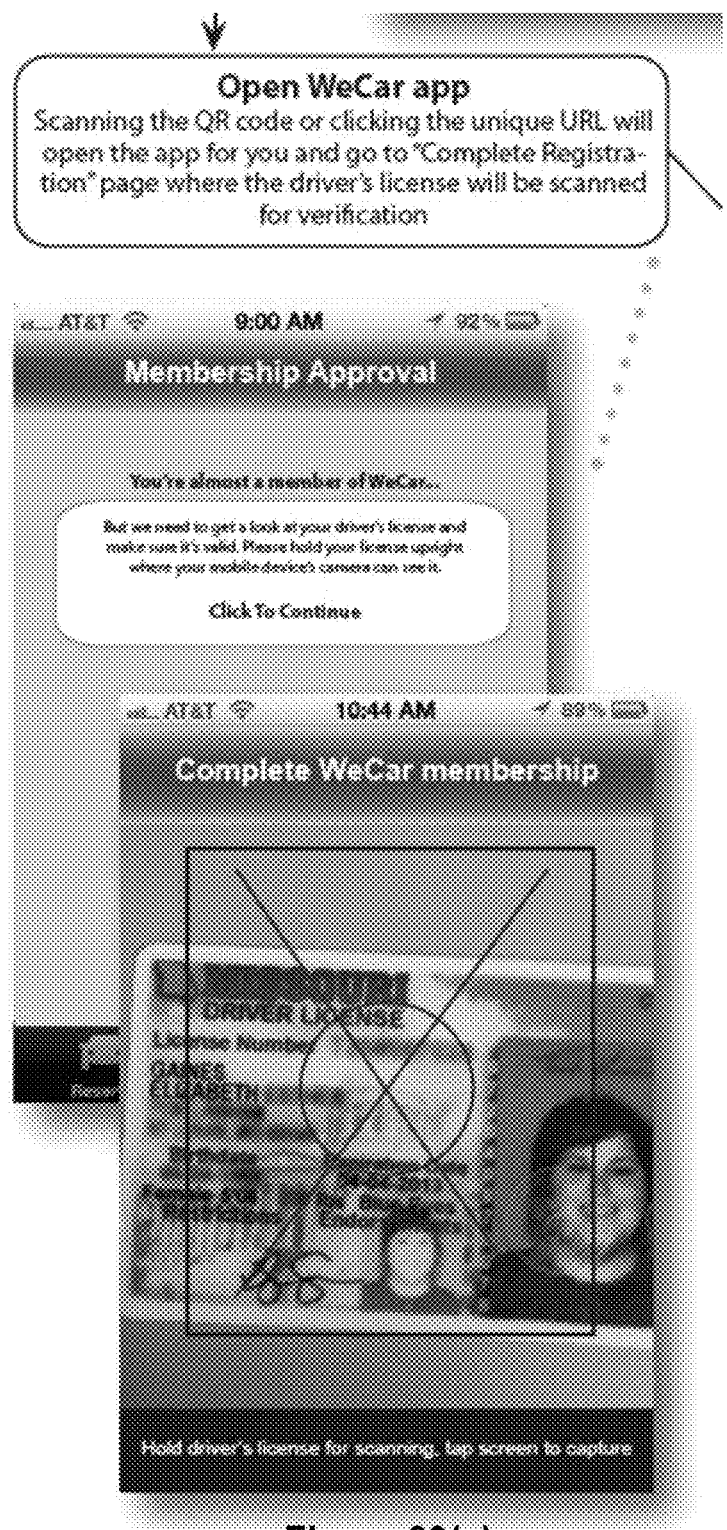
Figure 39D:
Figure 39E:
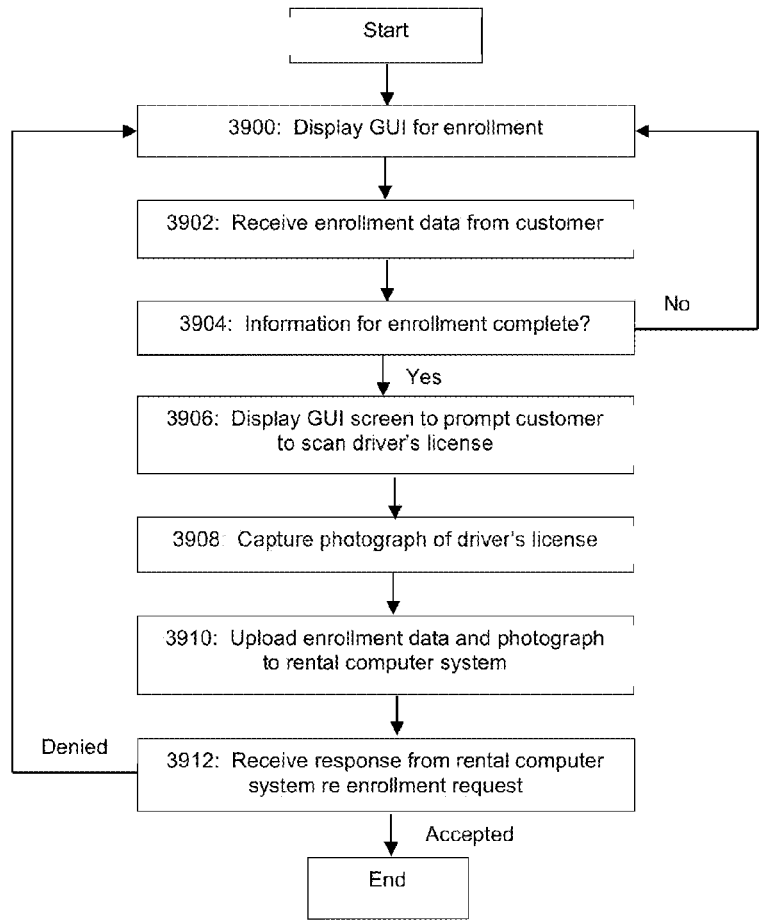
Figure 39F:
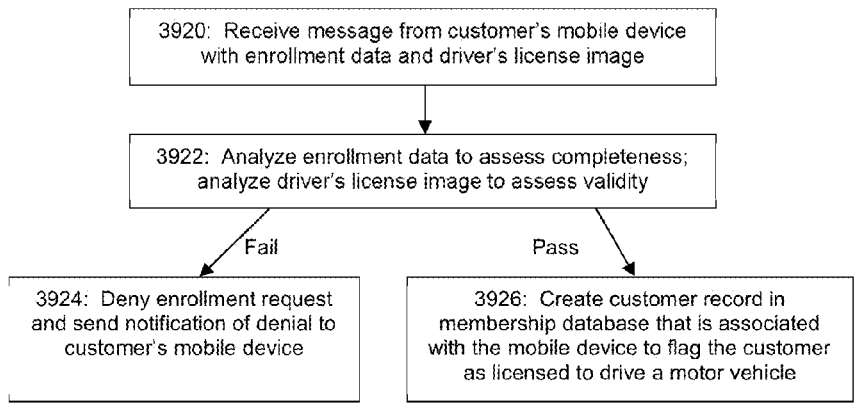
Figure 40A:
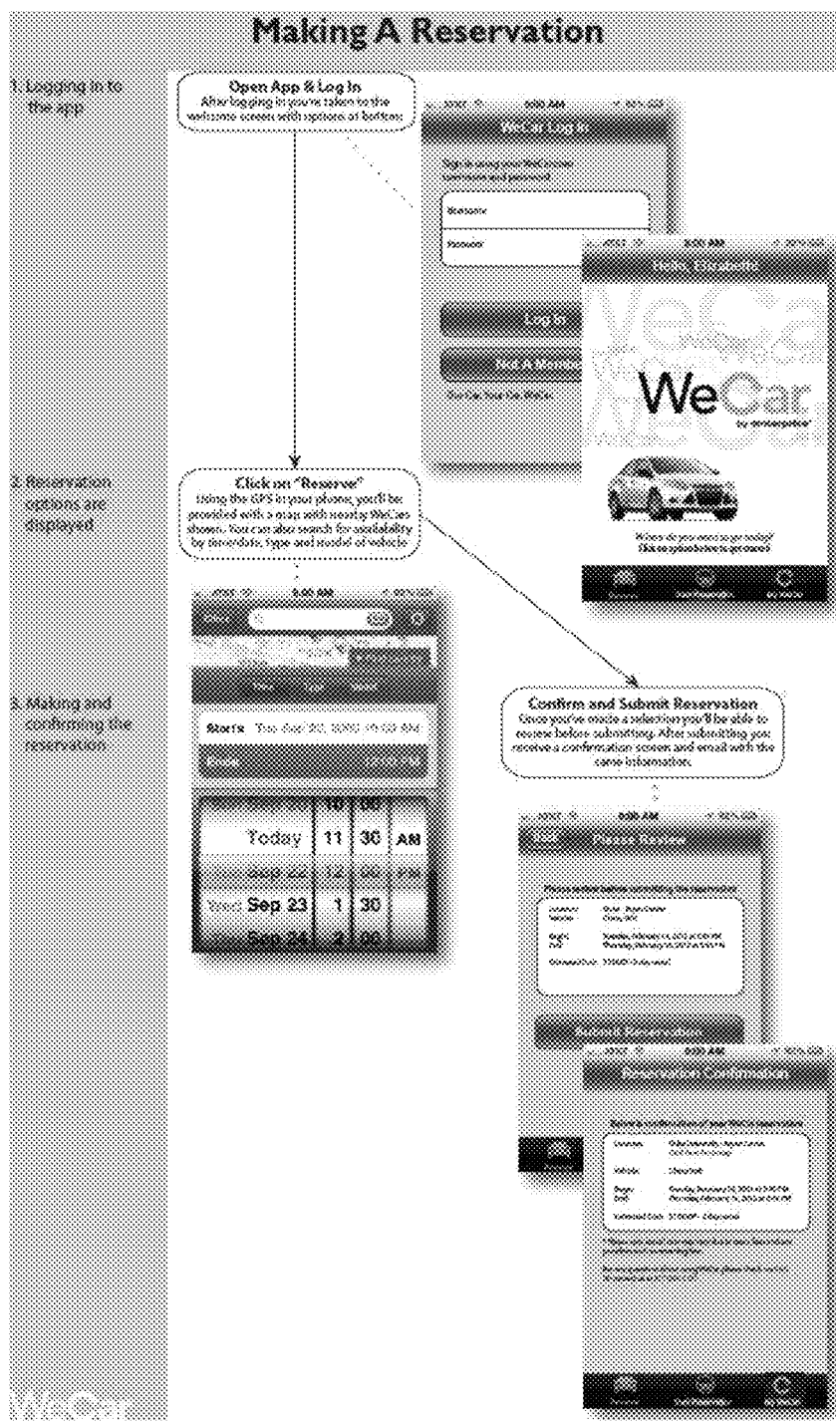
FIGS. 40(*a*)-(*d*) depict exemplary process flows and GUI screens for display on a mobile device to support creating rental vehicle reservations through a self-rent rental program via mobile device.
Figure 40B:
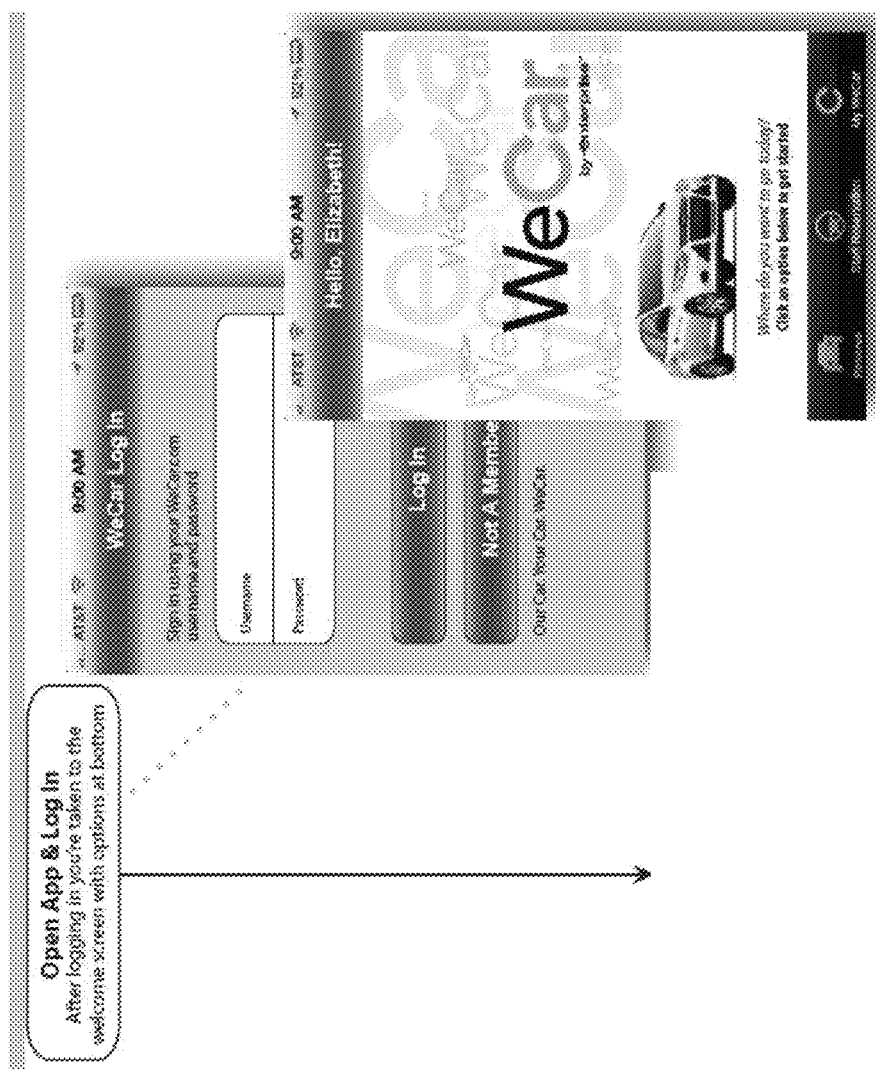
Figure 40C:
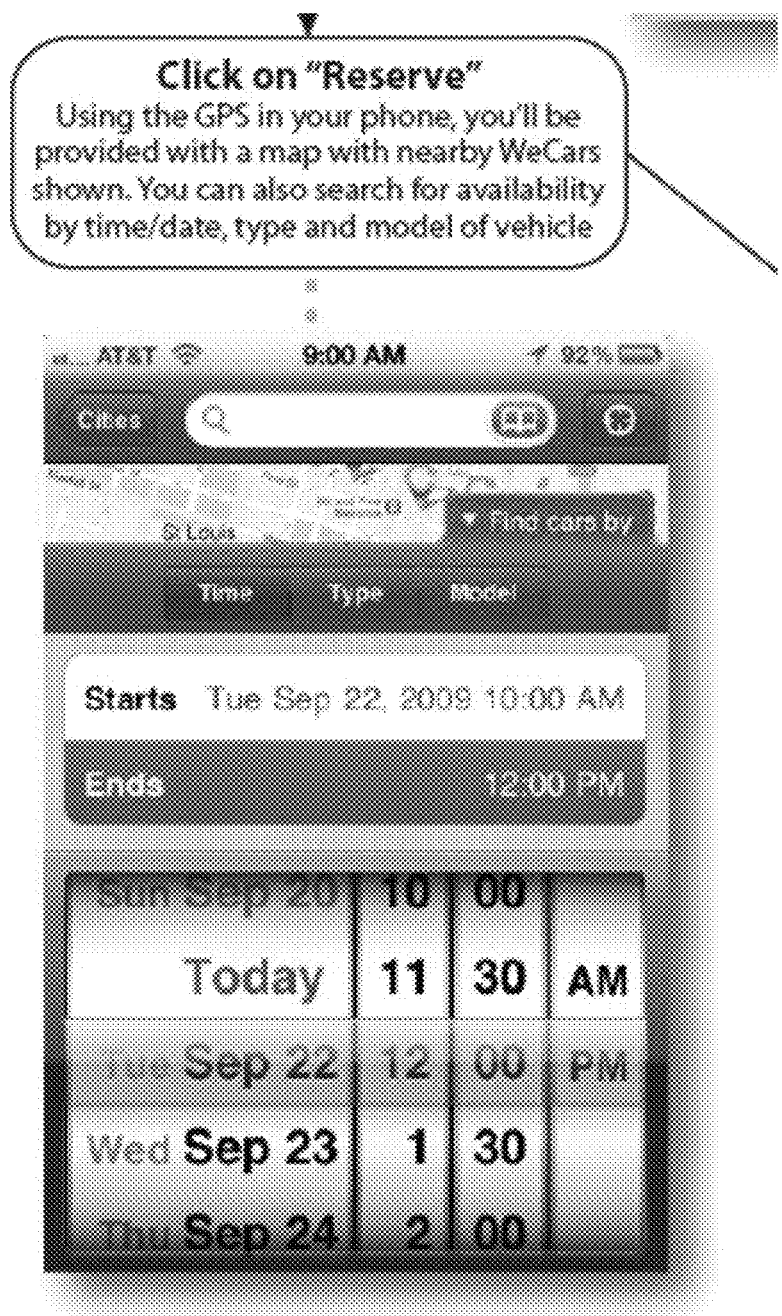
Figure 40D:
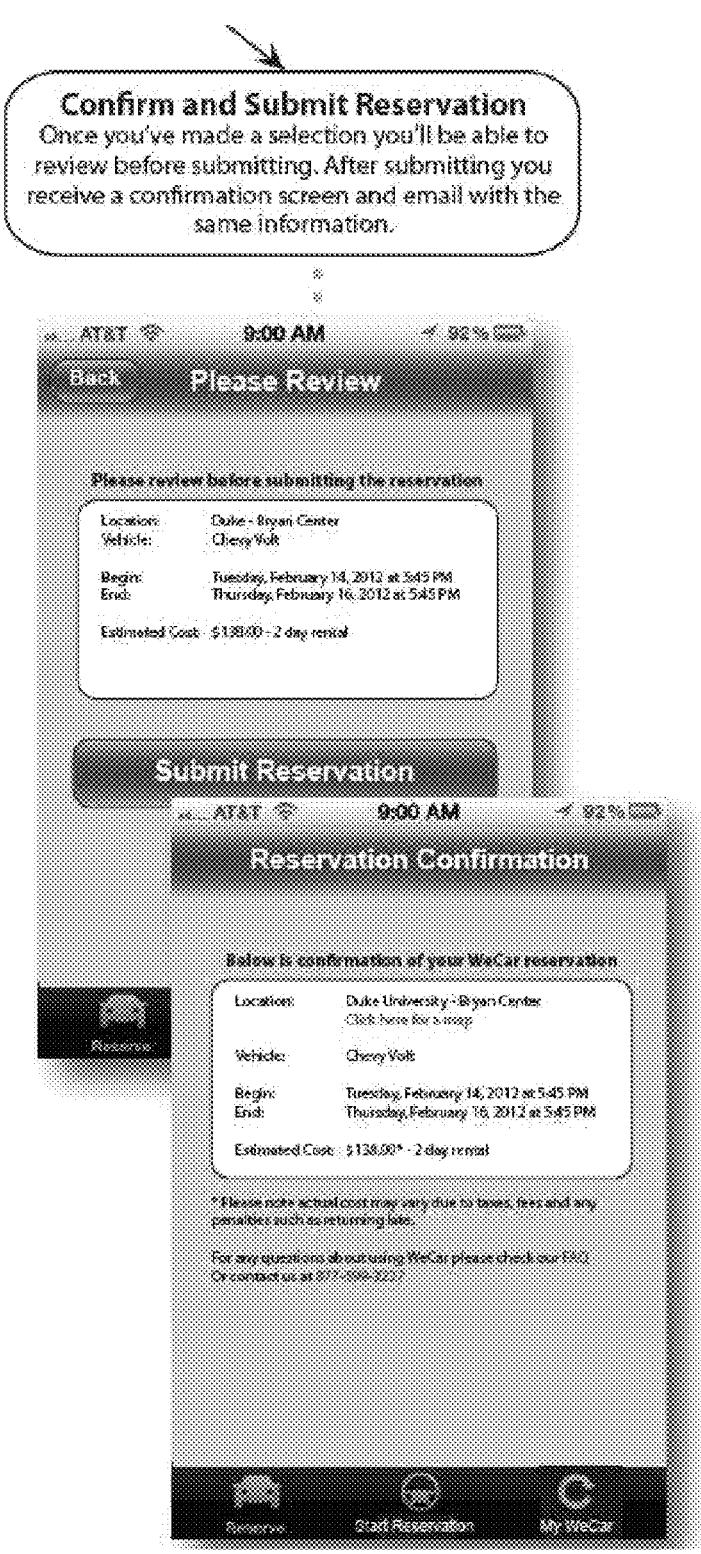

FIGS. 38(*a*) and (*b*) depict a process flow for an exemplary embodiment whereby a mobile device is used to support rental vehicle reservations of self-rent rental vehicles through a rental program offered by a rental vehicle service provider. An exemplary rental program can be the WECAR rental service discussed above. Basic tasks for this, as shown in FIGS. 38(*a*)-(*b*), can include:

Stage 1: The customer downloading the mobile application 250 that supports the operations described herein to his/her mobile device;

Stage 2: The customer enrolling in the rental program via the mobile application to become a registered user (preferably including scanning his/her driver's license to become approved as a validly licensed driver);

Stage 3: The customer creating a rental vehicle reservation with respect to a self-rent rental vehicle via the mobile application;

Stage 4: The customer picking up a self-rent rental vehicle in accordance with the reservation via the mobile application; and Stage 5: The customer ending the reservation via the mobile application.

FIG. 39(*a*) depicts an exemplary process flow for Stages 1 and 2 above, with FIGS. 39(*b*)-(*d*) providing larger views of the features from FIG. 39(*a*). FIG. 39(*e*) provides an exemplary process flow for execution by the mobile application to perform Stage 2 above. FIG. 39(*f*) provides an exemplary process flow for execution by the rental computer system to perform Stage 2 above.

The mobile application 250 for the rental service can be downloaded by a customer at Stage 1 in response to any of a number of access paths. For example, the customer may visit a website associated with the rental service and download the mobile application from there. As another example, the customer may receive an email invitation or the like with a selectable link for downloading the mobile application. As yet another example, the mobile application can be downloaded from an "app store" or the like that is accessible via the mobile device. To complete initial registration, the rental computer system can email or a text a message to the customer that provides a unique code, QR code, or URL link, that is selectable by the customer to complete his/her registration as shown in FIG. 39(*b*).

Also, to become enrolled with the rental program, the rental computer system can obtain information about the customer (e.g., name, address, contact information, etc.) for populating a customer record 720. Such information, can, in part, be obtained from the customer prior to downloading the mobile application. Or, all of such information can be obtained from the customer via the mobile application. For example, at step 3900, the mobile application can cause one or more GUI screens to be displayed on the mobile device to solicit customer information. At step 3902, the mobile application receives the enrollment customer information. At step 3904, the mobile application checks whether all necessary customer enrollment information has been received. If no, it continues to request more information from the customer. If yes, the mobile application proceeds to step 3906.

At step 3906, the mobile application displays one or more GUI screens that guide the customer through a driver's license scanning operation (see FIG. 39(*c*)). Upon receipt of a photograph of the customer's driver's license (step 3908), the mobile application communicates the enrollment information and the driver's license photograph to the rental computer system (step 3910). At step 3912, the mobile application receives a responsive communication from the rental computer system. If the rental computer system provides a responsive communication that the customer's enrollment information is complete and driver's license is deemed valid, then the customer is notified of successful enrollment (see FIG. 39(*d*)) and the process flow ends. If the rental computer system provides a responsive communication that the customer's enrollment information is incomplete and/or driver's license is deemed invalid, then the customer is notified of an enrollment denial, and the customer will need to begin again in order to enroll (or at least at the stage of the process where faulty information was provided).

FIG. 39(*f*) depicts the process flow from the perspective of the rental computer system. At step 3920, the rental computer system receives the customer's enrollment information and driver's license image. At step 3922, the rental computer system determines whether a complete set of customer enrollment data has been provided and also analyzes the driver's license image to assess the validity of the driver's license. This step can be performed as described previously in connection with step 722 of FIG. 7(*b*). If the enrollment data is complete and the driver's license is deemed valid, then at step 3926, the rental computer system can create the customer record 720, such record including a unique customer identifier field and driver's license validity flag field, etc. as previously discussed. The rental computer system can also communicate a notification to the customer's mobile device that enrollment was successful. If the enrollment data is incomplete and/or the driver's license is deemed invalid, then at step 3924, the rental computer system can deny the customer's enrollment request and communicate a message to the customer's mobile device re same.

FIG. 40(*a*) depicts an exemplary process flow for Stage 3 above, with FIGS. 40(*b*)-(*d*) providing larger views of the features from FIG. 40(*a*). During stage 3, the mobile application can cause the customer's mobile device to display various GUI screens that are configured to solicit reservation information from the customer. Exemplary items of reservation information can include: pickup location, return location, vehicle information (if a range of vehicle options are available for a given pickup location), pickup date/time, and return date/time. The mobile application can be configured to communicate with the rental computer system to determine availabilities and book a rental vehicle reservation for the customer if possible. Upon completion of this process, the rental computer system can create a reservation record 820 for the customer in association with the customer's customer record 720. A confirmation of the reservation can be displayed on the customer's mobile device via the mobile application (see FIG. 40(*d*)).

Figure 41A:
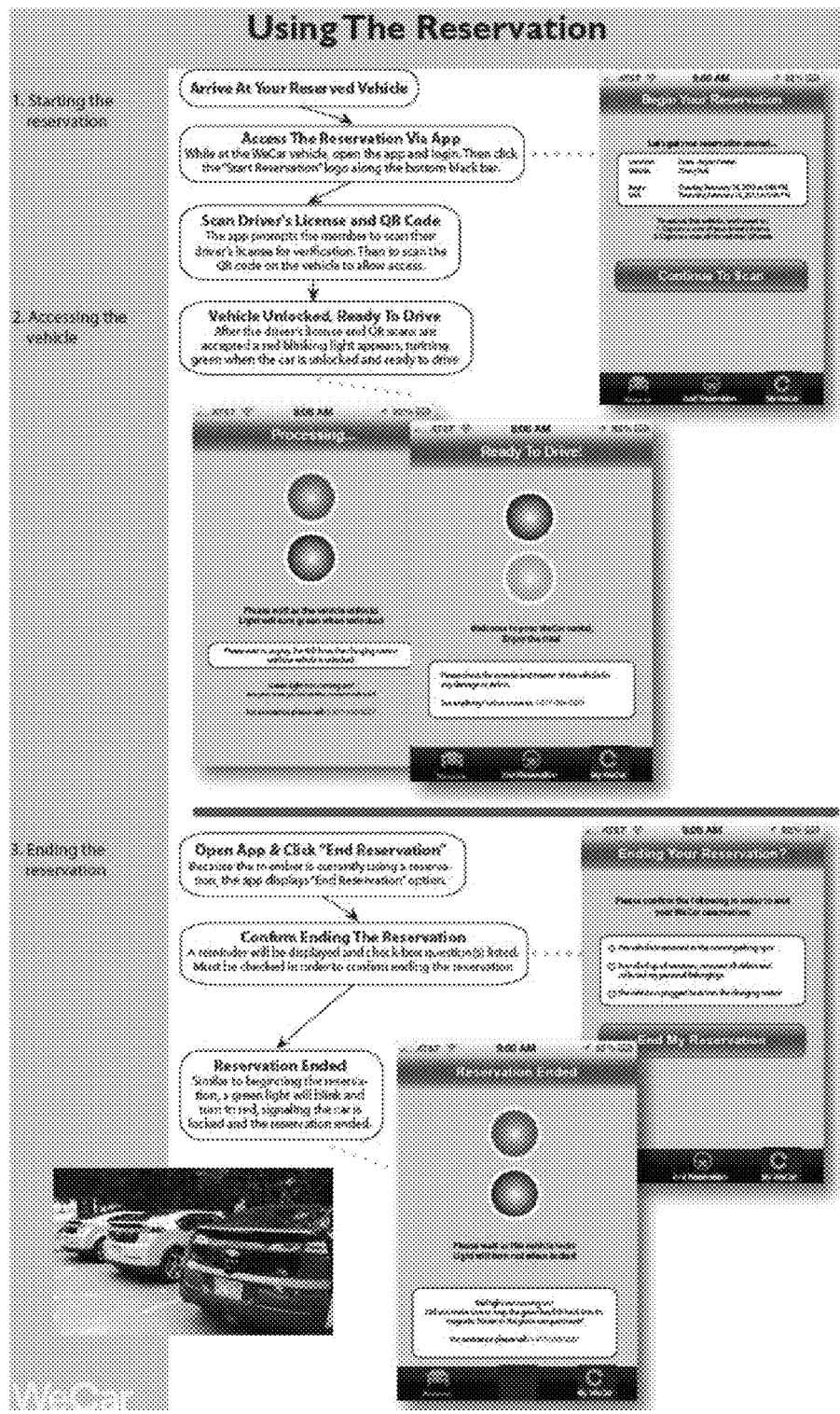
FIGS. 41(*a*)-(*c*) depict exemplary process flows and GUI screens for display on a mobile device to support picking up and returning rental vehicles in accordance with rental vehicle reservations through a self-rent rental program via mobile device.
Figure 41B:
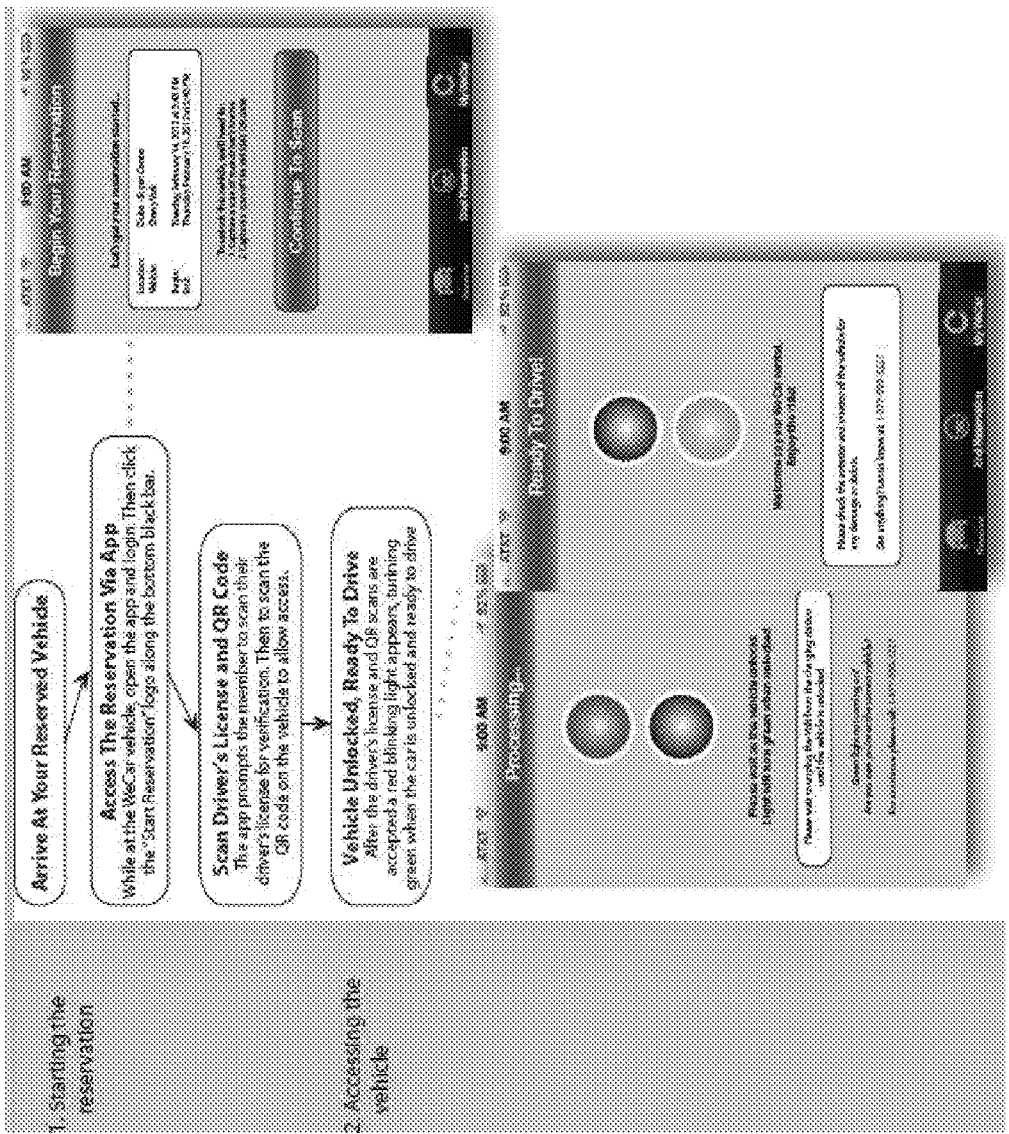
Figure 41C:
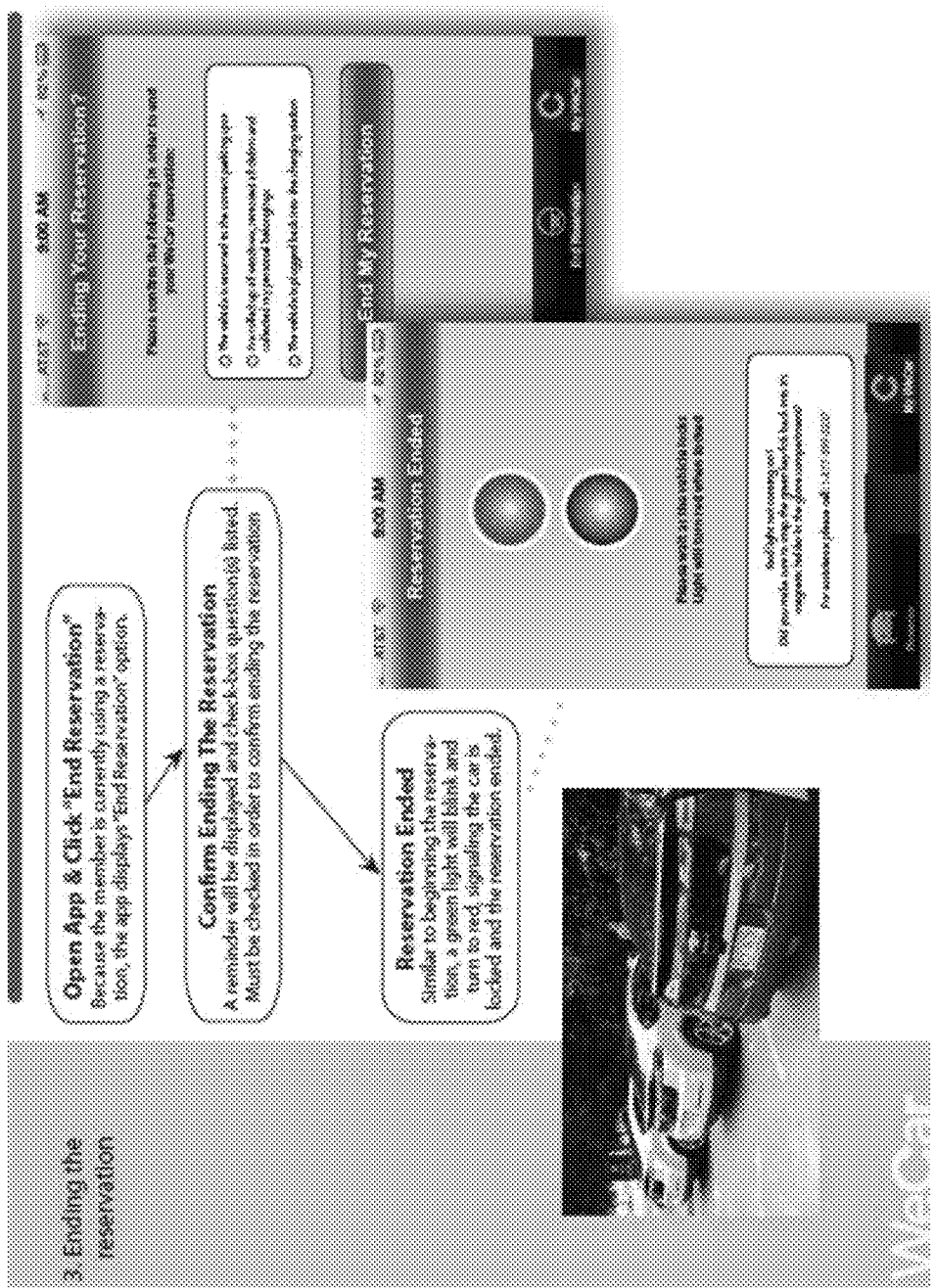

FIG. 41(*a*) depicts an exemplary process flow for Stages 4 and 5 above, with FIGS. 41(*b*)-(*c*) providing larger views of the features from FIG. 41(*a*). FIG. 41(*b*) shows Stage 4 in larger form, while FIG. 41(*c*) shows Stage 5 in larger form.

The process flow of FIG. 41(*b*) begins when the customer arrives at the reserved rental vehicle. While near the rental vehicle, the customer opens the mobile application, and selects a "Start Reservation" button or the like. The mobile application then causes the mobile device to display a GUI screen that prompts the customer to (1) capture a photograph of the customer's driver's license, and (2) scan a scannable car identifier on the rental vehicle (e.g., a bar code or QR code on the vehicle). This information can then be communicated to the rental computer system for analysis, similar to what is shown in FIGS. 11 and 12. If the rental computer system determines that the customer is authorized to pick up the rental vehicle in accordance with the reservation, then the rental computer system communicates with the control hardware 600 of the rental vehicle to cause its doors to unlock and provide the customer with access to the rental vehicle.

It should be understood that a practitioner may choose to implement Stage 4 in different ways. For example, a practitioner may choose to design the rental pickup process so that the customer need not re-submit a driver's license photograph at the time of pick up if the customer record 720 for the customer in the database 308 already shows the customer as a validly licensed driver. In such a case, the customer would need to only scan the car identifier and communicate the scanner car identifier from his/her mobile device to identify himself/herself to the rental computer system. It should be understood that the communication from the mobile device to the rental computer system can include information for uniquely identifying the customer or customer's mobile device.

As another example, the verification process can be performed locally by the control hardware of the rental vehicle rather than by the rental computer system. Upon creation of the reservation, the rental computer system can be configured to communicate an authorization record to the control hardware 600 of the reserved rental vehicle that is a combination of fields from the reservation 820 and the customer record 720 for the customer associated with the reservation. This authorization record can be stored locally by the rental vehicle for use when verifying the customer during pickup (see FIG. 10). If the practitioner wishes to verify the customer's driver's license at time of pickup, the process flow can still require the customer to scan his/her driver's license, such analysis to be performed by the rental computer system (or by the control hardware or mobile application if appropriately configured).

The process flow of FIG. 41(*c*) begins when the customer selects an "End Reservation" option from the mobile application. The mobile application can be configured to provide the customer with this option if it detects that the customer is currently using a rental vehicle for the reservation. The customer can select this button when he/she parks the rental vehicle to return it. The return location can be at a designated return location or a user-selected location within a geographical area of acceptable return locations, if the rental program supports such returns. Upon selection of the "End Reservation" option, the mobile application can prompt the customer for a confirmation that he/she will be ending the reservation. If the customer confirms the return, the mobile application can communicate a return instruction to the rental computer system to end the reservation, whereupon the rental computer system can instruct the rental vehicle to no longer provide the customer with access to the rental vehicle. The rental computer system can also update its reservation record in the database to reflect the closing of the reservation.

5. Exemplary Rental Vehicle Selection Options

Another feature that can be supported by mobile devices to facilitate the rental process can be a feature whereby customers are able to select particular rental vehicles from among a plurality of rental vehicles for their reservation via their mobile devices. In an exemplary embodiment, this selection process can be performed within a defined time period immediately before the customer arrives at a rental location to pick up a reserved rental vehicle.

Figure 42:
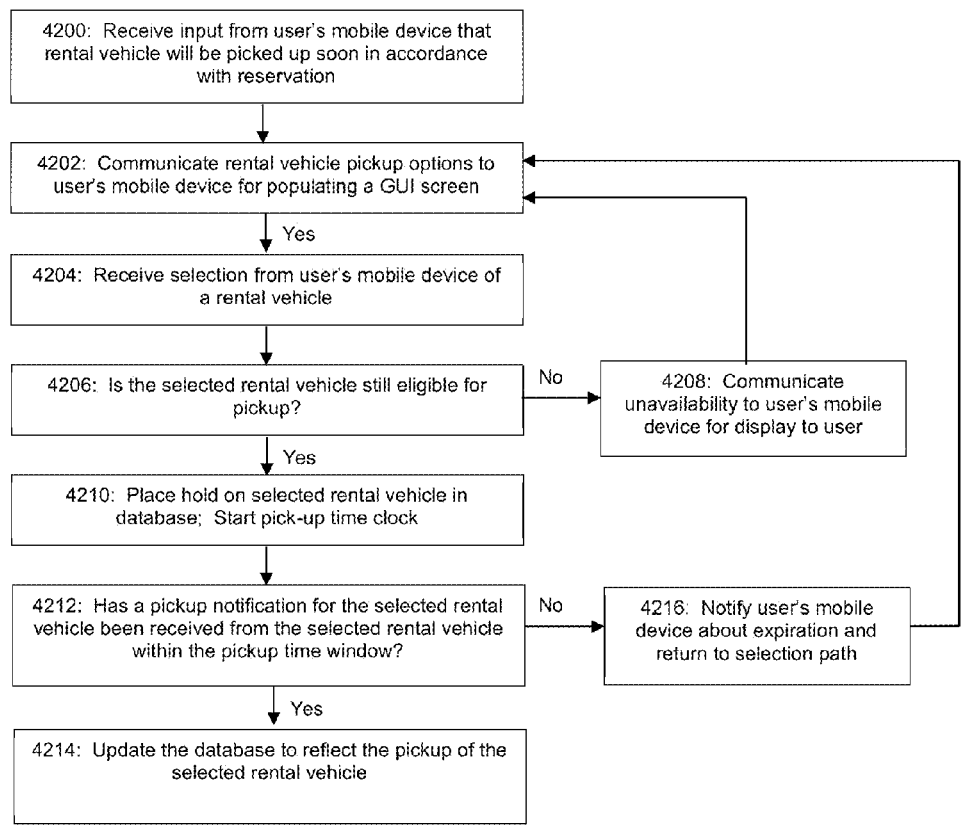
FIG. 42 depicts an exemplary process flow for execution by a rental computer system to support selection by a customer of specific rental vehicles for pickup in accordance with a rental vehicle reservation from among a plurality of rental vehicle options via mobile device.
Figure 43:
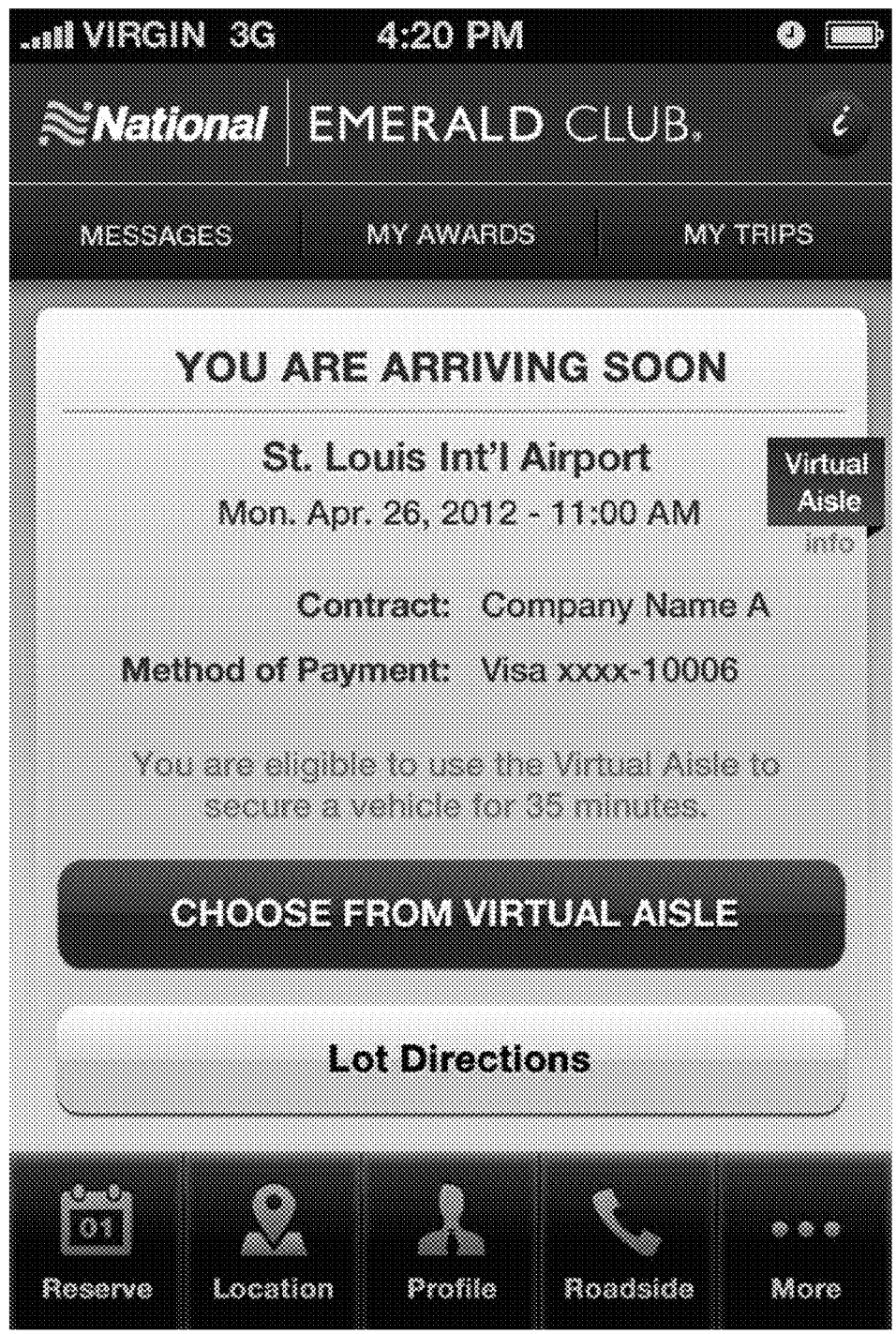
FIGS. 43-49(*b*) depict exemplary GUI screens for display on a mobile device to support selecting a specific rental vehicle for pickup in accordance with a rental vehicle reservation.
Figure 44:
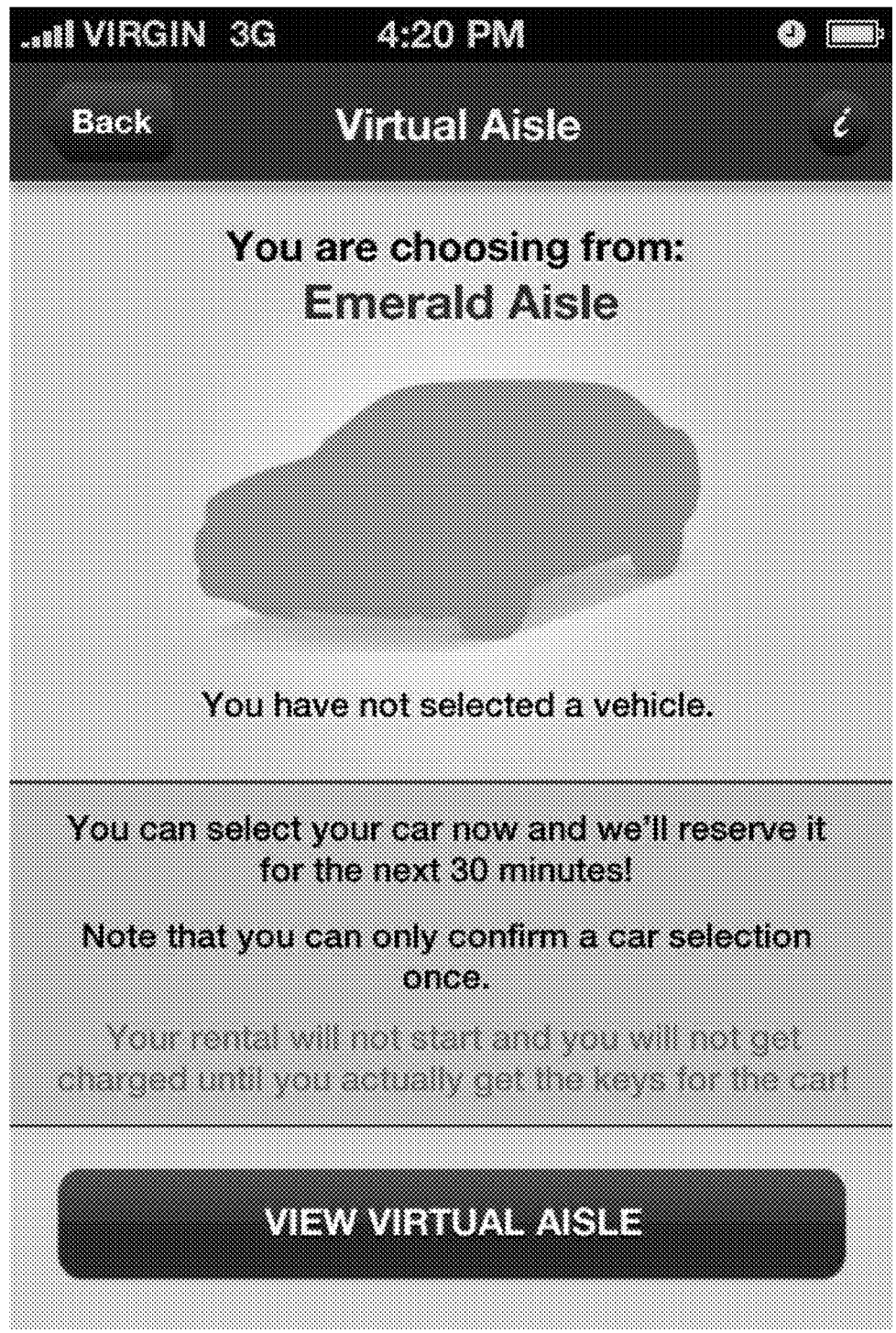

FIG. 42 depicts an exemplary process flow for execution by the rental computer system to present a mobile device with a plurality of specific rental vehicles for selection with respect to picking up a rental vehicle in accordance with a reservation. At step 4200, the rental computer system receives input from the customer's mobile device that the customer will soon be picking up a rental vehicle for his/her reservation. This input can be received in response to any of a number of techniques. For example, the process flow can require the customer to open the mobile application to send a message to the rental computer system regarding such notification. FIG. 43 illustrates an exemplary GUI screen through a mobile application for this purpose (see the "Choose From Virtual Aisle" button; see also FIG. 44 which shows an exemplary landing GUI screen after user-selection of the "Choose from Virtual Aisle" button). Or, if GPS-tracking is enabled on the mobile device, the mobile application can be configured to automatically prompt the customer as to whether he/she will soon be picking up his/her reserved rental vehicle in response to detecting that the customer's mobile device is within X miles of the reserved pickup location (e.g., 25 miles).

Figure 45:
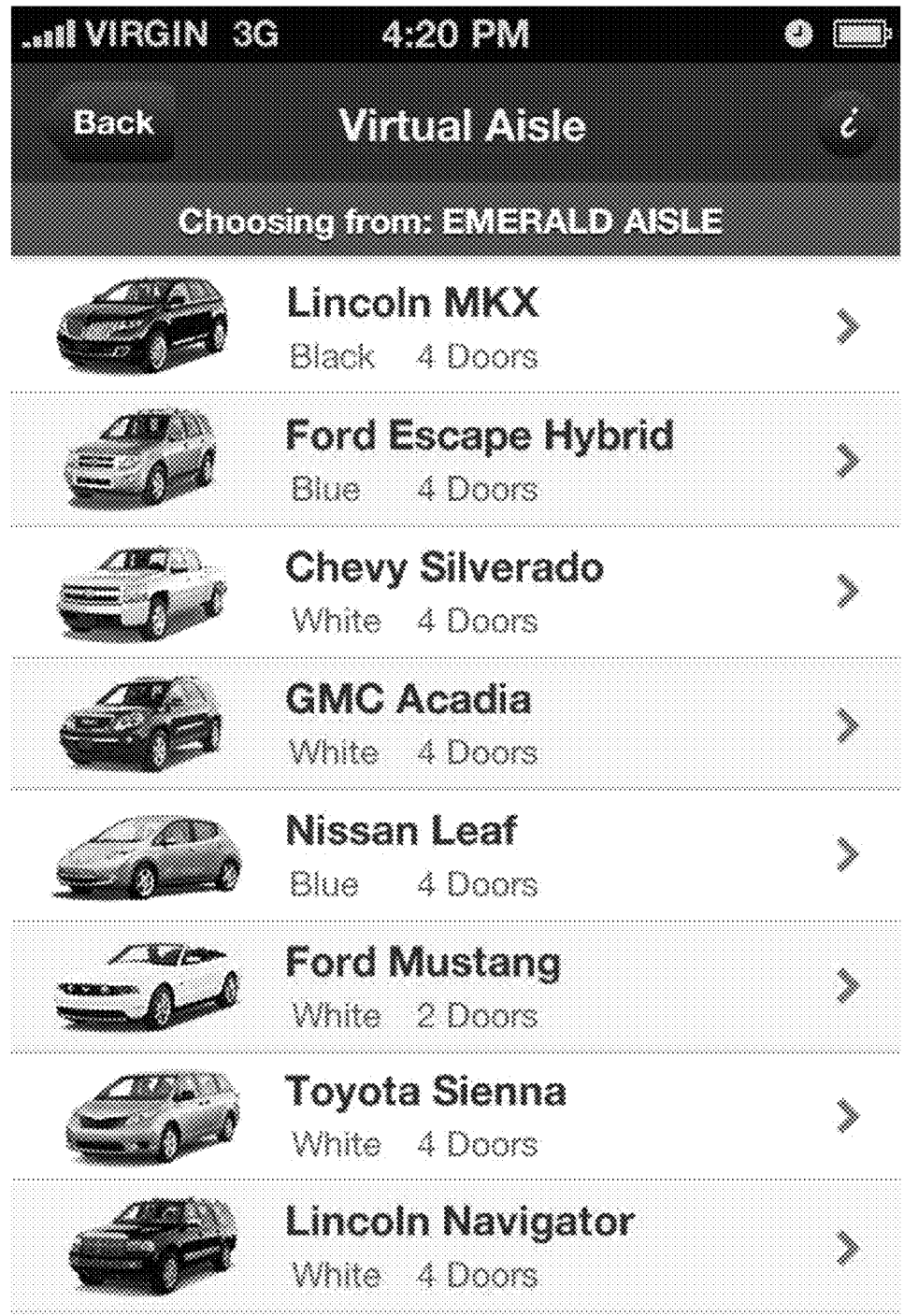
Figure 46:
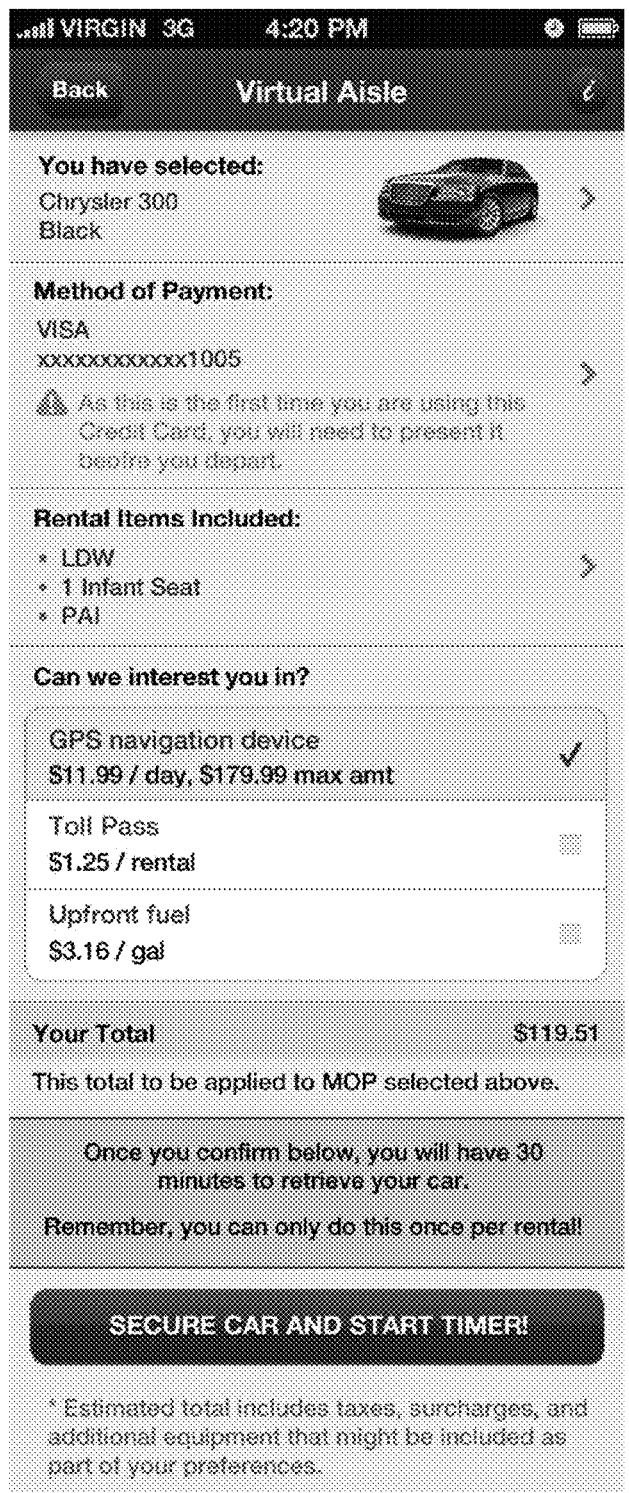

Then, at step 4202, the rental computer system communicates the rental vehicle pickup options to the mobile device for populating a GUI screen presented through the mobile application. For example, if the customer has reserved a "full-size" rental vehicle and there are 8 available "full-size" rental vehicles at the pickup location, the rental computer system can communicate data regarding these 8 available "full-size" rental vehicles to the customer's mobile device. The mobile application can then cause the mobile device to display one or more GUI screens (see FIG. 45) that are configured to permit the customer to scroll through and select a rental vehicle from among these options. FIG. 46 shows an exemplary GUI screen for a user to confirm the selection of a particular rental vehicle from among the presented choices.

Upon customer selection of a presented option, the mobile application can communicate this selection to the rental computer system. Upon receipt of the selection (step 4204), the rental computer system can re-check the selected rental vehicle's availability (step 4206). This step may be necessary to accommodate for a situation where multiple customers are choosing from among pools of vehicles that include the selected vehicle at the same time. That is, while the customer was choosing from among the options, another customer may have rendered an option unavailable. If step 4206 results in a determination that the selected rental vehicle is no longer available, the rental computer system can proceed to step 4208 to send a notification about the unavailability to the customer's mobile device and return to step 4202. If step 4206 results in a determination that the selected rental vehicle is still available, the rental computer system can proceed to step 4210.

Figure 47A:
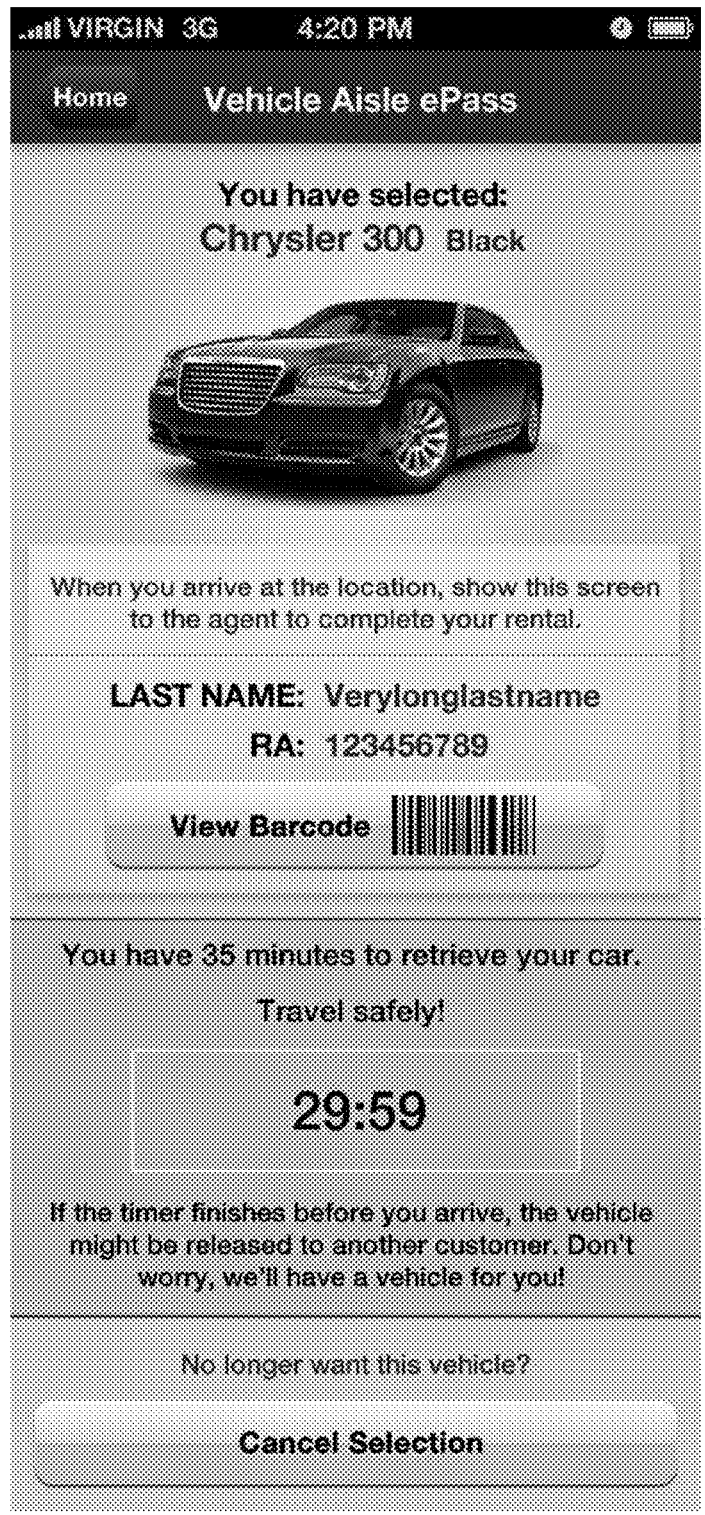
Figure 47B:
Figure 48:

At step 4210, the rental computer system places a time-limited hold on the selected rental vehicle in favor of the customer. This action prevents another customer from selecting that rental vehicle for pickup during a specified time period (e.g., 30 minutes). The rental computer system can then communicate a confirmation of this hold to the customer's mobile device for display to the customer (see FIGS. 47(a) and (b) for examples of GUI screens for this purpose). Upon confirmation of the selection by the customer, the rental computer system can start a countdown with respect to the pickup time clock. If the system is configured such that the rental computer system communicates an authorization record to reserved rental vehicles, the rental computer system can provide the selected rental vehicle with an authorization record that includes a combination of fields from the reservation record 820 and customer record 720 for the customer. Furthermore, FIG. 48 shows an example of a GUI screen that can serve as a machine-readable identifier for establishing that the customer is entitled to pick up the selected rental vehicle during the hold period. For example, the identifier can be a barcode or the like. Thus, for rental locations or rental vehicles that support automated self-rentals, the customer can place the identifier shown by the GUI screen of FIG. 48 in proximity to a reader to gain access to the selected rental vehicle (presuming the customer does so within the hold period). Upon accessing the selected rental vehicle within the hold period, the rental vehicle communicates a signal to the rental computer system to identify the rental vehicle as picked up. Similarly, in an embodiment where automated self-rental is not supported, this operation can be performed by an employee of the rental car company who makes such a notation in a data entry terminal.

Figure 49A:
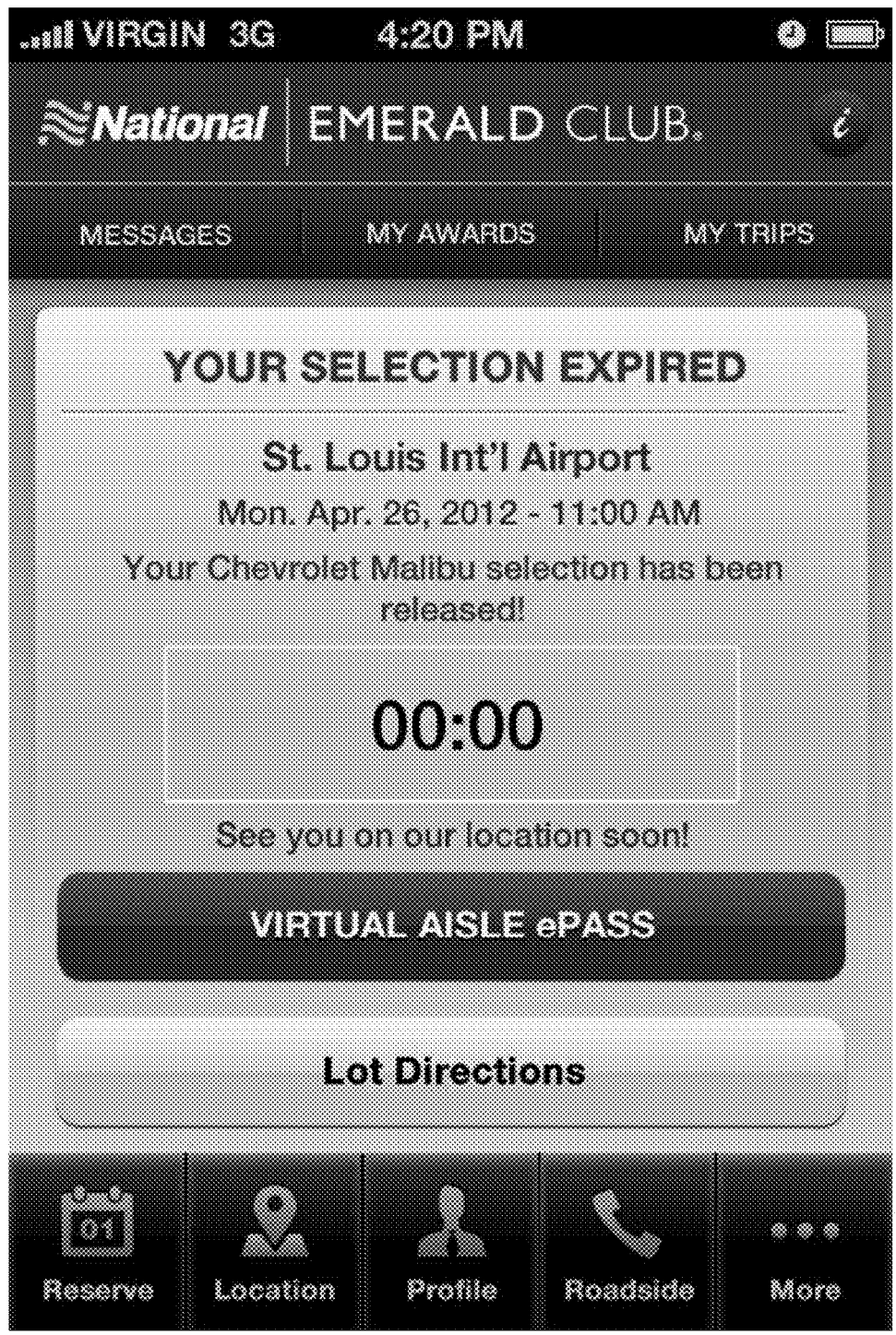
Figure 49B:
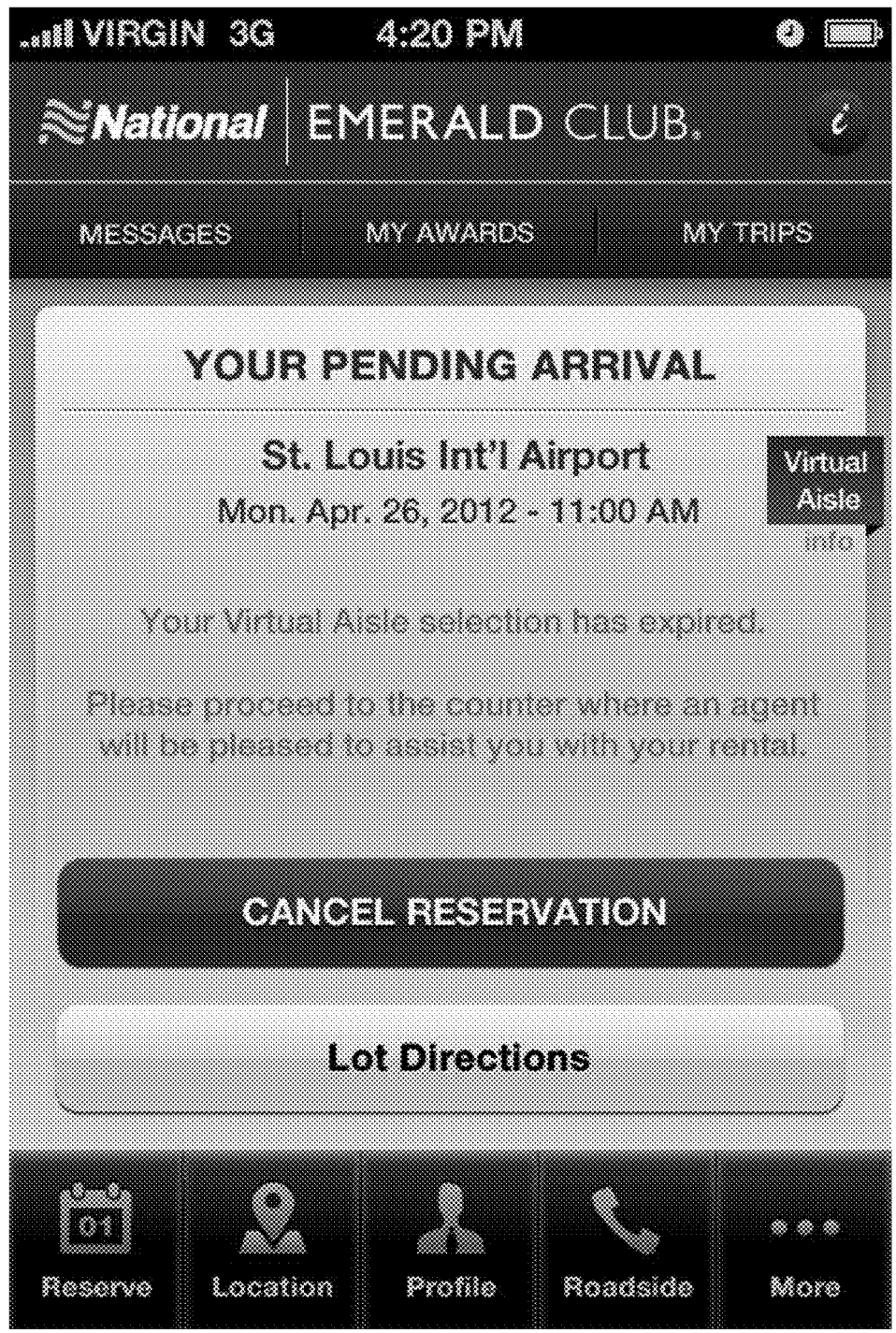

Next, at step 4212, the rental computer system checks whether it has received a pickup notification for the selected rental vehicle within the pickup time window. As noted above, this notification can take the form of a message from the selected rental vehicle that the customer has accessed or requested access to the selected rental vehicle (e.g., by placing his/her mobile device near the vehicle sensor 906). If the pickup time window expires before receiving such a notification, the rental computer system at step 4216 can communicate a message to the customer's mobile device informing the customer about the expiration, remove the hold on the selected rental vehicle in the database, and return the customer to a vehicle selection process (see FIGS. 49(a) and (b) for examples of GUI screens that can be configured to communicate such expiration to the customer). However, once again, if the notification is received within the pickup time window, then at step 4214, the rental computer system can update database 308 including the reservation record 820 for that reservation to reflect the pickup.

Thus, the operation of the FIG. 42 process flow (in coordination with the exemplary GUI screens of FIGS. 43-49) can permit a customer to select a particular rental vehicle from among multiple rental vehicle options via the mobile application prior to arriving at the pickup location. As discussed, it is preferred that the time-limited hold be defined such that the customer has a relatively short window in which to a pick up the particularly selected rental vehicle. In this fashion, it is expected that a rental car company will be able to more reliably present a wide range of options for rental vehicle selection. However, it should be understood that alternative implementations are possible. For example, some practitioners may choose to vary the length of the hold period for customers based on a tier level or other status level assigned to customers. Thus, customers who are members of a frequent renter program can be provided with the ability to hold a particular rental vehicle for a longer time than non-members (e.g., 2 hour holds for members of a frequent renter club and 30 minute holds for non-members). Further still, some practitioners may choose to make some club members of a rental car company not subject to any time-limited holds while non-members would be. As another example, a rental car company might choose to vary the hold requirements by rental vehicle type (e.g., where reservations for higher end vehicle classes will have longer hold periods than reservations for lower end vehicle classes). As still another example, a rental car company might choose to vary the hold requirements by the expected duration of the reservation transaction (e.g., a reservation where the renter is expected to keep the rental vehicle for 2 weeks would have a longer hold period than a reservation where the renter is expected to keep the rental vehicle for 2 days).

Also, other techniques can be used to permit a customer to select any rental vehicle for pickup from a class of reserved rental vehicles in accordance with a rental vehicle reservation. In one example, the customer can be free to place his/her mobile device near the sensor 906 of any rental vehicle he/she chooses. If the chosen vehicle is within the class of rental vehicle defined for the reservation, then the rental computer system can permit customer access for pickup.

As another example in instances where the rental computer system communicates authorization records to the rental vehicles, a process flow such as the one in FIG. 50 can be employed. At step 5000, the rental computer system updates the authorization records for a plurality of rental vehicles that are available to the customer in accordance with the rental vehicle reservation (e.g., broadcasting the authorization record to all available "full-size" rental vehicles if the reservation is for the "full-size" rental class) to thereby make all such rental vehicles eligible for customer selection. The customer will thus be authorized to access any of those rental vehicles. When the customer places his/her mobile device near the sensor of one of these vehicles, the so-selected rental vehicle can communicate this selection to the rental computer system. Upon receipt of such notification at step 5002, the rental computer system can proceed to step 5004 whereupon it updates the authorization records for the non-selected rental vehicles that had been eligible for selection to remove the customer from their authorization records.

FIGS. 51(a) and (b) depict process flows for another embodiment where control mechanisms are put in place to prevent a customer from quickly picking up multiple eligible rental vehicles by placing his/her mobile device near the sensors of multiple eligible rental vehicles in quick succession. The process flow of FIG. 51(a) for execution by the control hardware of a rental vehicle is similar to that of FIG. 10, but adds steps 5010-5012 where it checks the rental computer system before providing the customer with access. Thus, if the locally stored authorization record for the rental vehicle shows that the customer is authorized to pick up the rental vehicle, then at step 5010, the control hardware communicates the access request for the customer to the rental computer system, and awaits permission from the rental computer system at step 5012 before providing the customer with access. FIG. 51(b) illustrates the complementary process flow for execution by the rental computer system. This process flow is similar to that of FIG. 50, but adds a step (step 5020) to check the database 308 to make sure the customer does not reflect the customer has already accessed another rental vehicle for pickup in connection with the reservation. If the database shows that the customer has already picked up a rental vehicle for the reservation, an access denial is communicated to the rental vehicle (step 5026). If the database check is clear, then at step 5022, the rental computer system updates the database to reflect the pickup before communicating access permission to the selected rental vehicle (step 5024).

Also, it should be understood that one of more of the GUI screens presented to a customer during the vehicle selection process can be configured to solicit from the customer input as to whether the customer would like to upgrade their vehicle selection. For example, if the customer had previously reserved an economy class rental vehicle, but at the time of pickup, the customer is desirous of renting a larger vehicle (such as a full-size class rental vehicle), one or more of the GUI screens presented to the customer can be configured to ask the customer whether he or she would like to change the vehicle class for the transaction. Depending on availability, in response to customer input indicative of a desire to upgrade, the system can identify available rental vehicles at the rental location at the higher class and provide the customer with the ability to select a particular one of those vehicles as described above. Further still, in response to a customer request to upgrade, updated pricing information for the upgrade can be presented to the customer through the GUI screens, and the customer can be prompted to provide input as to whether he or she agrees to any new terms and conditions regarding such upgraded rental (e.g., a new rental rate, etc.).

Furthermore, while the exemplary embodiment of FIGS. 43-49(b) is shown as operating in connection with a mobile application, it should be understood that such GUI screens can also be accessible by customers from a website.

6. Smart Key Emulation

Figure 52:
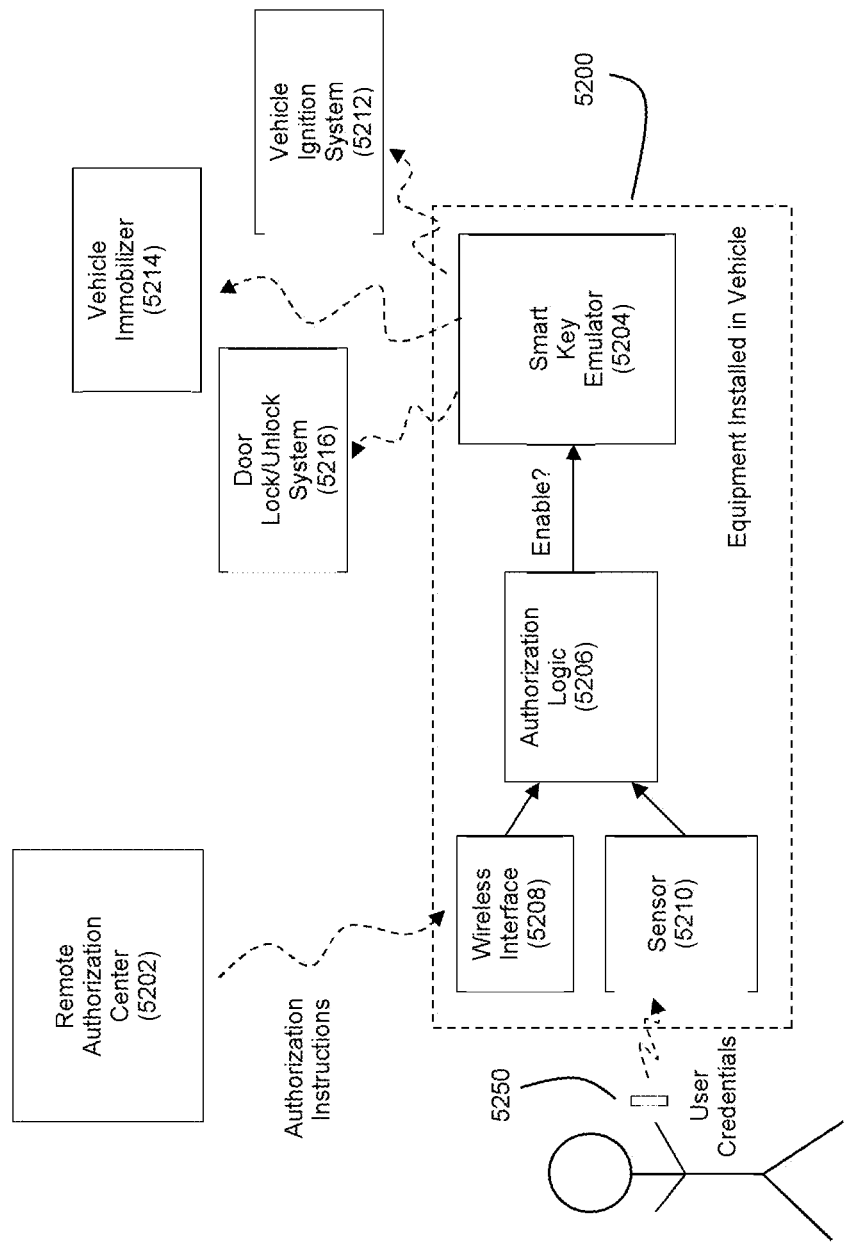

FIG. 52 depicts an exemplary embodiment for a system that permits a customer to use a machine-sensible item such as a mobile device as a smart key for starting a rental vehicle. Smart keys are now well-known devices for gaining access to and starting motor vehicles. With a conventional smart key, a fob carried by a driver is sensed by a receiver in the vehicle to permit the driver to start the vehicle without placing an actual key in an ignition slot. Instead, to start most smart key-enabled vehicles, the driver needs to simply press a "start" button on the driver's console while also pressing the brake with his/her foot (and while the smart key is in proximity to the vehicle). An administrative hassle for rental car companies with respect to rental operations lies in the distribution of keys, whether actual ignition keys or smart key fobs, to renters for the rental vehicles. FIG. 52 describes an embodiment whereby a smart key emulator 5204 is installed inside the vehicle, where this smart key emulator is remotely activated, thereby alleviating the need to deliver an ignition key or smart key fob to a renter.

Equipment 5200 such as control hardware 600 can be installed in the rental vehicle. This equipment can include a sensor 5210, a wireless communication interface 5208, authorization logic 5206, and a smart key emulator 5204. The sensor 5210, wireless communication interface 5208, and authorization logic 5206 can operate as described in connection with FIG. 9 and other embodiments previously described herein. A remote authorization center 5202 such as rental computer system can communicate authorization instructions to the rental vehicle via the wireless interface 5208. These authorization instructions can be stored in a memory by the equipment 5200 to serve as an authorization reference for access by the authorization logic executed by a processor within the vehicle. Then, when a customer places his/her machine-sensible item 5250 near the sensor 5210 as previously described, the sensor 5210 can communicate sensed data indicative of the customer to the authorization logic 5206, and the authorization logic 5206 can compare the sensed information with the authorization reference. If there is a match, the authorization logic can communicate an enable signal to the smart key emulator 5204.

The smart key emulator 5204 can be configured to emulate a conventional smart key upon enablement. Thus, the enabled smart key emulator can communicate with the vehicle's (1) door lock/unlock system 5216 to lock and unlock the vehicle doors, (2) immobilizer 5214 to de-immobilize the vehicle, and (3) ignition system 5212 to permit the de-immobilized vehicle to be started. Thus, by only enabling the smart key emulator 5204 to output the appropriate codes for the vehicle in response to the customer being recognized as the customer who has reserved the rental vehicle as reflected in the authorization records for the rental vehicle, the customer will be able to use his/her proximate item 5250 as if it were a smart key to gain access to the vehicle and enable start/stop of the vehicle's engine using methods previously described herein. Furthermore, it should be understood that the smart key emulator 5204 or other components of the equipment 5200 can also be configured to communicate with the vehicle's data bus via a physical connection to the OBDII or CAN bus port for purposes of data collection (and subsequent communication of the collected data back to the rental system 5202). Examples of data to be collected in this fashion can include vehicle location, vehicle identification number (VIN), fuel levels, mileage/odometer readings, etc.

In a preferred embodiment, the machine-sensible item 5250 is a customer's mobile device 102 (such as a smart phone). However, it should be noted that the machine-sensible 5250 could take other forms, such as an RFID tag or the like.

It should also be understood that a practitioner can choose to make the enable signal a simple "yes/no" binary signal, or alternatively a more complicated signal to reduce the opportunity for theft in the event a criminal attempts to steal the vehicle by breaking in and "hotwiring" a "yes" signal onto the communication link between the authorization logic and the smart key emulator 5204. For example, rather than a "yes/no" binary signal, the enable signal can take the form of a multi-bit code. Still further, the enable signal can be an encrypted signal communicated between the authorization logic 5206 and smart key emulator 5204 that changes over time as is used on many remote access computer systems. Thus, upon concluding that the customer is authorized to access and start the rental vehicle, the authorization logic 5206 can be configured to communicate an encrypted "yes/enable" signal to the smart key emulator 5204. The smart key emulator 5204 can then be configured to decrypt the received encrypted signal and condition the enablement on the decryption revealing that the authorization logic provided a "yes/enable" instruction. As noted, the encryption can be configured to change over time to minimize the risk of hacking.

Also, a protective enclosure can be provided around the authorization logic and smart key emulator to reduce the opportunity for a criminal to access the communication link for hotwiring purposes. For example, they can be deployed together in an integrated circuit.

In another exemplary embodiment where the item 5250 is a mobile device 102, the smart key emulator 5204 can be deployed as part of a mobile application resident on the mobile device rather than within equipment on the car.

Figure 53:
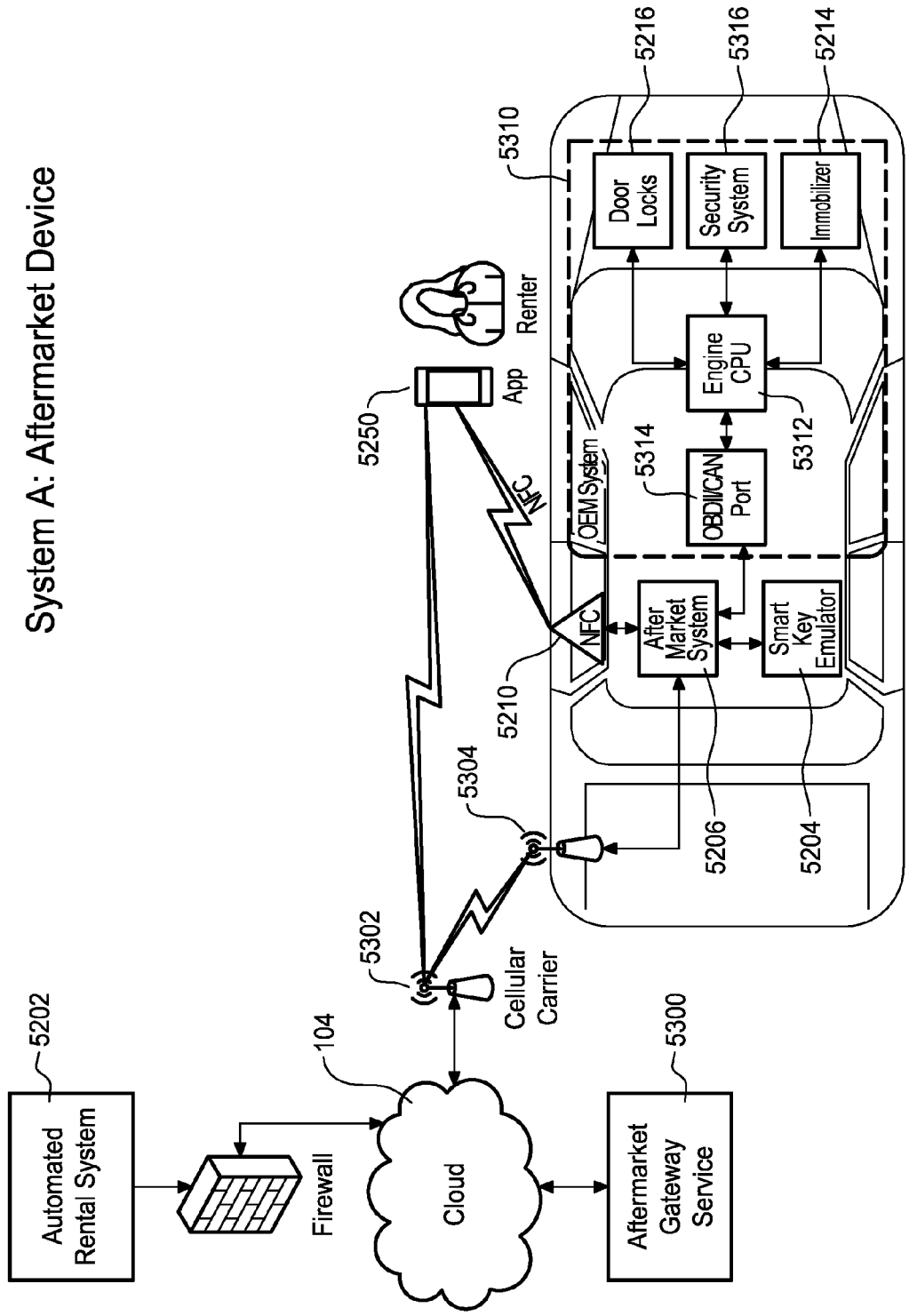

It should also be understood that equipment 5200 can be an aftermarket addition to a rental vehicle or it can be part of the original equipment from the manufacturer of the rental vehicle. FIG. 53 depicts an exemplary embodiment where the equipment 5200 is aftermarket equipment. Through antennae 5302 and 5304 (which may include the antenna 5302 of a cellular carrier), the rental vehicle is able to communicate with the remote rental system 5202 as well as a remote aftermarket gateway service 5300 (via network 104). The aftermarket gateway service 5300 can communicate instructions to the rental vehicle and receive data such as telematics data (e.g., mileage, fuel levels, etc.) from the rental vehicle. Thus, the rental system 5202 can either be configured to communicate instructions to the rental vehicle directly or indirectly via the aftermarket gateway service 5300. The aftermarket authorization logic 5206 can perform the authorization check on data sensed by sensor 5210 (which can be an NFC sensor for sensing an NFC signal generated by item 5250) using authorization reference data from the rental system 5202. If the sensed data is deemed authorized, then the smart key emulator 5204 is configured to generate a signal for enabling vehicle ignition. The OEM system 5310 of the rental vehicle can include an OBDII/CAN port 5312 through which the authorization logic accesses the rental vehicle to instruct components such as controller 5314 (e.g., an engine CPU), door lock/unlock system 5216, immobilizer 5214, and security system 5316 to enable/disable operation as appropriate.

Figure 54:
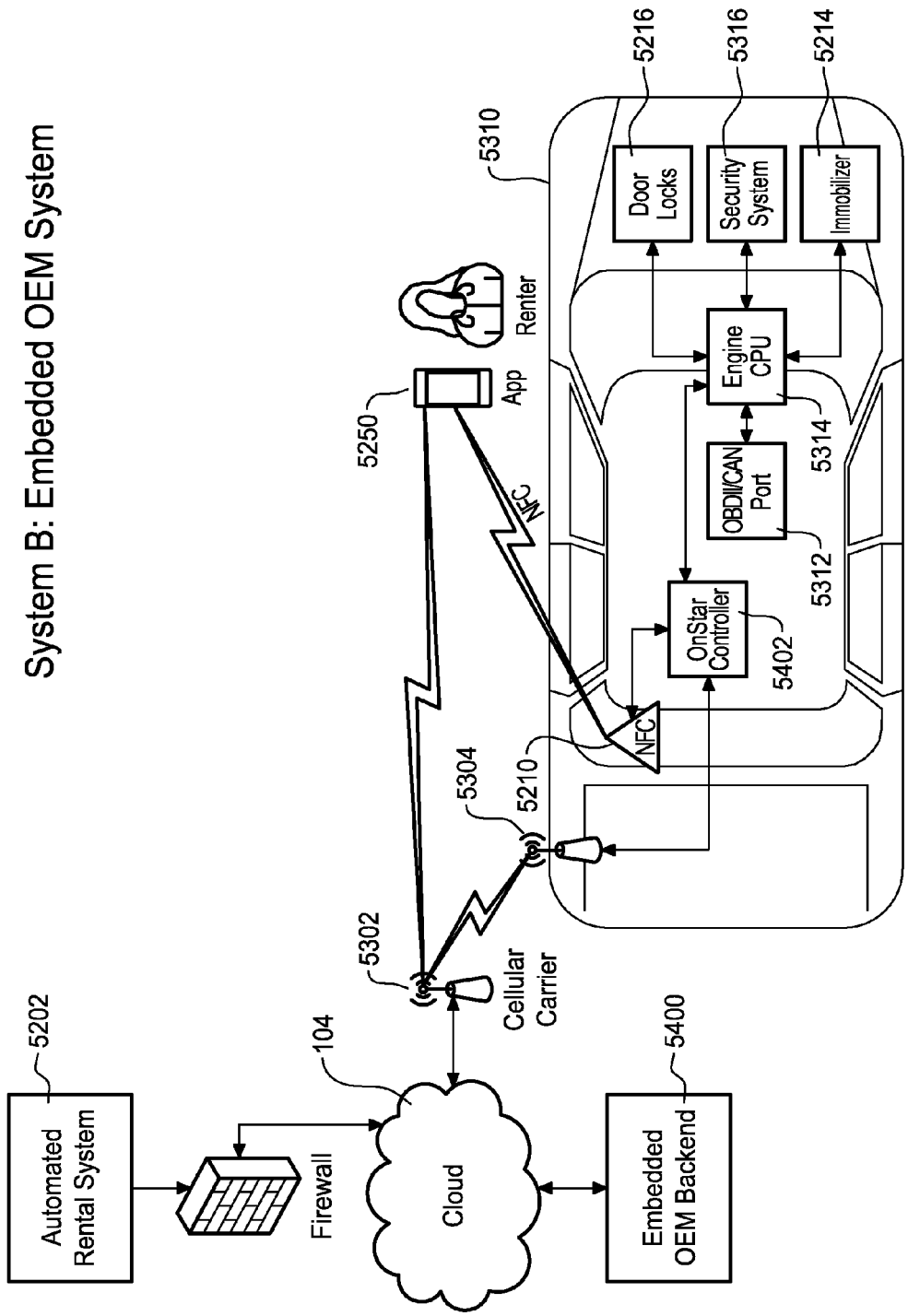

FIG. 54 depicts an exemplary embodiment where the equipment 5200 is included within the OEM system 5310 of the rental vehicle. In such an arrangement, a OEM controller 5402 can include the authorization logic 5206 and smart key emulator 5204. Such a controller 5402 can be a modified OEM telematics controller or the like (such as for OnStar or BlueLink systems). Further still, such OEM system 5310 can be configured to communicate with a remote embedded OEM backend service 5400 for the OEM telematics technology, to play effectively the same role in the process as can the aftermarket gateway service 5300 for the exemplary embodiment of FIG. 53.

FIG. 55 depicts an exemplary embodiment of a system employing a smart key emulator in operation. In this example, the equipment 5500 resident in the vehicle includes a virtual key that functions as the smart key emulator along with a door lock interface 5502, door unlock interface 5504, trunk release interface 5506, panic button interface 5508, and any other interfaces 5510 that are desired. An antenna can communicate a signal from the virtual key 5204 to a key presence sensor 5520 in the vehicle to emulate the presence of a smart key near the vehicle. If a smart key is detected by the sensor 5520, the sensor 5520 can notify the vehicle immobilizer 5526 as well as the locking/trunk system 5522, body control unit (BCU) 5524, and immobilizer 5526 that the vehicle can be placed in condition for operation. This signal from the virtual key can be communicated as a low power, low frequency signal. An antenna can also communicate signals from the various interfaces to the vehicle's lock/unlock, trunk, and other systems 5522 to effectuate a desired action. Thus, a mobile application or the like can be configured to also present buttons for selection by a user to lock/unlock doors, open the trunk, actuate the panic system, etc. The equipment 5500 can also include a sensor 5210 as previously described. However, this need not be the case if alternate techniques are used to verify the physical presence of the customer near the vehicle. For example, if the customer is using a position tracking-enabled mobile device (e.g., a mobile device with GPS capabilities), the remote rental system can compare the detected physical location of the customer with the detected physical location of the rental vehicle to assess their proximity.

When a customer is physically present near the vehicle, a mobile application executing on the customer's mobile device can communicate with the remote rental system, where this communication is effectively a request for that customer to use the subject rental vehicle at the particular time. If the rental system determines that the customer is authorized to rent the rental vehicle, the rental system can communicate a cellular command to equipment to wake up (similarly, in an embodiment employing GPS comparisons to assess physical proximity, the rental system can wake the equipment up to check vehicle location). A presence pulse signal can be initiated, and the processor 5512 of the equipment 5500 can obtain the GPS position of the vehicle from GPS system 5514. The processor 5512 can also actuate a data collection component 5516 to access the vehicle through a port 5530 such as an OBDII port to collect data from the engine control unit (ECU) 5528 such as fuel levels, VIN, odometer readings, etc. This collected data along with the GPS position can then be communicated back to the rental system via wireless radio 5518.

While the present invention has been described above in relation to exemplary embodiments, various modifications may be made thereto that still fall within the invention's scope, as would be recognized by those of ordinary skill in the art. Such modifications to the invention will be recognizable upon review of the teachings herein. As such, the full scope of the present invention is to be defined solely by the appended claims and their legal equivalents.

What is claimed is:

1. A method of linking wireless mobile computing devices with control hardware in rental vehicles to provide users of the wireless mobile computing devices with automated access to selected rental vehicles for pickup, the method comprising:
    storing a rental vehicle reservation in a database in association with a customer;
    storing data about a plurality of rental vehicles in a database, wherein each of a plurality of rental vehicles includes control hardware configured to automate a rental vehicle pickup process, the control hardware comprising (1) a processor, (2) a memory, (3) a wireless I/O component, (4) a sensor, and (5) a vehicle interface;
    a server communicating with a wireless mobile computing device used by the customer prior to an initial pickup by the customer of a rental vehicle in accordance with the rental vehicle reservation, wherein the server communicating step comprises:
        the server processing the stored rental vehicle data to identify a plurality of specific rental vehicles that are available for pickup based on the stored rental vehicle reservation for the customer;
        the server communicating a list of a plurality of the identified specific rental vehicles to the customer's wireless mobile computing device for presentation thereon; and
        the server receiving a selection of a specific rental vehicle from the list from the customer's wireless mobile computing device in response to customer input via the wireless mobile computing device;
    the server determining from the database of stored rental vehicle data whether the specific rental vehicle corresponding to the received selection is still available for initial pickup by the customer;
    in response to a determination that the specific rental vehicle corresponding to the received selection is still available for initial pickup by the customer, the server (1) placing a time-limited hold on the specific rental vehicle corresponding to the received selection, and (2) communicating a signal to the control hardware in the specific rental vehicle corresponding to the received selection, the signal including authorization information for the customer to pickup that rental vehicle;
    the wireless I/O component of the control hardware in the specific rental vehicle corresponding to the received selection receiving the communicated signal from the server;
    the processor of the control hardware in the specific rental vehicle corresponding to the received selection interacting with the wireless I/O component and storing the authorization information in the received signal in the memory of the control hardware in the specific rental vehicle corresponding to the received selection;
    enforcing the time-limited hold by (1) if a time limit corresponding to the time-limited hold has expired before the customer has picked up the specific rental vehicle corresponding to the received selection, releasing the specific rental vehicle corresponding to the received selection from the time-limited hold, and (2) if a time limit corresponding to the time-limited hold has not yet expired, retaining the time-limited hold with respect to the specific rental vehicle corresponding to the received selection;
    the sensor of the control hardware in the specific rental vehicle corresponding to the received selection sensing data corresponding to the customer's wireless mobile computing device when the customer's wireless mobile computing device is in proximity to the sensor;
    the processor of the control hardware in the specific rental vehicle corresponding to the received selection (1) reading the sensed data from the sensor, (2) checking for stored authorization information, (3) determining whether the customer is authorized to pickup the specific rental vehicle corresponding to the received selection based on the sensed data and the stored authorization information, and (4) in response to a determination that the customer is authorized to pickup the specific rental vehicle corresponding to the received selection, sending an access command instruction to the specific rental vehicle corresponding to the received selection via the vehicle interface of the control hardware in the specific rental vehicle corresponding to the received selection; and
    actuating at least one member of the group consisting of (1) a door locking/unlocking vehicle subsystem, (2) a vehicle immobilizer subsystem, and (3) a vehicle ignition subsystem in the specific rental vehicle corresponding to the received selection in response to the access command instruction so as to provide the customer with pickup access to the specific rental vehicle corresponding to the received selection during the time-limited hold.

2. The method of claim 1 wherein the sensing step comprises the sensor of the control hardware in the specific rental vehicle corresponding to the received selection sensing a machine-readable identifier that is presented on a display of the customer's wireless mobile computing device.

3. The method of claim 2 wherein the machine-readable identifier comprises a barcode.

4. The method of claim 1 further comprising defining a time limit for the time-limited hold based on a status level for the customer.

5. The method of claim 4 wherein the status level is indicative of whether the customer is a member of a frequent renter program, wherein the defining step comprises providing customers who are members of the frequent renter program with a longer time limit for the time-limited hold than for non-members.

6. The method of claim 1 further comprising:
in response to a determination that the specific rental vehicle corresponding to the received selection is no longer available for initial pickup by the customer, the server communicating a notification to the customer's wireless mobile computing device that notifies the customer that the specific rental vehicle corresponding to the received selection is not available.

7. The method of claim 1 wherein the releasing step further comprises the server communicating a notification to the customer's wireless mobile computing device that notifies the customer that the specific rental vehicle corresponding to the received selection has been released from the time-limited hold.

8. The method of claim 1 wherein the reservation is for a vehicle class, the method further comprising:
permitting the customer to change the vehicle class to access, via the customer's wireless mobile computing device, a list of specific rental vehicles available for pickup in the changed vehicle class.

9. The method of claim 1 wherein the time-limited hold placing step comprises the server assigning a status in the database to the specific rental vehicle corresponding to the received selection that is effective to remove the specific rental vehicle corresponding to the received selection from a pool of rental vehicles available for selection by other customers during the time-limited hold.

10. The method of claim 1 wherein the releasing step comprises revoking authorization with respect to the customer for the specific rental vehicle corresponding to the received selection.

11. The method of claim 1 wherein the customer's wireless mobile computing device is a GPS tracking-enabled wireless mobile computing device, the method further comprising:
detecting based on the enabled GPS tracking for the customer's wireless mobile computing device whether the customer's wireless mobile computing device is within a specified distance of a pickup location for the rental vehicle reservation; and
conditioning a presentation of the list on the customer's wireless mobile computing device on a determination that the customer's mobile computing device is within the specified distance of the pickup location for the rental vehicle reservation.

12. The method of claim 1 further comprising:
the server receiving a message from the customer's wireless mobile computing device requesting a list of specific rental vehicles available for pickup with respect to the customer's rental vehicle reservation;
in response to the received message, the server performing the list communicating step.

13. The method of claim 1 wherein the sensor of the control hardware in the specific rental vehicle comprises a near field communication (NFC) sensor, and wherein the sensing comprises the NFC sensor sensing an NFC signal generated by the customer's wireless mobile computing device.

14. The method of claim 1 wherein the sensor of the control hardware in the specific rental vehicle comprises a BlueTooth sensor, and wherein the sensing comprises the BlueTooth sensor sensing a BlueTooth signal generated by the customer's wireless mobile computing device.

15. The method of claim 1 wherein the sensor of the control hardware in the specific rental vehicle comprises an RFID sensor, and wherein the sensing comprises the RFID sensor sensing an RFID signal generated by the customer's wireless mobile computing device.

16. The method of claim 1 wherein the time-limited hold has a time limit of 30 minutes.

17. The method of claim 1 further comprising defining a time limit for the time-limited hold based on a rental vehicle type for the customer's rental vehicle reservation.

18. The method of claim 1 further comprising defining a time limit for the time-limited hold based on a rental duration for the customer's rental vehicle reservation.

19. The method of claim 1 wherein the enforcing step comprises the server performing the enforcing step.

20. A system for linking wireless mobile computing devices with control hardware in rental vehicles to provide users of the wireless mobile computing devices with automated access to selected rental vehicles for pickup, the system comprising:
a plurality of rental vehicles that include control hardware therein, the control hardware for each of the rental vehicles comprising (1) a processor, (2) a memory, (3) a wireless I/O component, (4) a sensor, and (5) a vehicle interface, wherein the wireless I/O component is configured to interface the control hardware with a wireless network, and wherein the vehicle interface is configured to interface the control hardware with at least one member of the group consisting of (i) a door locking/unlocking vehicle subsystem, (ii) a vehicle immobilizer subsystem, and (iii) a vehicle ignition subsystem of the rental vehicle;
a plurality of wireless mobile computing devices associated with a plurality of customers;
a database in which (1) rental vehicle reservation data for a plurality of the customers is stored, and (2) data about a plurality of the rental vehicles is stored; and
a server in cooperation with the database, wherein the server is configured to communicate with (1) the wireless mobile computing devices prior to initial pickups by the customers of rental vehicles in accordance with the rental vehicle reservations and (2) the control hardware in the rental vehicles over a network;
wherein the server is configured to (1) access rental vehicle reservation data from the database for a customer in response to input over a network from a wireless mobile computing device associated with the customer, (2) determine a rental vehicle class and a rental vehicle pickup location based on the accessed rental vehicle reservation data, (3) generate a list of specific rental vehicles within the determined rental vehicle class that are available for initial pickup at the rental vehicle pickup location based on the stored rental vehicle data, (4) communicate data representative of the list to the customer's wireless mobile computing device for display thereon, (5) receive further input from the customer's wireless mobile computing device, wherein the further input is indicative of a selection of a specific rental vehicle from the list, (6) place a time-limited hold on the specific rental vehicle corresponding to the received selection to permit a pickup by the customer of the specific rental vehicle corresponding to the received selection within a specified time window, and (7) communicate a signal to the control hardware in the specific rental vehicle corresponding to the received selection, the signal including authorization information for the customer to pickup that rental vehicle;

wherein the wireless I/O component of the control hardware in the specific rental vehicle corresponding to the received selection is configured to receive the communicated signal from the server;

wherein the processor of the control hardware in the specific rental vehicle corresponding to the received selection is configured to (1) interact with the wireless I/O component to process dat representative of the received signal, and (2) store the authorization information in the received signal in the memory of the control hardware in the specific rental vehicle corresponding to the received selection;

wherein the sensor of the control hardware in the specific rental vehicle corresponding to the received selection is configured to sense data corresponding to the customer's wireless mobile computing device when the customer's wireless mobile computing device is in proximity to the sensor; and wherein the processor of the control hardware in the specific rental vehicle corresponding to the received selection is further configured to (1) read the sensed data from the sensor, (2) check for stored authorization information, (3) determine whether the customer is authorized to pickup the specific rental vehicle corresponding to the received selection based on the sensed data and the stored authorization information, and (4) in response to a determination that the customer is authorized to pickup the specific rental vehicle corresponding to the received selection, send an access command instruction to the at least one member via the vehicle interface of the control hardware in the specific rental vehicle corresponding to the received selection to thereby actuate the at least one member so as to provide the customer with pickup access to the specific rental vehicle corresponding to the received selection during the time-limited hold.

21. The system of claim 20 wherein the server is further configured to enforce the time-limited hold to require the customer to pick up the held specific rental vehicle within the specified time window.

22. The system of claim 21 wherein the server is further configured to (1) determine whether the customer picks up the specific rental vehicle corresponding to the received selection before expiration of the time-limited hold, and (2) in response to a determination that the customer has not picked up the specific rental vehicle corresponding to the received selection before expiration of the time-limited hold, remove the time-limited hold.

23. The system of claim 22 wherein the server is further configured to perform the time-limited hold removal via a revocation of authorization with respect to the customer for the specific rental vehicle corresponding to the received selection.

24. The system of claim 21 wherein the server is further configured to (1) receive further input from the customer's wireless mobile computing device indicative of a request to change the rental vehicle class, and (2) in response to the received request, (i) generate a new list of specific rental vehicles within the changed rental vehicle class that are available for pickup at the rental vehicle pickup location based on the stored rental vehicle data, (ii) communicate data representative of the new list to the customer's wireless mobile computing device for display thereon.

25. The system of claim 20 wherein the customer's wireless mobile computing device comprises a mobile application configured, upon execution by a processor of the customer's wireless mobile computing device, to cause a display of a machine-readable identifier on a display screen of the customer's wireless mobile computing device, and wherein the sensor of the control hardware in the specific rental vehicle corresponding to the received selection is configured to sense the machine-readable identifier in order to generate the sensed data.

26. The system of claim 25 wherein the machine-readable identifier comprises a barcode.

27. The system of claim 20 wherein the server is further configured to, in response to the received further input, (1) determine whether the specific rental vehicle corresponding to the received selection is still available for initial pickup by the customer, and (2) perform the time-limited hold placement in response to a determination that the specific rental vehicle corresponding to the received selection is still available for pickup by the customer.

28. The system of claim 10 wherein each of a plurality of the mobile computing devices comprise smart phones.

29. The system of claim 20 wherein the server is configured to assign a status in the database to the specific rental vehicle corresponding to the time-limited hold that is effective to remove the specific rental vehicle corresponding to the time-limited from a pool of rental vehicles available for selection by other customers during the time-limited hold.

30. The system of claim 20 wherein the customer's wireless mobile computing device is a GPS tracking-enabled wireless mobile computing device, and wherein the customer's wireless mobile computing device comprises a mobile application configured, upon execution by a processor of the customer's wireless mobile computing device, to cause the customer's wireless mobile computing device to wirelessly send a current GPS position for the customer's wireless computing device to the server; and wherein the server is further configured to (1) receive the current GPS position from the customer's wireless mobile computing device, (2) determine a current geographic position for the customer's wireless mobile computing device based on the received current GPS position, (3) determine whether the current geographic position for the customer's wireless mobile computing device is within a specified distance of the pickup location, and (4) in response to a determination that the customer's wireless mobile computing device is within the specified distance of the pickup location, perform the list communication operation.

31. The system of claim 20 wherein the customer's wireless mobile computing device comprises a mobile application configured, upon execution by a processor of the customer's wireless mobile computing device, to cause the customer's wireless mobile computing device to wirelessly send, in response to customer input, a message to the server that requests a list of specific rental vehicles available for pickup at the pickup location; and wherein the server is further configured to (1) receive the message, and (2) in response to the received message, perform the list communication operation.

32. The system of claim 20 wherein the sensor of the control hardware in the specific rental vehicle comprises a near field communication (NFC) sensor.

33. The system of claim 20 wherein the sensor of the control hardware in the specific rental vehicle comprises a BlueTooth sensor.

34. The system of claim 20 wherein the sensor of the control hardware in the specific rental vehicle comprises an RFID sensor.

35. The system of claim 20 wherein the specified time window for the time-limited hold is 30 minutes.

36. The system of claim 20 wherein the server is further configured to vary the specified time window for the time-limited hold based on a status level for the customer.

37. The system of claim 20 wherein the server is further configured to vary the specified time window for the time-limited hold based on a rental vehicle type for the customer's rental vehicle reservation.

38. The system of claim 20 wherein the server is further configured to vary the specified time window for the time-limited hold based on a rental duration for the customer's rental vehicle reservation.

39. An apparatus comprising:
a GPS tracking-enabled wireless mobile computing device configured to interact with a remote server and control hardware in a rental vehicle to support a selection and pickup of a specific rental vehicle in fulfillment of a rental vehicle reservation, the GPS tracking-enabled wireless mobile computing device comprising (1) a processor, (2) a wireless I/O component, (3) a memory, and (4) a display screen, wherein the wireless I/O component is configured to interface the processor with a wireless network, and wherein the memory is configured to store a mobile application configured for execution by the processor;
wherein the mobile application, upon execution by the processor, is configured to, (1) cause the wireless I/O component to wirelessly send a current GPS position for the wireless computing device to the remote server, (2) receive data from the remote server via the wireless I/O component, the received data being indicative of a plurality of specific rental vehicles available for pickup by a customer in accordance with a rental vehicle reservation of the customer, (3) generate a graphical user interface (GUI) for display to the customer via the display screen when the current GPS position for the wireless computing device is within a specified distance of a pickup location for the rental vehicle reservation, the GUI being configured to present a list of the available specific rental vehicles, (4) receive a selection of a specific rental vehicle from the list from the customer through the GUI, (5) communicate the selection to the remote server via the wireless I/O component, and (6) generate machine-readable data configured to be read by the control hardware of the specific rental vehicle corresponding to the selection, wherein the machine-readable data is effective, during a specified time window corresponding to a time-limited hold applicable to the specific rental vehicle corresponding to the selection, to cause the control hardware to actuate at least one member of the group consisting of (i) a door locking/unlocking vehicle subsystem, (ii) a vehicle immobilizer subsystem, and (iii) a vehicle ignition subsystem in the specific rental vehicle corresponding to the selection so as to provide the customer with access to the specific rental vehicle corresponding to the selection.

40. The apparatus of claim 39 wherein the mobile application is further configured, upon execution by the processor, to cause the wireless mobile computing device to (1) responsive to the selection communication, receive data from the remote server via the wireless I/O component that is indicative of whether the specific rental vehicle corresponding to the selection is available for pickup by the customer, and (2) in response to the received data indicating that the specific rental vehicle corresponding to the selection is available for pickup by the customer, notify the customer through a GUI for display via the display screen that the specific rental vehicle corresponding to the selection will be held for the customer for the specified time window.

41. The apparatus of claim 40 wherein the mobile application is further configured, upon execution by the processor, to cause the wireless mobile computing device to display a remaining amount of time for the time window on a GUI via the display screen.

42. The apparatus of claim 41 wherein the mobile application is further configured, upon execution by the processor, to cause the wireless mobile computing device to notify the customer through a GUI via the display screen when the specified time window has expired.

43. The apparatus of claim 39 wherein the mobile application is further configured, upon execution by the processor, to cause the wireless mobile computing device to condition the list GUI display screen generation on a current time being within a specified window before a pickup date/time of the rental vehicle reservation.

44. The apparatus of claim 39 wherein the mobile application is further configured, upon execution by the processor, to cause the wireless mobile computing device to permit the customer to access additional information about the specific rental vehicles on the list via a GUI displayed on the display screen.

45. The apparatus of claim 39 wherein the wireless mobile computing device comprises a smart phone with a touchscreen user interface.

46. The apparatus of claim 39 wherein the wireless mobile computing device comprises a tablet computer with a touchscreen user interface.

47. The apparatus of claim 39 wherein the machine-readable data comprises a barcode.

* * * * *